(12) United States Patent
Kobzev et al.

(10) Patent No.: US 11,091,646 B2
(45) Date of Patent: Aug. 17, 2021

(54) LUMINESCENT SQUARAINE ROTAXANE COMPOUNDS

(71) Applicant: SETA BioMedicals, LLC, Urbana, IL (US)

(72) Inventors: Dmytro V. Kobzev, Kharkov (UA); Olga S. Kolosova, Kharkov (UA); Olena M. Obukhova, Kharkov (UA); Olga M. Semenova, Kharkov (UA); Rostyslav P. Svoyakov, Kharkov (UA); Anatoliy L. Tatarets, Kharkov (UA); Ewald A. Terpetschnig, Urbana, IL (US)

(73) Assignee: SETA BioMedicals, LLC, Urbana, IL (US)

( * ) Notice: Subject to any disclaimer, the term of this patent is extended or adjusted under 35 U.S.C. 154(b) by 195 days.

(21) Appl. No.: 16/102,421

(22) Filed: Aug. 13, 2018

(65) Prior Publication Data

US 2019/0048196 A1 Feb. 14, 2019
US 2020/0199369 A9 Jun. 25, 2020

Related U.S. Application Data

(60) Provisional application No. 62/568,587, filed on Oct. 5, 2017, provisional application No. 62/545,302, filed on Aug. 14, 2017.

(51) Int. Cl.
| | |
|---|---|
| C09B 69/10 | (2006.01) |
| C08G 83/00 | (2006.01) |
| C09B 57/00 | (2006.01) |
| C08G 69/26 | (2006.01) |
| C08G 69/42 | (2006.01) |
| C09B 23/01 | (2006.01) |
| C08G 73/06 | (2006.01) |
| C08L 71/00 | (2006.01) |
| G01N 1/30 | (2006.01) |
| C08L 79/02 | (2006.01) |

(52) U.S. Cl.
CPC .............. *C09B 69/10* (2013.01); *C08G 69/26* (2013.01); *C08G 69/42* (2013.01); *C08G 73/0627* (2013.01); *C08G 83/007* (2013.01); *C09B 23/0066* (2013.01); *C09B 57/007* (2013.01); *C08L 71/00* (2013.01); *C08L 79/02* (2013.01); *G01N 1/30* (2013.01); *G01N 2001/302* (2013.01)

(58) Field of Classification Search
None
See application file for complete search history.

(56) References Cited

U.S. PATENT DOCUMENTS

| | | |
|---|---|---|
| 5,405,907 A | 4/1995 | Tang et al. |
| 5,453,517 A | 9/1995 | Kuhn et al. |
| 6,083,485 A | 7/2000 | Licha et al. |
| 6,538,129 B1 | 3/2003 | Terpetschnig et al. |
| 8,642,014 B2 | 2/2014 | Terpetschnig et al. |
| 2002/0077487 A1 | 6/2002 | Leung et al. |
| 2005/0202565 A1 | 9/2005 | Terpetschnig et al. |
| 2010/0266507 A1* | 10/2010 | Terpetschnig ....... C07D 471/22 424/9.6 |

FOREIGN PATENT DOCUMENTS

| | | |
|---|---|---|
| EP | 2129788 B1 | 9/2014 |
| WO | WO 00/58405 A2 | 10/2000 |
| WO | WO 01/11370 A1 | 2/2001 |
| WO | WO 03/087052 A2 | 10/2003 |

OTHER PUBLICATIONS

Arunkumar et al., Squaraine-Derived Rotaxanes: Sterically Protected Fluorescent Near-IR Dyes, J. Am. Chem. Soc., vol. 127, No. 10, pp. 3288-3289, 2005.
Leigh et al., The Mechanism of Formation of Amide-Based Interlocked Compounds: Prediction of a New Rotaxane-Forming Motif, Chem. Eur. J., vol. 10, Issue 20, pp. 4960-4969, 2004.

* cited by examiner

*Primary Examiner* — Brian J Davis
(74) *Attorney, Agent, or Firm* — Dascenzo Gates Intellectual Property Law, P.C.

(57) ABSTRACT

Luminescent reporter compounds that are rotaxanes having the structure

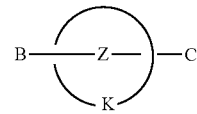

where B—Z—C is a reporter molecule based on a squaraine type molecule, or similar reporter, and K is a macrocycle that encircles and interlocks with the reporter molecule. Applications of the reporter compounds are provided, as well as reactive intermediates used to synthesize the reporter compounds, and methods of synthesizing the reporter compounds.

29 Claims, 8 Drawing Sheets

LUMINESCENT SQUARAINE ROTAXANE COMPOUNDS

RELATED APPLICATIONS

This application claims priority under 35 U.S.C. § 119(e) to U.S. Provisional Patent Application No. 62/545,302, which is entitled "HALOGENATED ROTAXANES," and which was filed on Aug. 14, 2017, and to U.S. Provisional Patent Application No. 62/568,587, which is entitled "LUMINESCENT COMPOSITIONS CONTAINING TRIPLET STATE QUENCHERS," and which was filed on Oct. 5, 2017. The complete disclosures of the above-identified applications are incorporated herein by reference.

CROSS-REFERENCES TO RELATED MATERIALS

This application incorporates by reference in their entirety for all purposes all patents, patent applications (published, pending, and/or abandoned), and other patent and nonpatent references cited anywhere in this application. The cross-referenced materials include but are not limited to the following publications: Richard P. Haugland, Handbook of Fluorescent Probes and Research Chemicals (6$^{th}$ ed. 1996); Joseph R. Lakowicz, Principles of Fluorescence Spectroscopy (2$^{nd}$ ed. 1999); and Richard J. Lewis, Sr., Hawley's Condensed Chemical Dictionary (12$^{th}$ ed. 1993).

TECHNICAL FIELD

The invention relates to compounds based on squaraine dyes among others. More particularly, the invention relates to compounds based on squaric acid derivatives, among others that are useful as dyes and luminescent reporters.

BACKGROUND

Colorimetric and/or luminescent compounds may offer researchers the opportunity to use color and light to analyze samples, investigate reactions, and perform assays, either qualitatively or quantitatively. Generally, brighter, more photostable reporters may permit faster, more sensitive, and more selective methods to be utilized in such research.

While a colorimetric compound absorbs light, and may be detected by that absorbance, a luminescent compound, or luminophore, is a compound that emits light. A luminescence method, in turn, is a method that involves detecting light emitted by a luminophore, and using properties of that light to understand properties of the luminophore and its environment. Luminescence methods may be based on chemiluminescence and/or photoluminescence, among others, and may be used in spectroscopy, microscopy, immunoassays, and hybridization assays, among others.

Photoluminescence is a particular type of luminescence that involves the absorption and subsequent re-emission of light. In photoluminescence, a luminophore is excited from a low-energy ground state into a higher-energy excited state by the absorption of a photon of light. The energy associated with this transition is subsequently lost through one or more of several mechanisms, including production of a photon through fluorescence or phosphorescence.

Photoluminescence may be characterized by a number of parameters, including extinction coefficient, excitation and emission spectrum, Stokes' shift, luminescence lifetime, and quantum yield. An extinction coefficient is a wavelength-dependent measure of the absorbing power of a luminophore. An excitation spectrum is the dependence of emission intensity upon the excitation wavelength, measured at a single constant emission wavelength. An emission spectrum is the wavelength distribution of the emission, measured after excitation with a single constant excitation wavelength. A Stokes' shift is the difference in wavelengths between the maximum of the emission spectrum and the maximum of the absorption spectrum. A luminescence lifetime is the average time that a luminophore spends in the excited state prior to returning to the ground state. A quantum yield is the ratio of the number of photons emitted to the number of photons absorbed by a luminophore.

Luminescence methods may be influenced by extinction coefficient, excitation and emission spectra, Stokes' shift, and quantum yield, among others, and may involve characterizing fluorescence intensity, fluorescence polarization (FP), fluorescence resonance energy transfer (FRET), fluorescence lifetime (FLT), total internal reflection fluorescence (TIRF), fluorescence correlation spectroscopy (FCS), fluorescence recovery after photobleaching (FRAP), and their phosphorescence analogs, among others.

Luminescence methods have several significant potential strengths. First, luminescence methods may be very sensitive, because modern detectors, such as photomultiplier tubes (PMTs) and charge-coupled devices (CODs), can detect very low levels of light. Second, luminescence methods may be very selective, because the luminescence signal may come almost exclusively from the luminophore.

Despite these potential strengths, luminescence methods may suffer from a number of shortcomings, at least some of which relate to the luminophore. For example, the luminophore may have an extinction coefficient and/or quantum yield that is too low to permit detection of an adequate amount of light. The luminophore also may have a Stokes' shift that is too small to permit detection of emission light without significant detection of excitation light. The luminophore also may have an excitation spectrum that does not permit it to be excited by wavelength-limited light sources, such as common lasers and arc lamps. The luminophore also may be unstable, so that it is readily bleached and rendered nonluminescent. The luminophore also may have an excitation and/or emission spectrum that overlaps with the well-known autoluminescence of biological and other samples; such autoluminescence is particularly significant at wavelengths below about 600 nm. The luminophore also may be expensive to synthesize, especially if it is difficult to manufacture. The luminophore may be highly quenched when labeled to proteins or other biomolecules at higher dye-to-biomolecule ratios. The aim of the current application is to increase the range of absorption and emission wavelength for water-soluble squaraine rotaxanes that are suitable for biological applications by synthesizing novel furan, pyrrole and thiophene based rotaxanes and substitution of the central p-xylylenediamine ring systems in these rotaxanes with substituents other than hydrogen or methyl groups.

SUMMARY

Luminescent reporter compounds that are rotaxanes having the structure

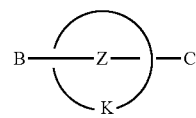

where B—Z—C is a reporter molecule based on a squaraine type molecule, or similar reporter, and K is a macrocycle that encircles and interlocks with the reporter molecule. Applications of the reporter compounds are provided, as well as reactive intermediates used to synthesize the reporter compounds, and methods of synthesizing the reporter compounds.

DETAILED DESCRIPTION

Figure 1:
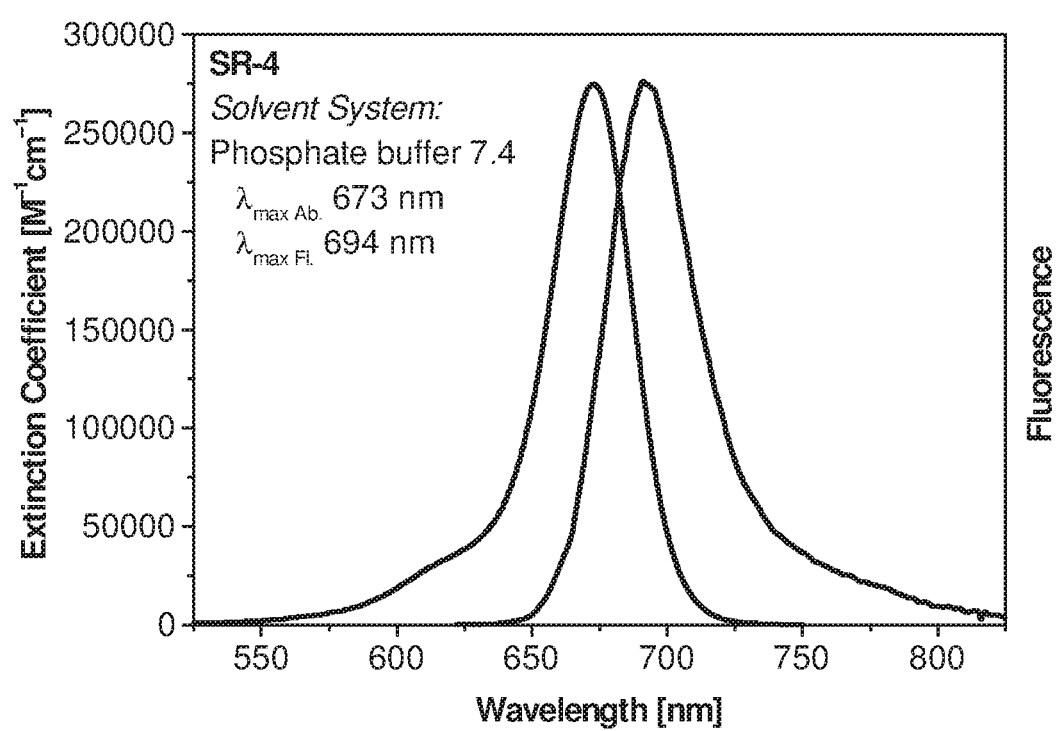
FIG. 1 is a plot showing the absorption and emission spectrum of squaraine-rotaxane compound SR-3 in phosphate buffer 7.4.

The invention relates generally to photoluminescent compounds and their synthetic precursors, and to methods of synthesizing and using such compounds. These photoluminescent compounds may be useful in both free and conjugated forms, as probes, labels, and/or indicators. This usefulness may reflect in part enhancement of one or more of the following: quantum yield, fluorescent lifetime, Stokes' shift, extinction coefficients, photostability and chemical stability. This usefulness also may reflect excitation and emission spectra in relatively inaccessible regions of the spectrum, including the red and near infrared.

More particularly, the invention provides novel rotaxane reporter compounds based on squaric acid, among others, and reactive intermediates used to synthesize the reporter compounds, and methods of synthesizing and using the reporter compounds, among others.

Rotaxanes are a class of mechanically-interlocked molecular complexes. In the case of rotaxanes, the complex includes an at least partially "dumbbell-shaped" molecule that is threaded through the central cavity of a macrocyclic molecule. Although there are typically no covalent bonds between the two components of the rotaxane, the two components remain interlocked, because the ends of the "dumbbell-shaped" molecule are larger than the internal diameter of the macrocycle cavity. Where the molecule threaded through the macrocycle is a luminescent reporter molecule, the presence of the macrocycle can confer enhanced stability on the reporter molecule.

The remaining discussion includes (1) an overview of structures, (2) an overview of synthetic methods, and (3) a discussion of the applications of the invention.

Abbreviations

The following abbreviations, among others, may be used in this application:

| Abbreviation | Definition |
| --- | --- |
| BSA | bovine serum albumin |
| Bu | butyl |
| DMF | dimethylformamide |
| D/P | dye-to-protein ratio |
| Et | ethyl |
| g | grams |
| h | hours |
| HSA | human serum albumin |
| L | liters |
| m | milli ($10^{-3}$) |
| M | molar |
| Me | methyl |
| nm | nanometer ($10^{-9}$ meter) |
| NHS | N-hydroxysuccinimide |
| NIR | near infrared region |
| PBS | phosphate-buffered saline |
| TSTU | N,N,N',N'-tetramethyl(succinimido)uronium tetrafluoroborate |

Overview of Structures

The reporter compounds relate generally to the following rotaxane structure:

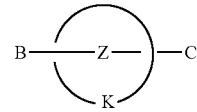

where B—Z—C is a reporter molecule and K is a macrocycle that encircles and interlocks with the reporter molecule.

The macrocycle K has the formula $K^1$, $K^2$, $K^3$, where $K^1$ is

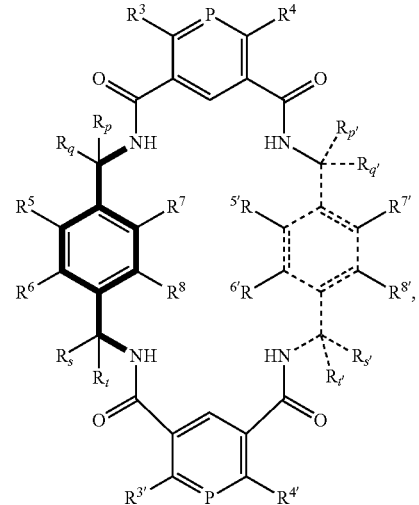

$K^2$ is

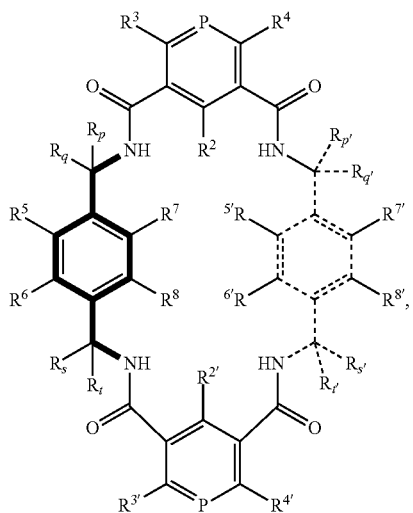

and
$K^3$ is

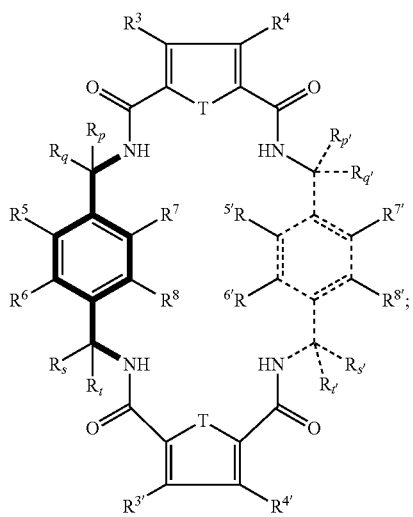

where $R^2$, $R^3$, $R^4$, $R^5$, $R^6$, $R^7$, $R^8$, $R^{2'}$, $R^{3'}$, $R^{4'}$, $R^{5'}$, $R^{6'}$, $R^{7'}$, $R^{8'}$ and $R_p$, $R_q$, $R_s$, $R_t$, $R_{p'}$, $R_{q'}$, $R_{s'}$, $R_{t'}$ are described in detail below.

T is O, S, N—H; L is a linker, $R^x$ is a reactive group; $S_c$ is a conjugated substance;

P is either $CR^3$, N, or $^+$N—$R^3$ or $^+$O;

$R^\pm$ is an ionic group;

Z is

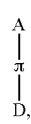

where π is a four-membered aromatic ring and A, B, C and D are the substituents of the four-membered ring;

wherein B and C are separated by one of A or D, and B is one of $W^2$, $W^4$, $W^6$, $W^8$, $W^{10}$, $W^{14}$, $W^{16}$, $W^{18}$, $W^{20}$, $W^{22}$, $W^{24}$, $W^{26}$ or $W^{28}$ and C is one of $W^1$, $W^3$, $W^5$, $W^7$, $W^9$, $W^{11}$, $W^{13}$, $W^{15}$, $W^{17}$, $W^{19}$, $W^{21}$, $W^{23}$, $W^{25}$ or $W^{27}$ in which case one of A or D is negatively charged; A and D are defined in detail below.

$W^1$, $W^2$, $W^3$, $W^4$, $W^5$, $W^6$, $W^7$, $W^8$, $W^9$, $W^{10}$, $W^{11}$, $W^{12}$, $W^{13}$, $W^{14}$, $W^{15}$, $W^{16}$, $W^{17}$, $W^{18}$, $W^{19}$, $W^{20}$, $W^{21}$, $W^{22}$, $W^{23}$, $W^{24}$, $W^{25}$, $W^{26}$, $W^{27}$ and $W^{28}$ have the respective formulae

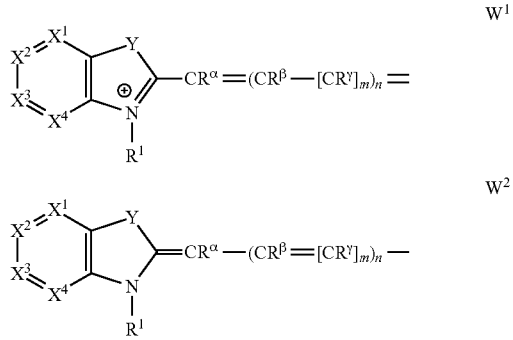

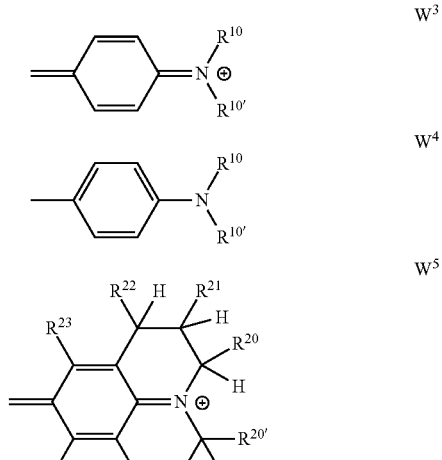

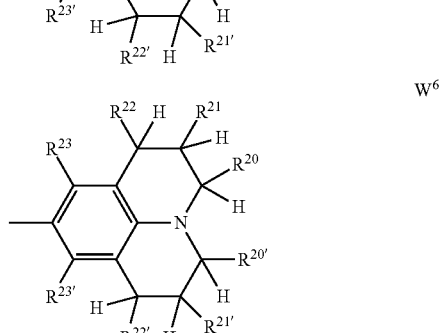

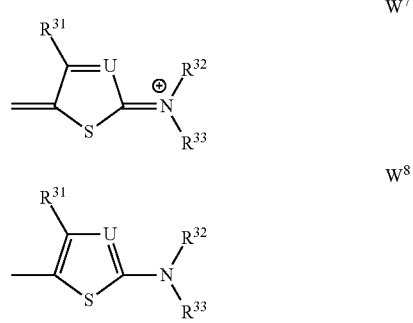

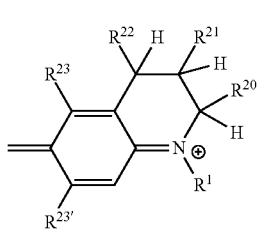 W⁹
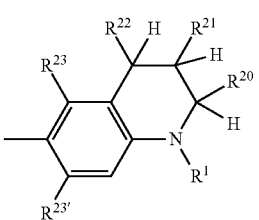 W¹⁰
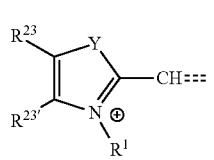 W¹¹
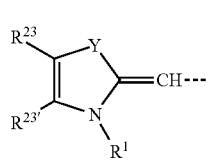 W¹²
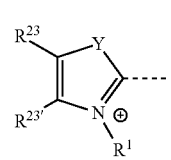 W¹³
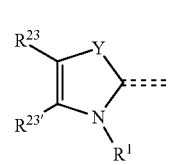 W¹⁴
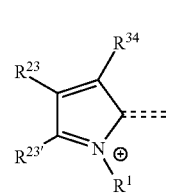 W¹⁵
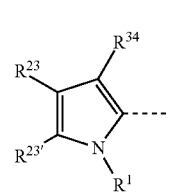 W¹⁶
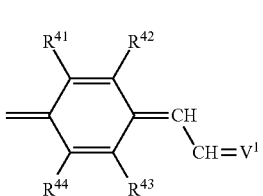 W¹⁷
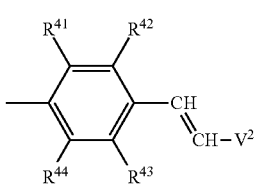 W¹⁸
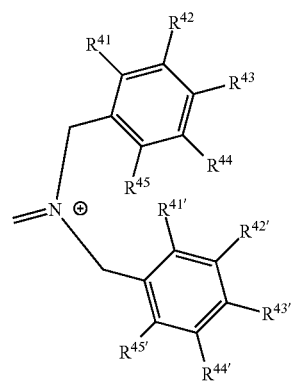 W¹⁹
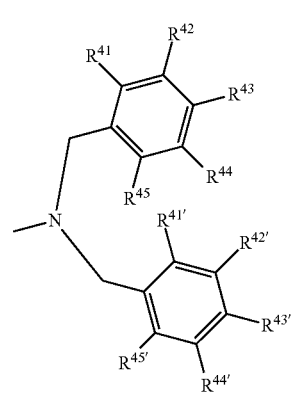 W²⁰
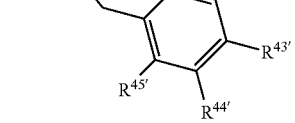 W²¹
 W²²
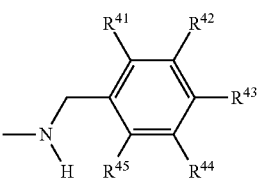 W²³
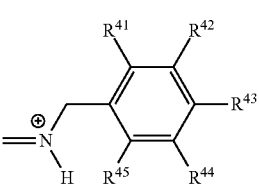 W²⁴

-continued

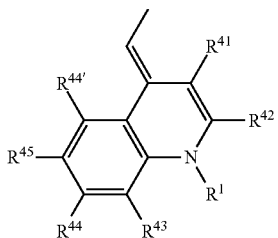
W<sup>25</sup>

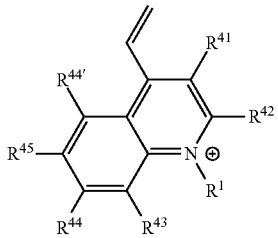
W<sup>26</sup>

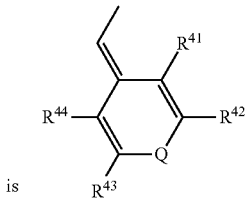
is W<sup>27</sup>

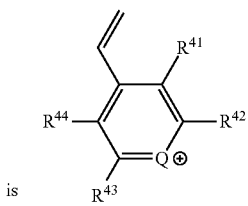
is W<sup>28</sup> respectively.

The components $R^1$, $R^a$, $R^b$, $R^c$, $R^g$, $R^h$, $R^\alpha$, $R^\beta$, $R^\gamma$, $R^\tau$, $R^{20}$ to $R^{23}$, $R^{31}$, $R^{32}$, $R^{33}$, $R^{34}$, $R^{41}$, $R^{42}$, $R^{43}$, $R^{44}$, $R^{45}$, $R^{41'}$, $R^{42'}$, $R^{43'}$, $R^{44'}$, $R^{45'}$, $R^{51}$ and $R^{52}$, m, n, $X^1$, $X^2$, $X^3$, $X^4$, Y, U, $V^1$, $V^2$ and others are defined in detail in the Detailed Description. Alternatively, or in addition, the compound may include a reactive group and/or a carrier. Alternatively, or in addition, A, B, C, and D may be chosen so that the compound is photoluminescent.

The particular substituents on the rings may be chosen quite broadly, and may include the various components listed above, among others. Selection of a particular combination of substituents may be used to fine-tune the spectral properties of the reporter compound, alter the hydrophilicity or hydrophobicity or the reporter compound, or otherwise tailor the properties of the reporter compound to a particular application.

The applications and methods relate generally to the synthesis and/or use of reporter compounds, especially those described below.

Reporter Compounds

Where the reporter compound is a colorimetric dye and/or a photoluminescent compound based on an aromatic center, B and C are typically chosen from $W^1$ and $W^2$, and B and C are separated by A and D. The reporter compounds may be colorimetric dyes, useful as stains and for colorimetric detection. Alternatively or in addition, the reporter compounds may be photoluminescent, particularly fluorescent, and may have utility in photoluminescence assays and methods, as discussed above.

Important precursors for these rotaxanes are described in the experimental section.

Reactive Groups $R^x$

The substituents of Z or K may include one or more reactive groups, where a reactive group generally is a group capable of forming a covalent attachment with another molecule or substrate. Such other molecules or substrates may include proteins, carbohydrates, nucleic acids, and plastics, among others. Reactive groups vary in their specificity and may preferentially react with particular functionalities and molecule types. Thus, reactive compounds generally include reactive groups chosen preferentially to react with functionalities found on the molecule or substrate with which the reactive compound is intended to react.

The compounds of the invention are optionally substituted, either directly or via a substituent, by one or more chemically reactive functional groups that may be useful for covalently attaching the compound to a desired substance. Each reactive group, or $R^x$, may be bound to the compound directly by a single covalent bond, or may be attached via a covalent spacer or linkage, L, and may be depicted as -L-$R^x$.

The reactive functional group of the invention $R^x$ may be selected from the following functionalities, among others: activated carboxylic esters, acyl azides, acyl halides, acyl halides, acyl nitriles, acyl nitriles, aldehydes, ketones, alkyl halides, alkyl sulfonates, anhydrides, aryl halides, aziridines, boronates, carboxylic acids, carbodiimides, diazoalkanes, epoxides, haloacetamides, halotriazines, imido esters, isocyanates, isothiocyanates, maleimides, phosphoramidites, silyl halides, sulfonate esters, and sulfonyl halides.

In particular, the following reactive functional groups, among others, are particularly useful for the preparation of labeled molecules or substances, and are therefore suitable reactive functional groups for the purposes of the reporter compounds:

a) N-hydroxysuccinimide esters, isothiocyanates, and sulfonylchlorides, which form stable covalent bonds with amines, including amines in proteins and amine-modified nucleic acids;
b) Iodoacetamides and maleimides, which form covalent bonds with thiol-functions, as in proteins;
c) Carboxyl functions and various derivatives, including N-hydroxybenztriazole esters, thioesters, p-nitrophenyl esters, alkyl, alkenyl, alkynyl, and aromatic esters, and acyl imidazoles;
d) Alkylhalides, including iodoacetamides and chloroacetamides;
e) Hydroxyl groups, which can be converted into esters, ethers, and aldehydes and iodoacetamides;
f) Aldehydes and ketones and various derivatives, including hydrazones, oximes, and semicarbazones;
g) Isocyanates, which may react with amines;
h) Activated C=C double-bond-containing groups, which may react in a Diels-Alder reaction to form stable ring systems under mild conditions;
i) Thiol groups, which may form disulfide bonds and react with alkylhalides (such as iodoacetamide);
j) Alkenes, which can undergo a Michael addition with thiols, e.g., maleimide reactions with thiols;
k) Phosphoramidites, which can be used for direct labeling of nucleosides, nucleotides, and oligonucleotides, including primers on solid or semi-solid supports;

l) Primary amines that may be coupled to a variety of groups including carboxyl, aldehydes, ketones, and acid chlorides, among others;
m) Boronic acid derivatives that may react with sugars;
n) Pyrylium moieties that react with primary amines;
o) Haloplatinates that form stable platinum complexes with amines, thiols and heterocycles;
p) Aryl halides that react with thiols and amines;
q) Azides, alkynes, DBCO, tetrazines and other functionalities that enable click-chemistry reactions.

R Groups

The R moieties associated with the various substituents of Z may include any of a number of groups, as described above, including but not limited to alicyclic groups, aliphatic groups, aromatic groups, and heterocyclic rings, as well as substituted versions thereof.

Aliphatic groups may include groups of organic compounds characterized by straight- or branched-chain arrangements of the constituent carbon atoms. Aliphatic hydrocarbons comprise three subgroups: (1) paraffins (alkanes), which are saturated and comparatively unreactive; (2) olefins (alkenes or alkadienes), which are unsaturated and quite reactive; and (3) acetylenes (alkynes), which contain a triple bond and are highly reactive. In complex structures, the chains may be branched or cross-linked and may contain one or more heteroatoms (such as polyethers and polyamines, among others).

As used herein, "alicyclic groups" include hydrocarbon substituents that incorporate closed rings. Alicyclic substituents may include rings in boat conformations, chair conformations, or resemble bird cages. Most alicyclic groups are derived from petroleum or coal tar, and many can be synthesized by various methods. Alicyclic groups may optionally include heteroalicyclic groups that include one or more heteroatoms, typically nitrogen, oxygen, or sulfur. These compounds have properties resembling those of aliphatics and should not be confused with aromatic compounds having the hexagonal benzene ring. Alicyclics may comprise three subgroups: (1) cycloparaffins (saturated), (2) cycloolefins (unsaturated with two or more double bonds), and (3) cycloacetylenes (cyclynes) with a triple bond. The best-known cycloparaffins (sometimes called naphthenes) are cyclopropane, cyclohexane, and cyclopentane; typical of the cycloolefins are cyclopentadiene and cyclooctatetraene. Most alicyclics are derived from petroleum or coal tar, and many can be synthesized by various methods.

Aromatic groups may include groups of unsaturated cyclic hydrocarbons containing one or more rings. A typical aromatic group is benzene, which has a 6-carbon ring formally containing three double bonds in a delocalized ring system. Aromatic groups may be highly reactive and chemically versatile. Most aromatics are derived from petroleum and coal tar. Heterocyclic rings include closed-ring structures, usually of either 5 or 6 members, in which one or more of the atoms in the ring is an element other than carbon, e.g., sulfur, nitrogen, etc. Examples include pyridine, pyrole, furan, thiophene, and purine. Some 5-membered heterocyclic compounds exhibit aromaticity, such as furans and thiophenes, among others, and are analogous to aromatic compounds in reactivity and properties.

Any substituent of the compounds of the invention, including any aliphatic, alicyclic, or aromatic group, may be further substituted one or more times by any of a variety of substituents, including without limitation, F, Cl, Br, I, carboxylic acid, sulfonic acid, CN, nitro, hydroxy, phosphate, phosphonate, sulfate, cyano, azido, amine, alkyl, alkoxy, trialkylammonium or aryl. Aliphatic residues can incorporate up to six heteroatoms selected from N, O, S. Alkyl substituents include hydrocarbon chains having 1-22 carbons, more typically having 1-6 carbons, sometimes called "lower alkyl".

As described in WO 2001/11370, sulfonamide groups such as $-(CH_2)_n-SO_2-NH-SO_2-R$, $-(CH_2)_n-CONH-SO_2-R$, $-(CH_2)_n-SO_2-NH-CO-R$, and $-(CH_2)_n-SO_2NH-SO_3H$, where R is aryl or alkyl and n=1-6, can be used to reduce the aggregation tendency and have positive effects on the photophysical properties of cyanines and related dyes, in particular when these functionalities are directly associated with the benzazole ring in position 1 (the nitrogen atom in the azole ring).

Where a substituent is further substituted by a functional group $R^\pm$ that is ionically charged, such as, for example, a carboxylic acid, sulfonic acid, phosphoric acid, phosphonic acid, or a quaternary ammonium group, the ionic substituent $R^\pm$ may serve to increase the overall hydrophilic nature of the compound.

As used herein, functional groups such as "carboxylic acid," "sulfonic acid," "phosphoric acid," and "phosphonic acid" include the free acid moiety as well as the corresponding metal salts of the acid moiety, and any of a variety of esters or amides of the acid moiety, including without limitation alkyl esters, aryl esters, and esters that are cleavable by intracellular esterase enzymes, such as alpha-acyloxyalkyl ester (for example acetoxymethyl esters, among others).

The compounds of the invention are optionally further substituted by a reactive functional group $R^x$, or a conjugated substance $S_c$, as described below.

The compounds of the invention may be depicted in structural descriptions as possessing an overall charge. It is to be understood that the compounds depicted include an appropriate counter ion or counter ions to balance the formal charge present on the compound.

Further, the exchange of counter ions is well known in the art and readily accomplished by a variety of methods, including ion-exchange chromatography and selective precipitation, among others.

Carriers and Conjugated Substances $S_c$

The reporter compounds of the invention, including synthetic precursor compounds, may be covalently or noncovalently associated with one or more substances. Covalent association may occur through various mechanisms, including a reactive functional group as described above, and may involve a covalent linkage, L, separating the compound or precursor from the associated substance (which may therefore be referred to as -L-$S_c$).

The covalent linkage L binds the reactive group $R^x$, the conjugated substance $S_c$ or the ionic group $R^\pm$ to the dye molecule, either directly (L is a single bond) or with a combination of stable chemical bonds, that include single, double, triple or aromatic carbon-carbon bonds; carbon-sulfur bonds, carbon-nitrogen bonds, phosphorus-sulfur bonds, nitrogen-nitrogen bonds, nitrogen-oxygen or nitrogen-platinum bonds, or aromatic or heteroaromatic bonds; L includes ether, thioether, carboxamide, sulfonamide, urea, urethane or hydrazine moieties. Preferable L's include a combination of single carbon-carbon bonds and carboxamide or thioether bonds.

Where the substance is associated noncovalently, the association may occur through various mechanisms, including incorporation of the compound or precursor into or onto a solid or semisolid matrix, such as a bead or a surface, or by nonspecific interactions, such as hydrogen bonding, ionic bonding, or hydrophobic interactions (such as Van der Waals forces).

The associated carrier may be selected from the group consisting of polypeptides, polynucleotides, carbohydrades, nucleic acids, nucleotide triphosphates, polysaccharides, haptens, RNAs, PNAs, beads, microplate well surfaces, metal surfaces, semiconductor and non-conducting surfaces, nano-particles, and other solid surfaces.

The associated or conjugated substance may be associated with or conjugated to more than one reporter compound, which may be the same or different. Generally, methods for the preparation of dye-conjugates of biological substances are well-known in the art. See, for example, Haugland, Handbook of Fluorescent Probes and Research Chemicals, Sixth Edition (1996), which is hereby incorporated by reference. Typically, the association or conjugation of a chromophore or luminophore to a substance imparts the spectral properties of the chromophore or luminophore to that substance.

Useful substances for preparing conjugates according to the present invention include, but are not limited to, amino acids, peptides, proteins, nucleosides, nucleotides, nucleic acids, carbohydrates, haptens, lipids, ion-chelators, nonbiological polymers, cells, and cellular components. The substance to be conjugated may be protected on one or more functional groups in order to facilitate the conjugation, or to insure subsequent reactivity.

Where the substance is a peptide, the peptide may be a dipeptide or larger, and typically includes 5 to 36 amino acids. Where the conjugated substance is a protein, it may be for example, an enzyme, an antibody, lectin, protein A, protein G, hormones, a peridinin-chlorophyll-protein (PerCP) or a phycobiliprotein. The conjugated substance may be a nucleic acid polymer, such as for example DNA oligonucleotides, RNA oligonucleotides (or hybrids thereof), or single-stranded, double-stranded, triple-stranded, or quadruple-stranded DNA, or single-stranded or double-stranded RNA.

Another class of carriers includes carbohydrates that are polysaccharides, such as dextran, heparin, glycogen, starch and cellulose.

Where the substance is an ion chelator, the resulting conjugate may be useful as an ion indicator (calcium, sodium, magnesium, zinc, potassium and other important metal ions) particularly where the optical properties of the reporter-conjugate are altered by binding a target ion. Preferred ion-complexing moieties are crown ethers (U.S. Pat. No. 5,405,957) and BAPTA chelators (U.S. Pat. No. 5,453,517).

Other important carriers may include nanoparticles such as carbon-nanotubes, nanowires, silicon nanoparticles, quantum dots, gold and silver nanoparticles and other nanomaterials.

The associated or conjugated substance may be a member of a specific binding pair, and therefore useful as a probe for the complementary member of that specific binding pair, each specific binding pair member having an area on the surface or in a cavity which specifically binds to and is complementary with a particular spatial and polar organization of the other. The conjugate of a specific binding pair member may be useful for detecting and optionally quantifying the presence of the complementary specific binding pair member in a sample, by methods that are well known in the art.

Representative specific binding pairs may include ligands and receptors, and may include but are not limited to the following pairs: antigen-antibody, biotin-avidin, biotin-streptavidin, IgG-protein A, IgG-protein G, carbohydrate-lectin, enzyme-enzyme substrate; ion-ion-chelator, hormone-hormone receptor, protein-protein receptor, drug-drug receptor, DNA-antisense DNA, and RNA-antisense RNA.

Preferably, the associated or conjugated substance includes proteins, carbohydrates, nucleic acids, and nonbiological polymers such as plastics, metallic nanoparticles such as gold, silver and carbon nanostructures among others. Further carrier systems include cellular systems (animal cells, plant cells, bacteria). Reactive dyes can be used to label groups at the cell surface, in cell membranes, organelles, or the cytoplasm.

Finally these compounds can be linked to small molecules such as amino acids, vitamins, drugs, haptens, toxins, environmental pollutants, but also triplet state quenchers such as trolox (vitamin E), p-nitrobenzyl alcohol (NBA), 6-mercaptoethanol (BME), mercaptoethylamine (MEA), n-propyl gallate, 1,4-diazabicyclo[2.2.2]octane (DABCO), and cyclooctatetraene (COT). Another important ligand is tyramine, where the conjugate is useful as a substrate for horseradish peroxidase. Additional embodiments are described in U.S. Patent Application Publication No. US2002/0077487 as well as U.S. Provisional Patent Application Ser. Nos. 62/568,587 and 62/545,302, the disclosures of which are incorporated by reference.

Synthesis a) Dye Components

The synthesis of the disclosed reporter compounds typically is achieved in a multi-step reaction, starting with the synthesis of a methylene base. The synthesis of suitable methylene bases can be achieved based on literature or novel methods. Generally, the spectral properties of the reporter compounds, including excitation and emission wavelengths for luminescent compounds, may be strongly dependent on the type of methylene base used. Typical starting materials include quarternized indolenines, benzthiazoles, benzoxazoles, benzimidazoles among others, and squaric acid and its derivatives.

For aniline-based squaraine dyes typical starting materials are various aniline-derivatives and squaric acid.

The dye molecules of this invention typically consist of a bridging unit and the heterocyclic bases $W^1$ and $W^2$, $W^3$ and $W^4$, $W^5$ and $W^6$, $W^7$ and $W^8$, $W^9$ and $W^{10}$, $W^{11}$ and $W^{12}$, $W^{13}$ and $W^{14}$, $W^{15}$ and $W^{16}$, $W^{17}$ and $W^{18}$, $W^{19}$ and $W^{20}$, $W^{21}$ and $W^{22}$, $W^{23}$ and $W^{24}$, $W^{25}$ and $W^{26}$, $W^{27}$ and $W^{28}$ or a combination thereof.

With regards to the aniline based dyes, the aniline-moiety may be directly connected to the squaraine center or like in Wand $W^{18}$ contain additional groups that help shifting the wavelength into the red and NIR region.

Squaraine dyes are synthesized using squaric acid or one of its derivatives as starting materials and reacting them with a methylene base or substituted aniline to form the dye.

The synthesis of intermediates for the synthesis of aniline-based squaraine dyes are described in Example 2 and more comprehensively in U.S. Pat. No. 8,642,014.

Squaric acid is a dibasic acid that undergoes a series of nucleophilic substitution reactions with various reagents, including amines, phenols, and CH-acidic compounds such as 1,2,3,3-tetramethyl-benzindole. The squaraine bridge in the resulting compounds stabilizes the conjugated chain and shifts the excitation and emission wavelength of these dyes as compared to cyanine-based dyes. The exchange of the oxygen in the squaraine moiety by an imino ($=$N—R), sulfur ($=$S), or a methylene ($=$CR$_2$) moiety was also shown to be a pathway to dyes with useful luminescent properties.

The spectral properties of squaraine dyes can be modified by thio-, imino- and methylene-derivatization of the squaraine bridge.

In general, squaraine-based markers exhibit low to moderate quantum yields in water ($\phi=0.05$-$0.3$) and very high quantum yields (up to $\phi=0.7$) when covalently or non-covalently bound to biomolecules or in organic solvents. The absorption and emission wavelengths of the reporter compounds may be tuned by variation of the methylene base (e.g. indolenine vs. benzothiazole) and by an increase or decrease of the length of the conjugated carbon chain. Thus, the indolenine-squaraines absorb around 635 nm to 650 nm in water. The absorption and emission spectra of benzothiazolium and benzoselenazolium based dyes are shifted towards longer wavelengths. The emission maxima for benzothiazole based squaraine dyes in organic solvents are around 680 nm to 690 nm and can be found beyond 700 nm for benzoselenazole derivatives.

Benzoxazole and oxazole based squaraines absorb and emit even at shorter wavelengths than indolenine-based squaraines. The synthesis of benzoxazole-squaraines and other squaraines based on five-membered heterocyclic rings that absorb and emit between 500 and 600 nm is described in WO 2003/087052.

Information about the synthesis of starting materials and precursors for squaraine dyes are provided in Examples 1 and 2.

To enhance water-solubility, sulfonic acid or other groups such as including quaternary ammonium, polyether, carboxyl, and phosphate, among others, may be introduced into the heterocyclic ring systems. In order to facilitate covalent attachment to proteins, reactive N-hydroxysuccinimide ester (NHS ester) or other reactive derivatives may be synthesized.

Many compounds of the invention have an overall electronic charge. It is to be understood that when such electronic charges are present, that they are balanced by an appropriate counter-ion, which may or may not be identified.

b) Rotaxanes

The encapsulation procedures that are utilized to synthesize the rotaxanes of this invention depend on the type of the encapsulating species used: one way to synthesize these rotaxanes is using the templated amide macrocylization chemistry developed by Leigh et al. [Angew. Chem. Int. Ed. 36(7), 728-732 (1997); Chem. Eur. J. 2004, 10, 4960-4969].

In this approach the dye component is dissolved in an inert solvent (depending on solubility of the compounds chloroform, or solvent mixtures might be used) and then titrated with equimolar amounts of diacid dichloride and xylylenediamine (e.g. 2,6 pyridinedicarbonyl dichloride or isophthaloyl dichloride and p-xylylenediamine) in presence of NEt$_3$ as base. Depending on the nature of the rotaxanes formed under these conditions they are purified either by reversed-phase or silica column chromatography. The reported synthetic yields are generally between 5 and 30%.

An encapsulation procedure for a non-reactive, aniline-type squaraine dye was reported by Arunkumar et al. in Chem. Eur. J. 2006, 12, 4684-4690.

It is also understood that the building blocks in Leigh-type amide rotaxanes are exchangeable and they can be substituted with a variety of substituents:

Dimethoxy-substituted versions of p-xylylenediamine, synthesized via reduction of 2,5-dicyano-hydroquinone-dimethylether with LiAlH$_4$ have been described by Schill et al. in Liebigs Ann. Chem. 1973, 2055. A nitro-derivative of p-xylylenediamine that can be reduced to a reactive amino-function after the rotaxane ring is synthesized was described by Lustig in Chem. Ber. 28, 2987 (1895).

The pyridine heterocycle of the dicarbonyl dichloride component in rotaxanes can be replaced with other heterocyclic components such as a thiophene, pyrrol or furan. 2,5-thiophene-dicarbonyl dichloride is commercially available from Aldrich or Matrix Scientific. 3,4-dimethoxy-2,5-furandicarboxylic acid, the precursor for the synthesis of the acid chloride is also available from Aldrich and can be converted into the acid chloride by treatment with PCl$_5$ or acetyl chloride according to Klinkhardt, J. Prakt. Chem. (2), 25, 1882, 51 or Lewkowski, Pol. J. Chem. 75, 12, 1943-46 (2001). The 1H-pyrrole-2,5-dicarbonyl dichloride synthesis from dicarboxylic acid precursors which are available from Aldrich is described by Zielinski et al., Tetrahedron 61 (16), 4081-90 (2005). Starting materials like 3,4-Diethyl-1H-pyrrole-2,5-dicarboxylic acid (L164216), 3,4-Ethylenedioxypyrrole-2,5-dicarboxylic acid (637203), 4-Methyl-3-(2-nitroethyl)-2,5-pyrroledicarboxylic acid (S951072), 3,4-Bis(2,2,3,3,4,4,4-heptafluorobutyl)-1H-pyrrole-2,5-dicarboxylic acid (L165859) are available from Aldrich. Additional references for other precursors are provided in U.S. Pat. No. 8,642,014 and other literature listed in here.

To the best of our knowledge, squaraine rotaxanes based on K3 macrocycles containing furan, thiophene and pyrrole ring systems have not been synthesized or published before.

Spectral and Photophysical Properties

The macrocyclic encapsulation of squaraine dyes helps to improve on the aggregation tendencies and the quenching effect of these dyes that causes a reduction in quantum yield in aqueous solution. In addition, such encapsulation may yield luminescent compounds that have longer luminescent lifetimes in water as compared to conventional non-encapsulated dyes. Such encapsulation procedure could also help to improve in the properties of squaraine dyes, in particular where such encapsulation prevents the occurrence of photo-induced isomerization reactions.

Dye compositions that are described in this invention can be encapsulated to yield luminescent compounds with improved properties for luminescence detection in bioanalytical and imaging applications.

The encapsulation of NIR based squaraine dyes are in particular interesting for imaging applications as the formation of rotaxanes typically increases the photostability and brightness of these dyes.

Examples of NIR squaraines are provided in ACS Nano, 2015, 9 (6), pp 5695-5704, or Org. Biomol. Chem., 2012, 10, 911-920.

The novel dye compositions that are introduced herein are aimed at improving the shortcomings of conventional squaraine dyes such as limited excitation and emission wavelengths, short lifetimes and low quantum yields in aqueous solution. The short lifetimes and low quantum yields can mostly be attributed to quenching and aggregation of the dye molecules in aqueous solution. The novel structural features that are introduced in this invention might also help to reduce the self-aggregation and quenching tendencies of these labels. Further, some of these dye compositions exhibit improved chemical and photochemical stability. Most importantly, the invention aims at producing water-soluble, longer wavelength, luminescent bio- and protein-conjugates that are less prone to reducing their quantum yields at higher dye-to-protein ratios, as is the case with many other luminescent labels, including squaraines. The effects of the substitution of the central p-xylylenediamine ring can be clearly demonstrated with the comparison of the fluorinated SR-4 and the conventional squaraine rotaxane SR-2 below, where a long-wavelength shift of the absorption and emission spectra, and an increase in the lifetime and quantum yields are observed.

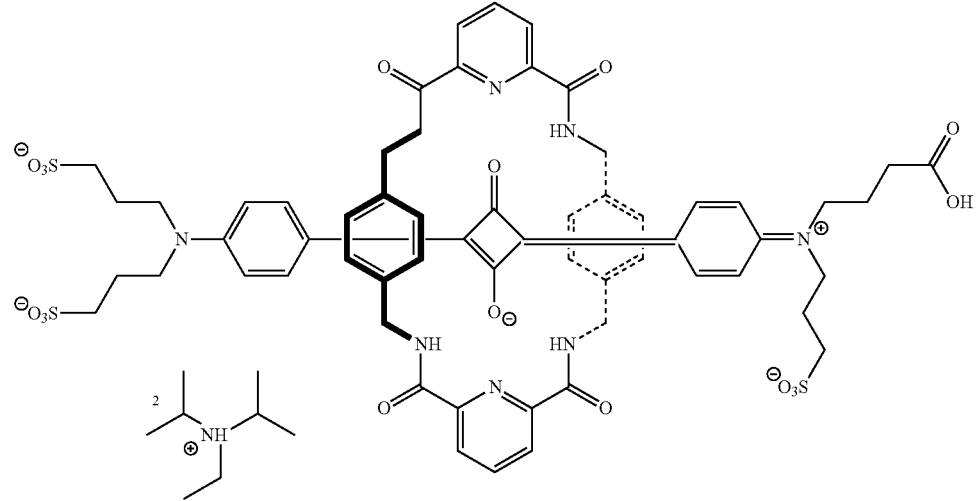
SR-2
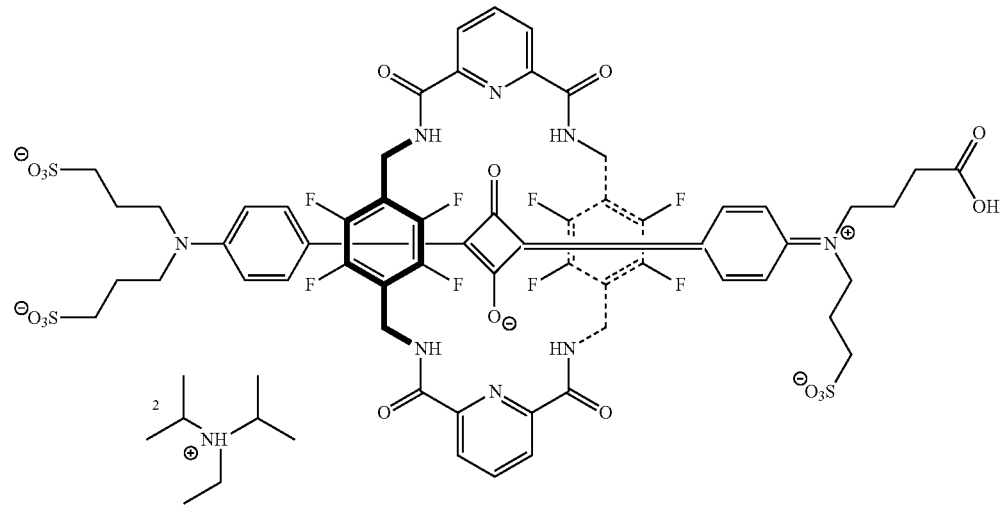
SR-4

| Dye | λ$_{max}$ (abs) | λ$_{max}$ (em) | Solvent | Stokes' Shift Δλ | Quantum Yield [%] | Lifetime [ns] |
|---|---|---|---|---|---|---|
| SR-2 | 654 | 674 | PB 7.4 | 20 | 28 | 0.9 |
| SR-4 | 673 | 694 | PB 7.4 | 21 | 36 | 1.6 |

A similar behaviour is also exhibited by chlorine-based squaraines: Rotaxane-formation leads to an unexpected, 30-nm bathochromic shift of the absorption and emission maxima and a more than 3-fold increase in its fluorescence lifetime and two-fold increase in quantum yield in rotaxane SR-5 as compared to the unsubstituted squaraine rotaxane dye SR-2.

Figure 7:
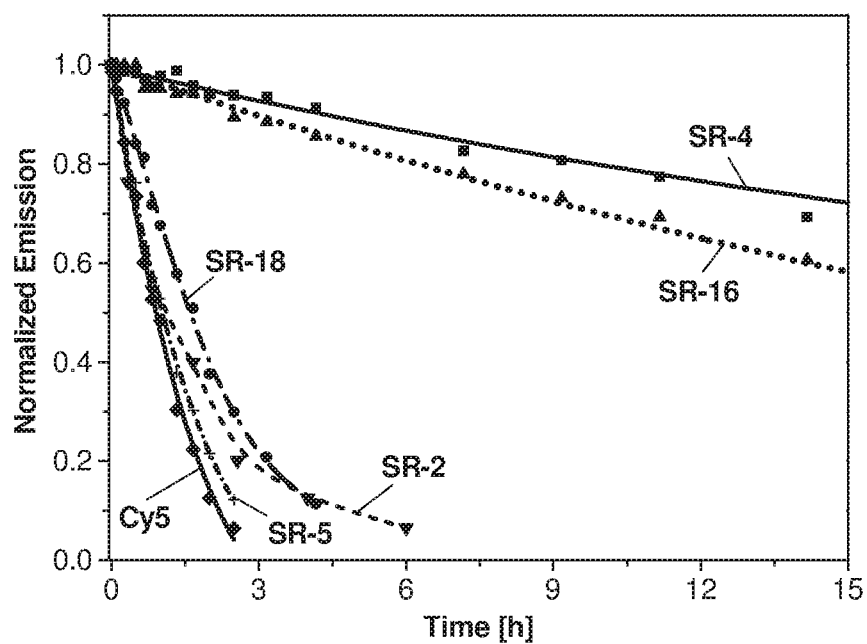
FIG. 7 is a plot showing the photostability comparison of SR-2, SR-4, SR-5, SR-16 and SR-18 against Cy5.

The photophysical, spectral and chemical properties of rotaxanes are also strongly dependent on the type of rotaxane: As compared to basic benzene-type bridging units as shown in rotaxane SR-2, halogen-based bridging units as shown in SR-4 and SR-5 seem to provide better protection of the squaraine dye in aqueous solution, which is evidenced by the remarkable increase in the quantum yield of SR-4 but more so in SR-5 as compared to SR-2:

Nevertheless, it seems that the photostability of chlorinated squaraine rotaxanes is lower as compared to fluorinated rotaxanes (FIG. 7). Substitution of the pyridine-dicarboxylic acid moiety in the outer rotaxane ring by five-membered furan, pyrrole and thiophene dicarboxylic acids allows to gradually increase the absorption and emission maxima of these squaraine-rotaxanes in the order: thiophene<pyrrole<furan~pyridine.

Increased brightness, chemical and photostability and increased Stokes' shifts are desirable features for fluorescent labels because they both permit enhanced detection, and therefore allow more sensitive measurements. Both, aniline and non-aniline type squaraines show improved features upon encapsulation by a rotaxane structure. Finally, in order to make these rotaxanes cell-permeable while still keeping them water-soluble, ionic substituents such as sulfo and phosphate groups can be replaced with methyl- or ethyl-phosphonate groups which are neutral and therefore enable penetration of such compounds through the cell membrane while at the same time facilitating water-solubility.

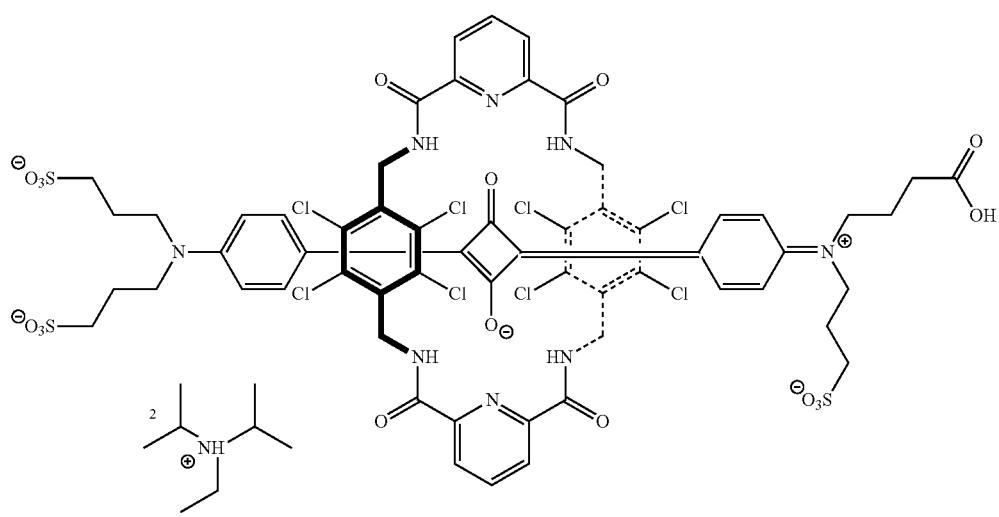

SR-5

| Dye | λ$_{max}$ (abs) | λ$_{max}$ (em) | Solvent | Stokes' Shift Δλ | Quantum Yield [%] | Lifetime [ns] |
|---|---|---|---|---|---|---|
| SR-2 | 654 | 674 | PB 7.4 | 20 | 28 | 0.90 |
| SR-5 | 683 | 705 | PB 7.4 | 22 | 58 | 2.95 |

The photophysical properties of these rotaxanes, even though they are compositions of 2 separate molecules appear to be as if they were coming from one single molecule: e.g. the anthracene-based molecules have a second small absorption band in the range between 300-400 nm stemming from the anthracene moiety. If excited at this wavelength no emission from the anthracene moiety but only emission from the squaraine dye is observed, which indicates that the energy transfer efficiency between the anthracene and the squaraine unit is very high. It is also understood that by changing the diamine moiety in the ring system one can generate rotaxanes that absorb at various wavelengths by still keeping the same emission wavelength of the encapsulated squaraine moiety. Thereby fluorophores with different excitation but the same emission maxima can be designed and synthesized.

Example 1

The synthesis of precursors and intermediates for squaraine dyes and selected indolenine-, aniline- and other precursors and intermediates for the synthesis of these novel, central p-xylylenediamine substituted squaraine rotaxanes are described in U.S. Pat. No. 8,642,014 and other literature listed therein, which is hereby incorporated in the current application. The starting materials were purchased from Sigma-Aldrich, Matrix Scientific, Fluorochem and other specific vendors. Additional references for the synthesis of squaraine dyes, amino-monosquaraines with heterocyclic moieties and aniline-type-monosquaraines with dibenzyl substituents are: Dietmar Keil, Horst Hartmann. Synthesis and characterization of a new class of unsymmetrical squaraine dyes. Dyes and Pigments, 49 (2001) 161-179; R. M. West, W. J. Cummins, R. J. D. Nairne, M. G. Bull. Squaraine dyes (PCT Patent Publication No. WO 00/58405, EP1165693) and N. Fu, J. M. Baumes, E. Arunkumar, B. C. Noll, B. D. Smith. Squaraine Rotaxanes with Boat Conformation Macrocycles. J. Org. Chem., 74 (2009) 6462.

Example 2

Synthesis of Intermediates a) Synthesis of 3-(phenylammonio)propane-1-sulfonate

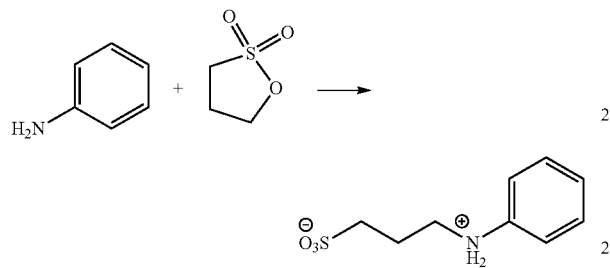

A mixture of aniline (7 mmol) and 1,3-propanesultone (10 mmol) was heated in 10 mL of acetonitrile at 120-130° C. for 9 h in a pressure tube under argon atmosphere. The product was allowed to cool to room temperature and the solid of 3-(phenylammonio)propane-1-sulfonate was filtered and air-dried. Yield: 1.43 g (95%).

b) Synthesis of 3-(3-ethyloxycarbonylpropylanilino)-1-propanesulfonate

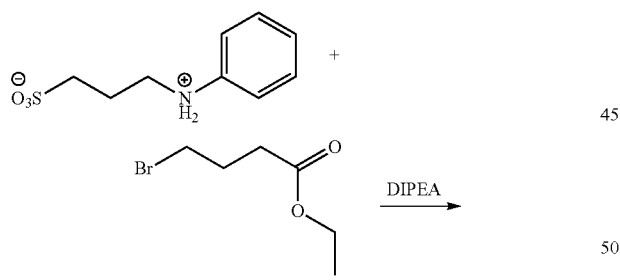

A mixture of 3-(phenylammonio)propane-1-sulfonate (10 mmol), ethyl 4-bromobutanoate (12 mmol) and N,N-diisopropylethylamine (DIPEA, 22 mmol) was heated in 10 mL acetonitrile at 120-130° C. for 6 h in a pressure tube under argon atmosphere. The solvent was removed under reduced pressure and ethyl acetate was added. The precipitated DIPEA bromide was filtered off and the filtrate was evaporated. The residue of ethyl-diisopropyl-ammonium 3-(3-ethyloxycarbonylpropylanilino)-1-propanesulfonate was dried under vacuum and used for further synthesis without further purification.

c) Synthesis of di[ethyl(diisopropyl)ammonium] 3-(3-sulfonato propylanilino)-1-propanesulfonate

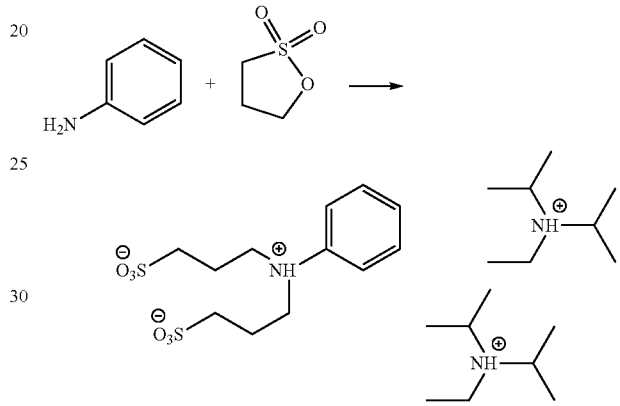

A mixture of 1 g (10 mmol) aniline, 2.58 g (21 mmol) 1,3-propanesultone and 3.87 mL (22 mmol) N,N-diisopropylethylamine (DIPEA) was heated in 20 mL of acetonitrile at 120-130° C. for 9 h in a pressure tube under argon atmosphere. The solvent was removed under reduced pressure and ethyl acetate was added. Then crystallized product was treated with ether and filtered off. Yield: 5.47 g (91%).

Example 3 a) Synthesis of Squaraine Dye 1

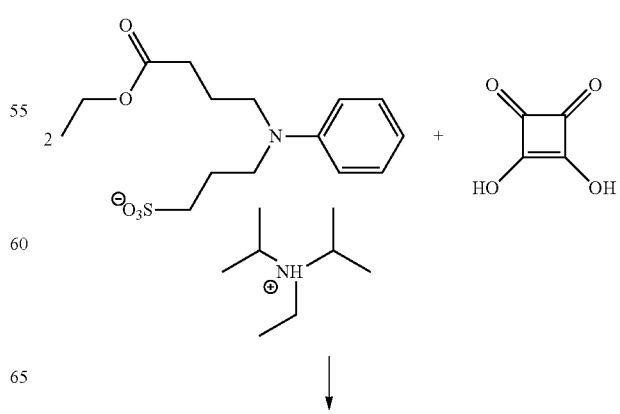

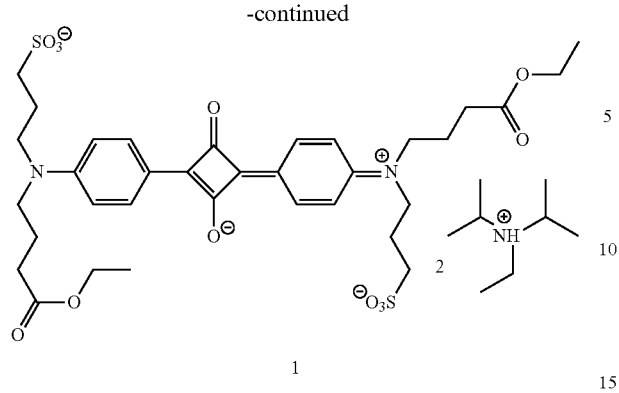

Squaric acid (138 mg, 1.21 mmol) and ethyl-diisopropyl-ammonium 3-(3-ethyloxycarbonylpropylanilino)-1-propanesulfonate (1.1 g, 2.41 mmol) were refluxed in a mixture of n-butanol (15 mL) and toluene (30 mL) for 15 h. Then the deep green reaction mixture was concentrated and the crude product was precipitated by adding 30-40 mL of ether. After filtering, the product was washed several times with ether to yield the dark green squaraine dye 1 as a solid. Yield: 563 mg (45%). $\lambda_{max}$ (abs): 644 nm, $\lambda_{max}$ (em): 670 nm, Q.Y.: 3% (water).

b) Synthesis of Squaraine Dye 2

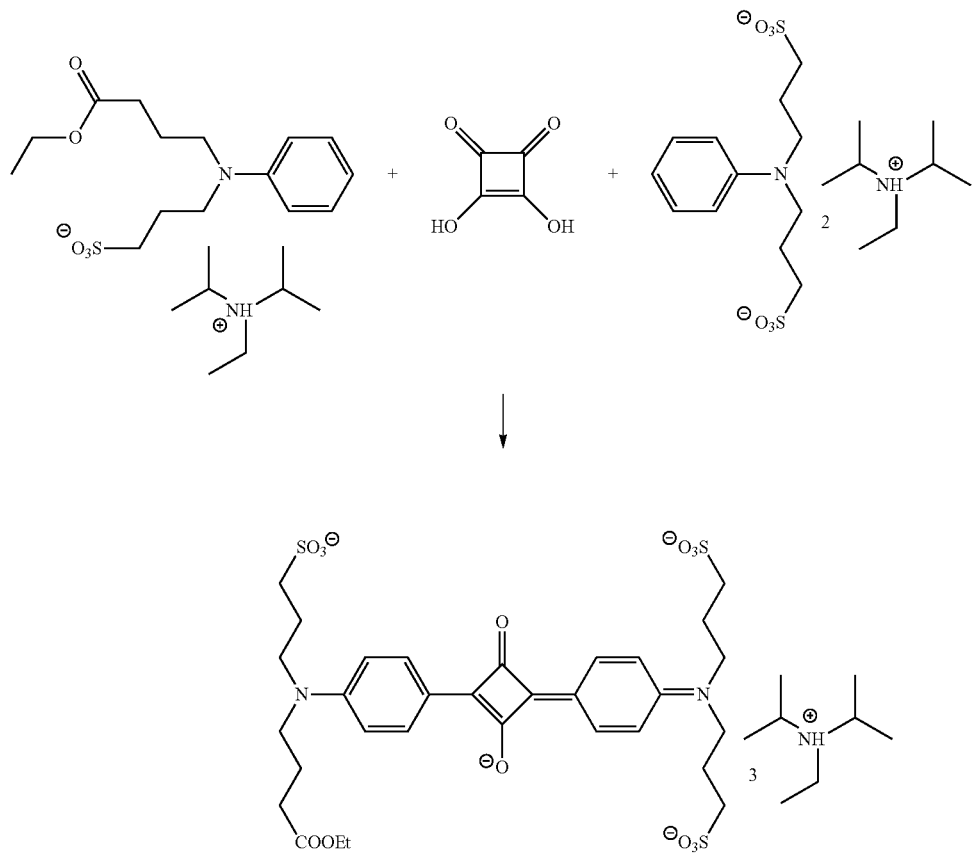

Squaric acid (386 mg, 3.39 mmol), ethyl-diisopropyl-ammonium 3-(3-ethyloxycarbonylpropylanilino)-1-propanesulfonate (1.554 g, 3.39 mmol) and di[ethyl(diisopropyl)ammonium] 3-(3-sulfonatopropylanilino)-1-propane sulfonate (1.914 g, 3.39 mmol) were refluxed in a mixture of n-butanol (15 mL) and toluene (30 mL) for 24 h. Then the dark blue reaction mixture was concentrated on a rotary evaporator and the crude product was precipitated by treatment with ether. After filtering, the product was washed several times with ether and dried in a vacuum dessicator to yield the squaraine dye 2. Yield: 783 mg. $\lambda_{max}$ (abs): 644 nm, $\lambda_{max}$ (em): 670 nm, Q.Y.: 3% (water).

c) Synthesis of Squaraine Dye 3

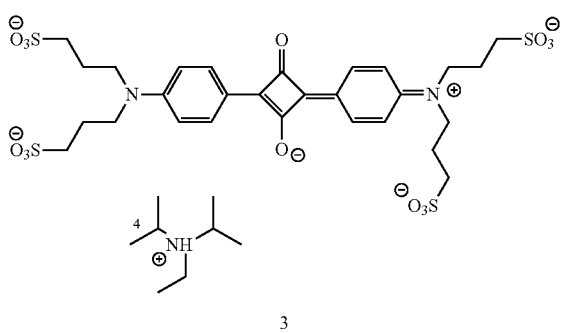

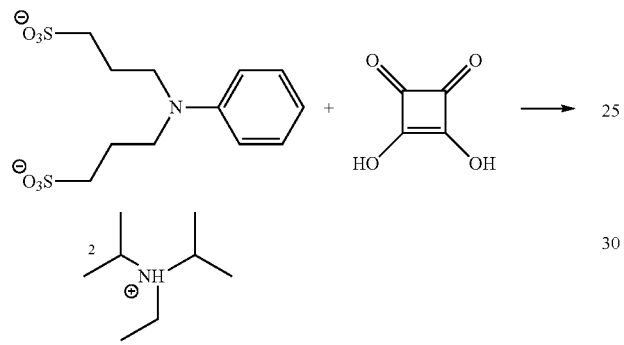

Squaric acid (171 mg, 1.5 mmol) and di[ethyl(diisopropyl)ammonium] 3-(3-sulfonatopropylanilino)-1-propane sulfonate 1.376 g (3 mmol) were refluxed in a mixture of n-butanol (15 mL) and benzene (30 mL) for 20 h. Then the deep green reaction mixture was concentrated and the crude product was precipitated by adding 30-40 mL of ether. After filtering, the product was washed several times with ether to yield the dark green squaraine dye 3 as a solid. Yield: 914 mg (48%). $\lambda_{max}$ (abs): 644 nm, $\lambda_{max}$ (em): 670 nm.

Example 4

Synthesis of Squaraine-Rotaxane SR-1

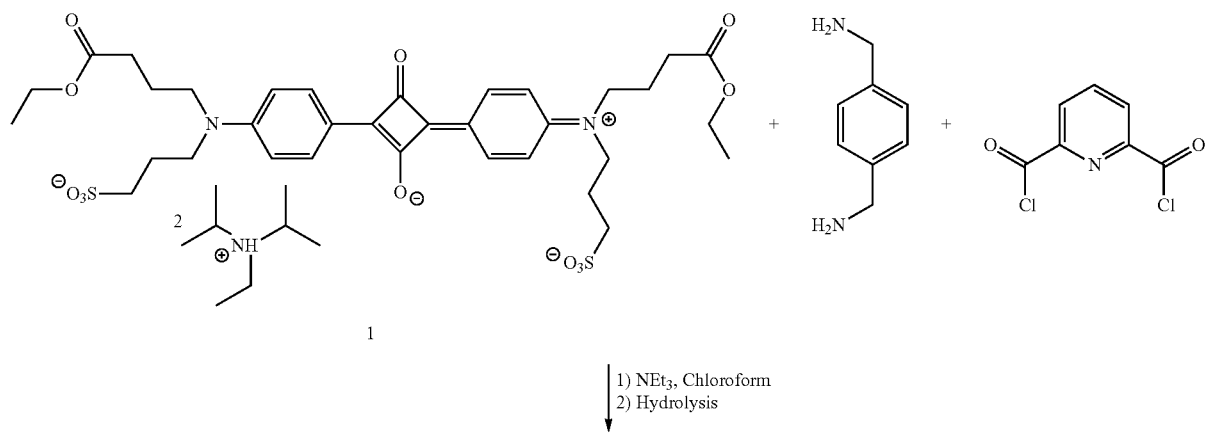

1) NEt₃, Chloroform
2) Hydrolysis

-continued

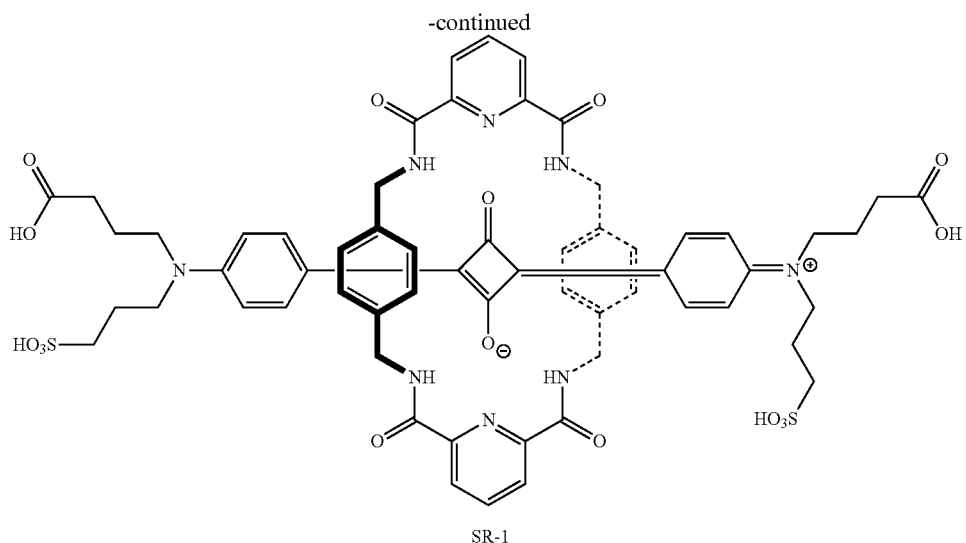

SR-1

Clear solutions of 2,6-pyridinedicarbonyl dichloride (1.28 mmol) in 5 mL of chloroform and p-xylylenediamine (1.28 mmol) in 5 mL of chloroform were simultaneously added dropwise over a 5 h period to a stirred solution of squaraine dye 1 (200 mg, 0.32 mmol) and triethylamine (3.2 mmol) in 40 mL of CHCl$_3$. After stirring overnight, the reaction mixture was filtered to remove any polymeric materials, and the resulting crude product was column purified (RP-18, methanol/water gradient) to yield SR-1 with esterified carboxy-groups. The obtained compound was stirred for 3 h at room temperature in 50 mL of 0.2 N aqueous solution of KOH. Then the mixture was neutralized with 0.2 N HCl and the resulting solution was passed through a Dowex 50WX8 (hydrogen form) cation-exchange column and then column purified on RP-18 (methanol/water, gradient) to yield squaraine-rotaxane SR-1. $\lambda_{max}$(abs): 655 nm, $\lambda_{max}$(em): 673 nm, Q.Y.: 25% (water).

Example 5

Synthesis of Unsymmetrical Squaraine-Rotaxane SR-2

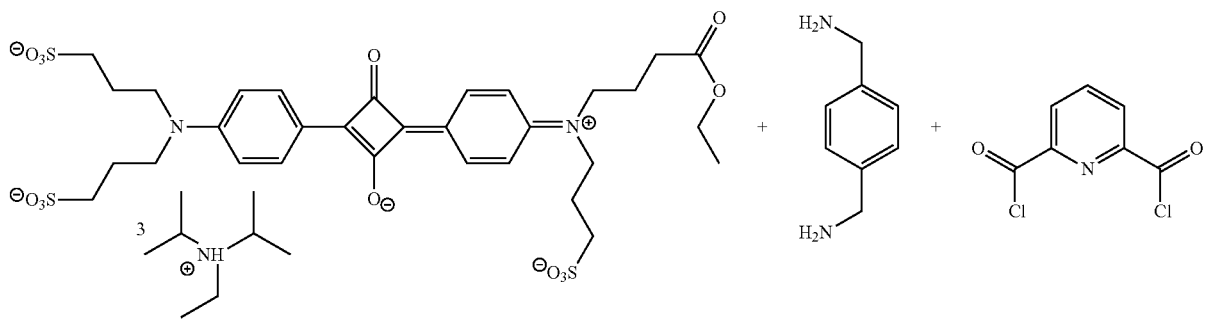

1) NEt$_3$, Chloroform
2) Hydrolysis
3) Cation-exchange column

-continued

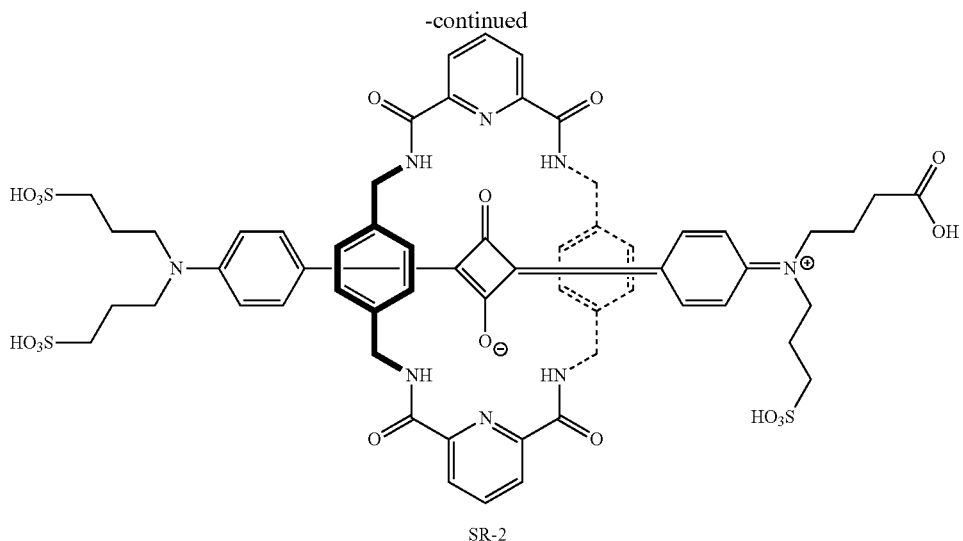

SR-2

Clear solutions of 2,6-pyridinedicarbonyl dichloride (260 mg, 1.28 mmol) in 5 mL of chloroform and p-xylylenediamine (175 mg, 1.28 mmol) in 5 mL of chloroform were simultaneously added dropwise over a 5 h period to a stirred solution of 2 (340 mg, 0.30 mmol) in 5 mL of CHCl$_3$ with triethylamine (450 µL, 3.2 mmol). The reaction mixture was stirred for 24 h and then solvent was removed under reduced pressure. The residue was dissolved in a mixture of 9 mL acetic acid and 4.5 mL of 1 M aqueous hydrochloric acid and stirred for 40 min at 90° C. The reaction mixture was filtered to remove any polymeric materials, filtrate was collected and solvent was removed on a rotary evaporator. The resulting crude product was passed through a Dowex 50WX8 cation-exchange column and then column purified on RP-18 (methanol/water gradient) to yield 73 mg of squaraine-rotaxane SR-2. $\lambda_{max}$(abs): 654 nm, ε 190,000 M$^{-1}$cm$^{-1}$, $\lambda_{max}$(em): 674 nm, QY.: 28% (phosphate buffer, pH 7.4).

Example 6

Synthesis of Symmetrical Squaraine-Rotaxane SR-3

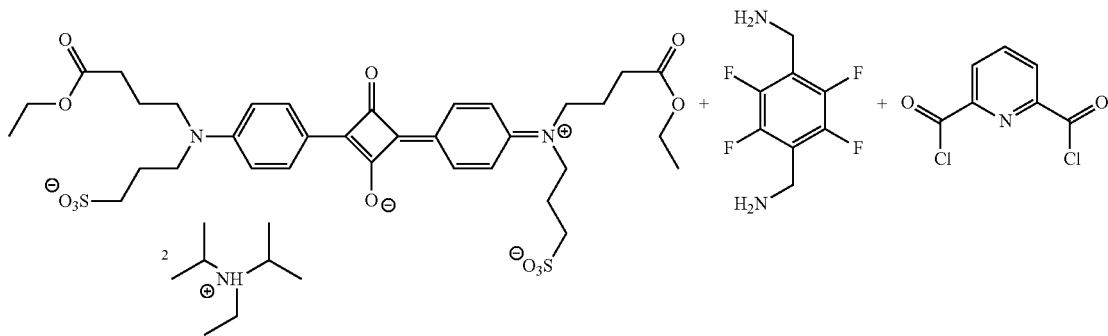

1) NEt$_3$, Chloroform
2) Hydrolysis
3) Cation-exchange column

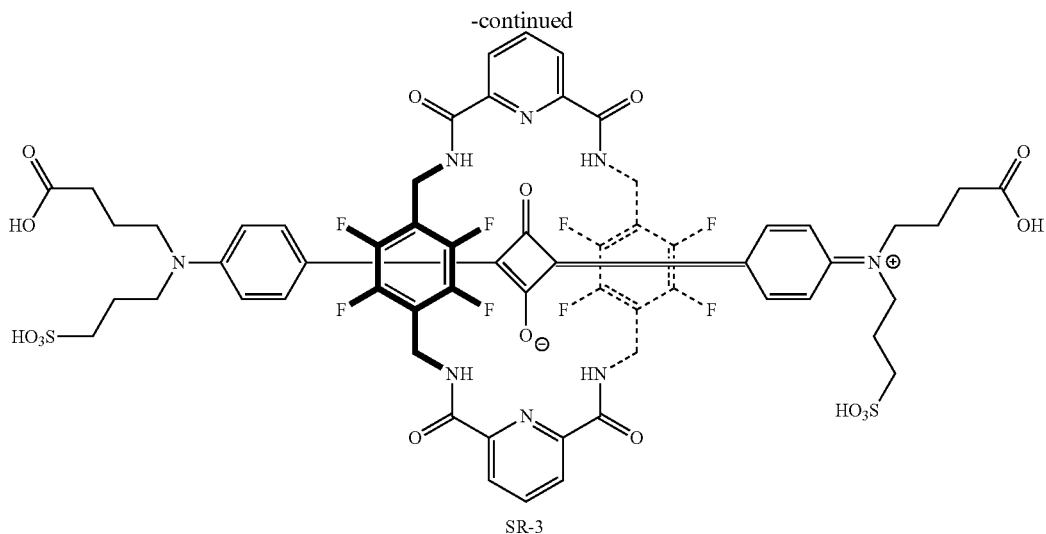

SR-3

Clear solutions of 2,6-pyridinedicarbonyl dichloride (184 mg, 0.9 mmol) in 3 mL of chloroform and 4-aminomethyl-2,3,5,6-tetrafluoro-phenylmethanamine (187 mg, 0.9 mmol) in 3 mL of chloroform were simultaneously added dropwise over a 4 h period to a stirred solution of 1 (221 mg, 0.22 mmol) in 5 mL of CHCl$_3$ with triethylamine (315 µL, 2.25 mmol). Then the reaction mixture was stirred for 20 h and the solvent was removed under reduced pressure. For hydrolysis, the residue was dissolved in a mixture of 6 mL acetic acid and 3 mL of 1 M aqueous hydrochloric acid and stirred for 40 min at 90° C. (The end of reaction was monitored by TLC (RP-18, water—acetonitrile=1:1, v/v). The reaction mixture was filtered to remove any polymeric materials, filtrate was collected and solvent was removed on a rotary evaporator. The resulting crude product was passed through a Dowex 50WX8 (hydrogen form) cation-exchange column and then column purified on RP-18 (methanol/water gradient) to yield 48 mg of squaraine-rotaxane SR-3. $\lambda_{max}$(abs): 675 nm, ε 238,000 M$^{-1}$cm$^{-1}$, $\lambda_{max}$(em): 695 nm, QY.: 38% (phosphate buffer, pH 7.4).

Example 7

Synthesis of Unsymmetrical Squaraine-Rotaxane SR-4

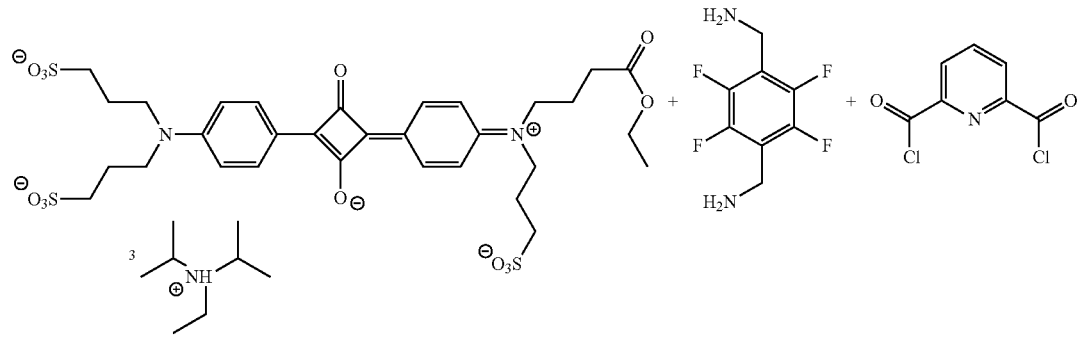

1) NEt$_3$, Chloroform
2) Hydrolysis
3) Cation-exchange column

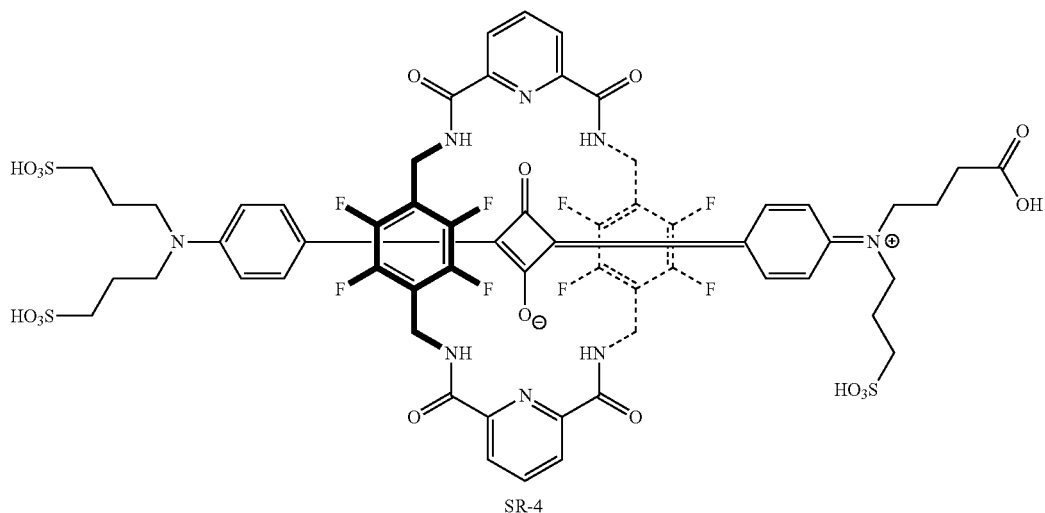

SR-4

Clear solutions of 2,6-pyridinedicarbonyl dichloride (168 mg, 0.82 mmol) in 6 mL of chloroform and 4-aminomethyl-2,3,5,6-tetrafluoro-phenylmethanamine (171 mg, 0.82 mmol) in 6 mL of chloroform were simultaneously added dropwise over a 3 h period to a stirred solution of 2 (234 mg, 0.21 mmol) in 3 mL of CHCl$_3$ with triethylamine (288 µL, 2.06 mmol). The reaction mixture was stirred for 24 h and then the solvent was removed under reduced pressure. For hydrolysis, the residue was dissolved in a mixture of 6 mL acetic acid and 3 mL of 1 M aqueous hydrochloric acid and stirred at 90° C. The reaction was monitored by TLC (RP-18, water—acetonitrile=1:1, v/v), and was finished in an hour. The reaction mixture was filtered to remove any polymeric materials, filtrate was collected and solvent was removed on a rotary evaporator. The resulting crude product was passed through a Dowex 50WX8 (hydrogen form) cation-exchange column and then column purified on RP-18 (acetonitrile/water gradient) to yield 39 mg (12%) of squaraine-rotaxane SR-4. $\lambda_{max}$(abs): 673 nm, ε 275,000 M$^{-1}$cm$^{-1}$, $\lambda_{max}$(em): 694 nm, QY.: 36% (phosphate buffer, pH 7.4).

Example 8

Synthesis of Unsymmetrical Squaraine-Rotaxane SR-5

Clear solutions of 2,6-pyridinedicarbonyl dichloride (195 mg, 0.95 mmol) in 5 mL of chloroform and 4-aminomethyl-2,3,5,6-tetrachloro-phenylmethanamine (261 mg, 0.95 mmol) in 5 mL of chloroform were simultaneously added dropwise over a 2.5 h period to a stirred solution of 2 (270 mg, 0.24 mmol) in 5 mL of CHCl$_3$ with triethylamine (335 µL, 2.38 mmol). The reaction mixture was stirred for 15 h and then the solvent was removed under reduced pressure. For hydrolysis, the residue was dissolved in a mixture of 5 mL acetic acid and 2.5 mL of 1 M aqueous hydrochloric acid and stirred for 1 h at 90° C. The reaction was monitored by TLC (RP-18, water—acetonitrile=1:1, v/v), and was completed in one hour. The reaction mixture was filtered, filtrate was collected and solvent was removed on a rotary evaporator. The resulting crude product was passed through a Dowex 50WX8 (hydrogen form) ion-exchange column and then column purified on RP-18 (RP-18, acetonitrile/water gradient) to yield 13 mg of squaraine-rotaxane SR-5. $\lambda_{max}$(abs): 683 nm, ε 295,000 M$^{-1}$cm$^{-1}$, $\lambda_{max}$(em): 705 nm, QY.: 58% (phosphate buffer, pH 7.4).

35
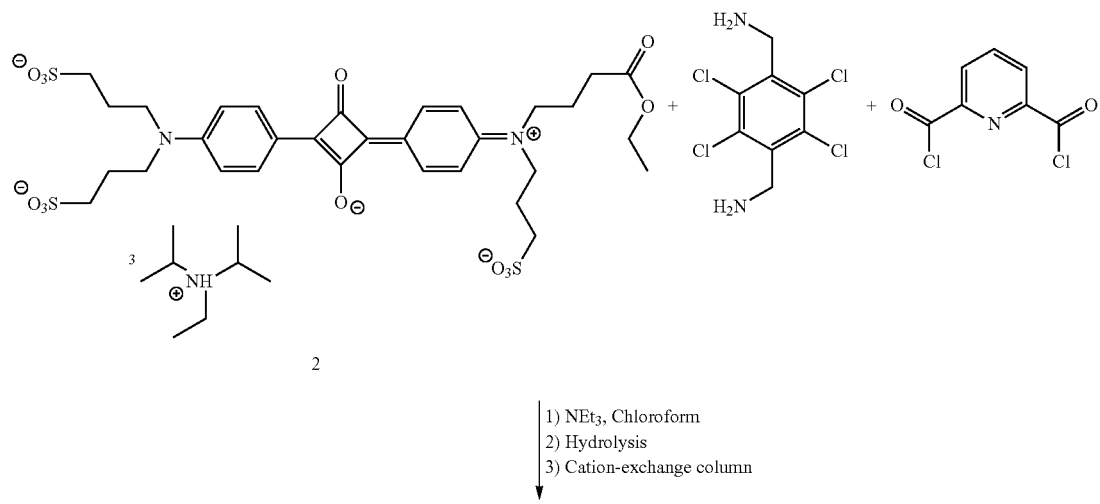
36
1) NEt₃, Chloroform
2) Hydrolysis
3) Cation-exchange column
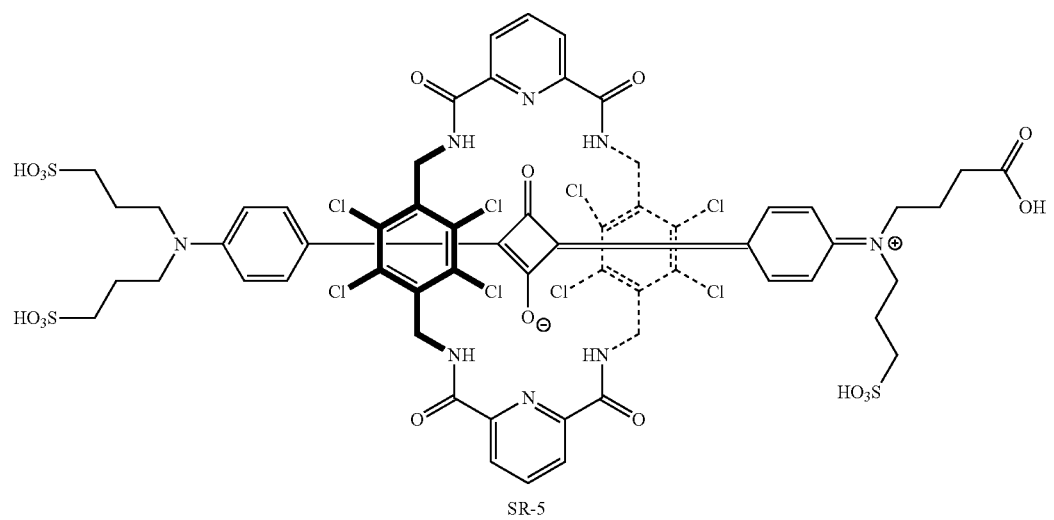
SR-5

Example 9

Synthesis of the NHS Ester of Rotaxane SR-5

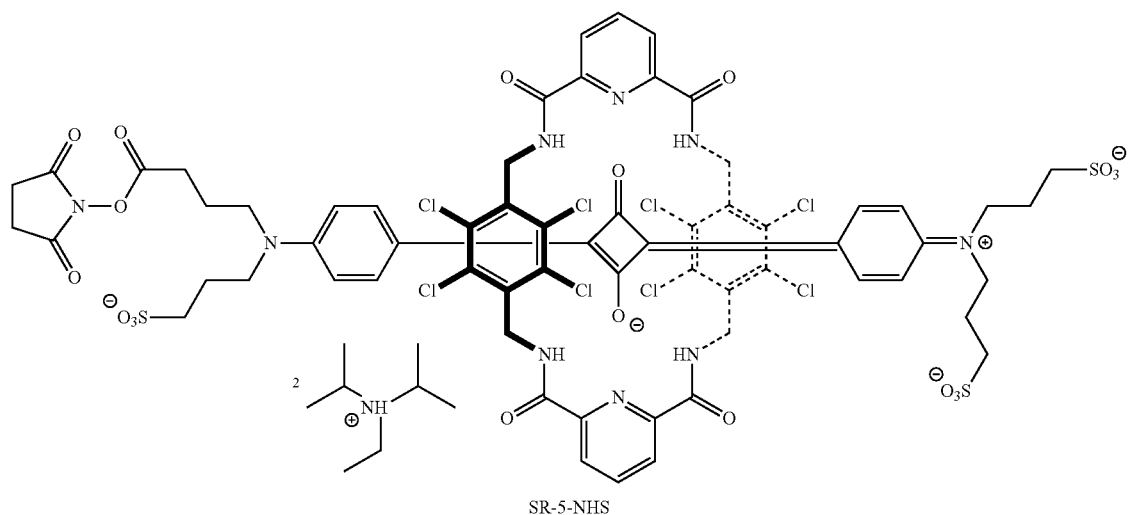

SR-5-NHS 6.5 mg of SR-5, 3.0 mg of TSTU, and 13.0 mg (10 μmop of DIPEA were dissolved in 1 mL of DMF. The solution was stirred at room temperature for 4 h to give SR-5-NHS, which is used for labelling of IgG or other amine-containing species.

Example 10

Synthesis of Symmetrical Squaraine-Rotaxane SR-6

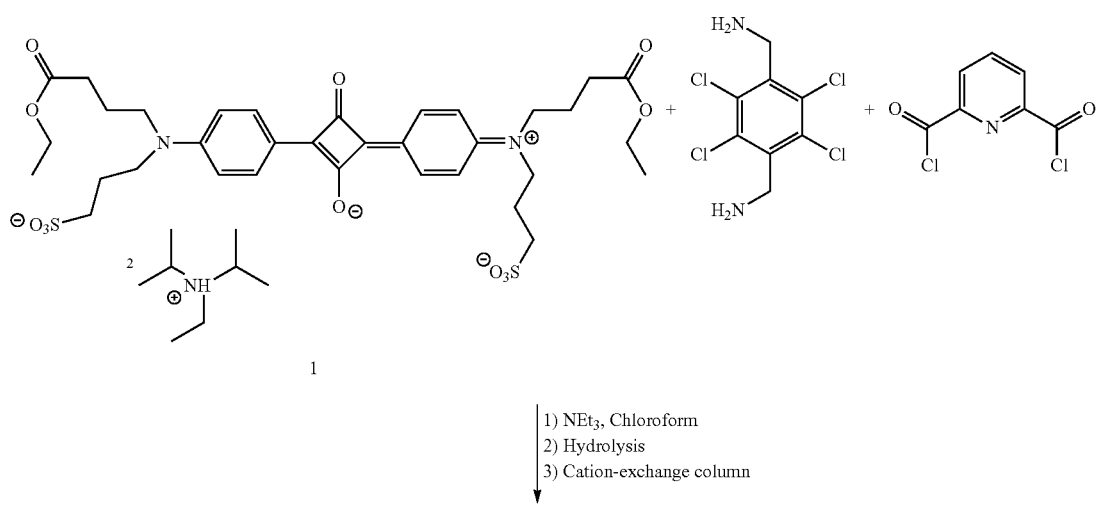

1) NEt$_3$, Chloroform
2) Hydrolysis
3) Cation-exchange column

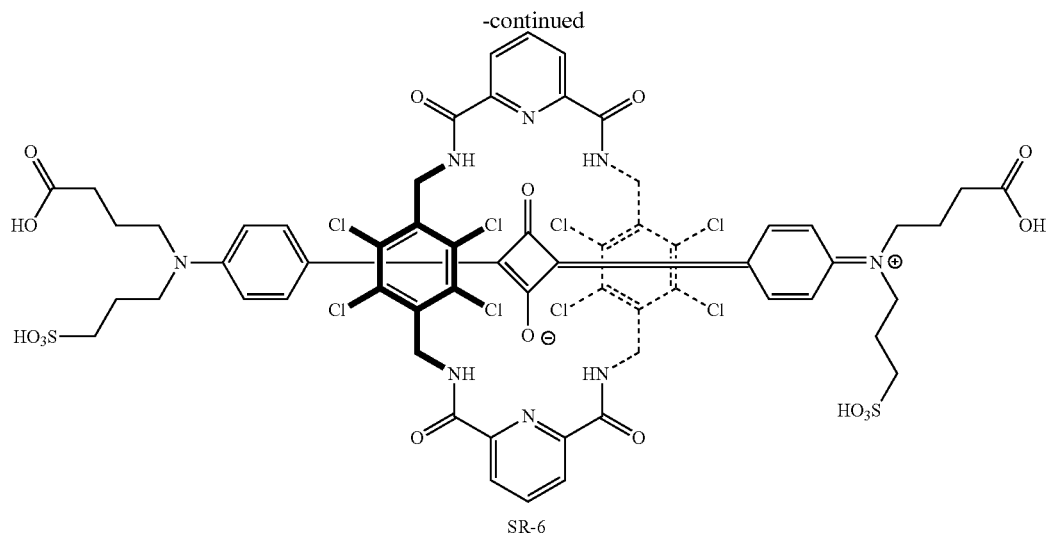

SR-6

Clear solutions of 2,6-pyridinedicarbonyl dichloride (77 mg, 0.375 mmol) in 2 mL of chloroform and 4-aminomethyl-2,3,5,6-tetrachloro-phenylmethanamine (103 mg, 0.375 mmol) in 2 mL of chloroform were simultaneously added dropwise over a 4 h period to a stirred solution of 1 (92 mg, 0.094 mmol) in 6 mL of CHCl$_3$ with triethylamine (132 μL, 0.94 mmol). The reaction mixture was stirred for 15 h and then the solvent was removed under reduced pressure. The obtained residue was dissolved in a mixture of 6 mL of acetic acid and 2.5 mL of 1 M aqueous hydrochloric acid and stirred for about 1 hour at 90° C. The reaction was monitored by TLC (RP-18, water—acetonitrile=1:1, v/v), and was completed in one hour. The reaction mixture was filtered to remove any polymeric materials, filtrate was collected and solvent was removed on a rotary evaporator. The resulting crude product was passed through a Dowex 50WX8 (hydrogen form) ion-exchange column and then column purified on RP-18 (acetonitrile/water gradient) to yield 8 mg (6%) of squaraine-rotaxane SR-6. $\lambda_{max}$(abs): 685 nm, ε 267,000 M$^{-1}$cm$^{-1}$, $\lambda_{max}$(em): 706 nm, QY.: 54% (phosphate buffer, pH 7.4).

Example 11

Synthesis of Symmetrical Squaraine-Rotaxane SR-7

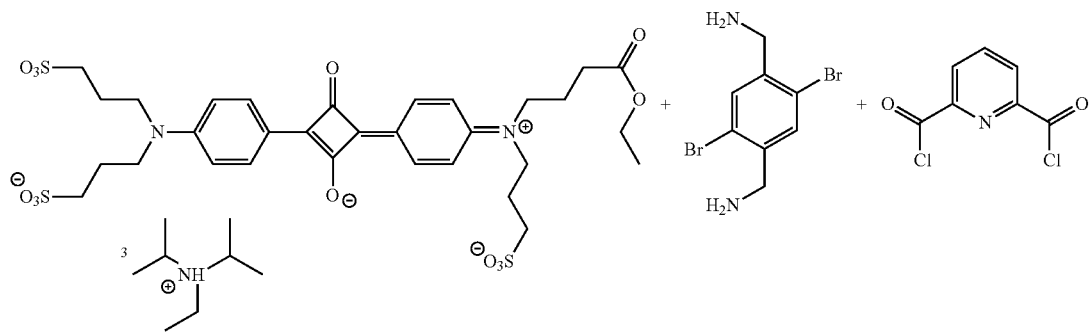

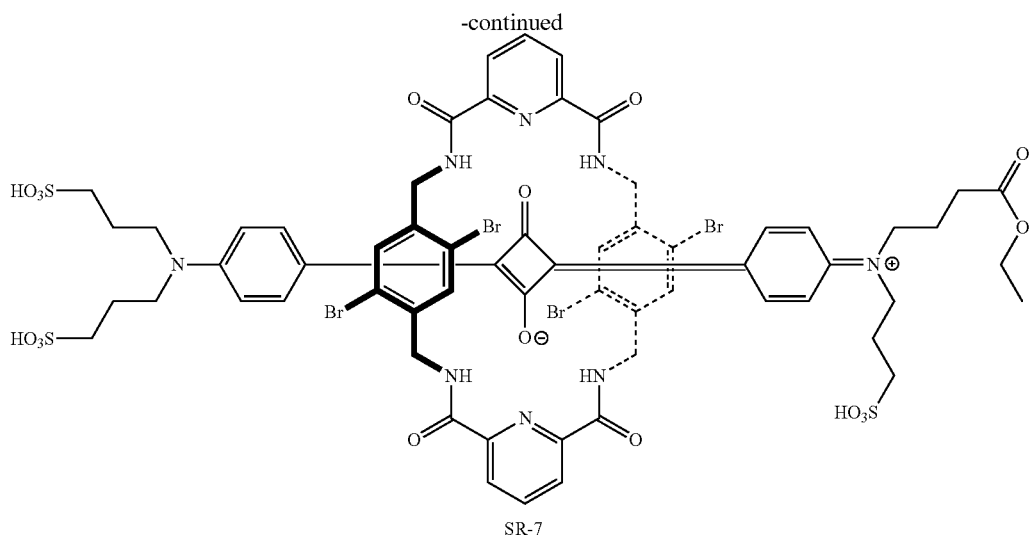

SR-7

Clear solutions of 2,6-pyridinedicarbonyl dichloride (51.8 mg, 0.254 mmol) in 2 mL of chloroform and 2,5-dibromo-1,4-xylylendiamine (74.8 mg, 0.254 mmol) in 2 mL of chloroform were simultaneously added dropwise over a 4 h period to a stirred solution of 2 (72 mg, 0.064 mmol) in 5 mL of CHCl$_3$ with triethylamine (90 μL, 0.64 mmol). The reaction mixture was stirred for 15 h. The reaction was monitored by TLC (RP-18, water—acetonitrile=1:1, v/v), and was completed in about one hour. The reaction mixture was filtered, filtrate was collected and solvent was removed on a rotary evaporator. The resulting crude product was passed through a Dowex 50WX8 (hydrogen form) ion-exchange column and then column purified on RP-18 (acetonitrile/water gradient) to yield 2.9 mg of squaraine-rotaxane SR-7.

$\lambda_{max}$(abs): 671 nm, $\lambda_{max}$(em): 696 nm, QY.: 31.3% (phosphate buffer, pH 7.4).

Example 12

Synthesis of Symmetrical Nitro-Squaraine-Rotaxane SR-8

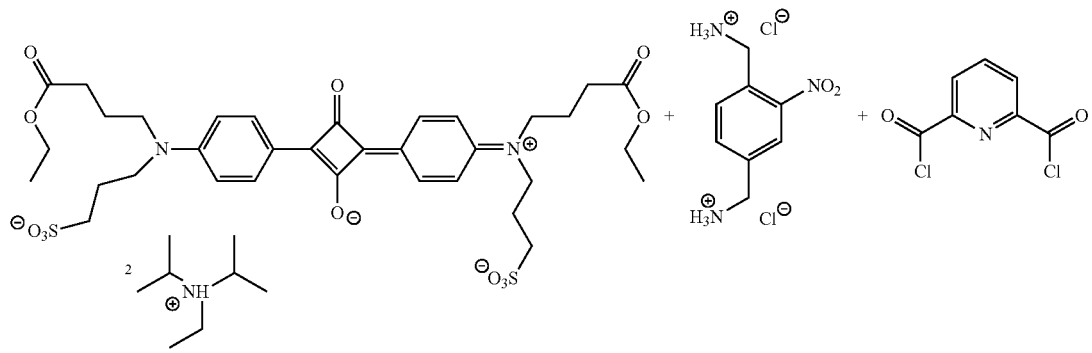

1) NEt$_3$, Chloroform
2) Hydrolysis
3) Cation-exchange column

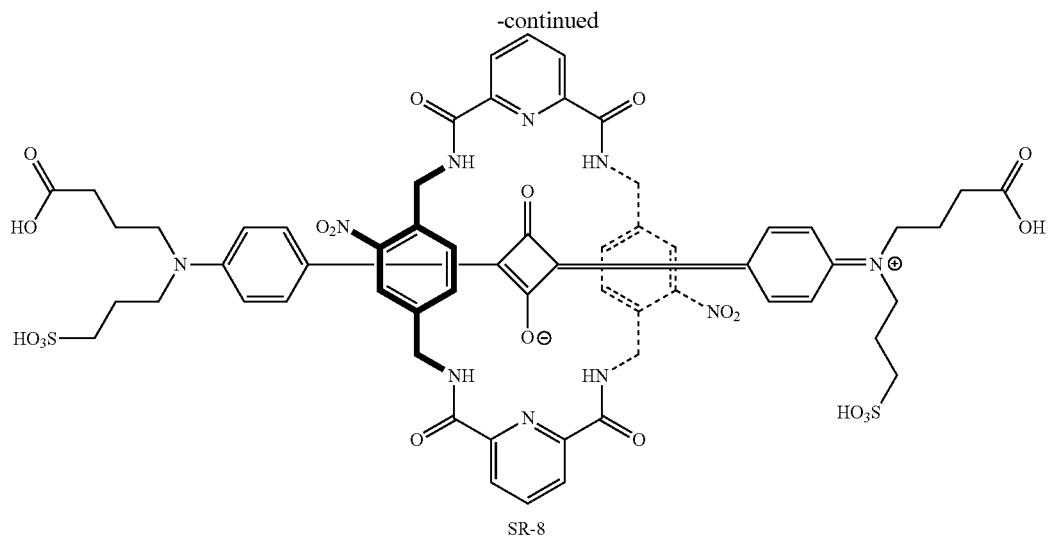

SR-8

Clear solutions of 2,6-pyridinedicarbonyl dichloride (51.6 mg, 0.253 mmol) in 6 mL of chloroform and (2-nitro-1,4-phenylene)dimethanaminium dichloride (64.3 mg, 0.253 mmol) in 6 mL of chloroform were simultaneously added dropwise over a 4 h period to a stirred solution of 1 (62 mg, 0.063 mmol) in 7 mL of CHCl$_3$ with triethylamine (210 μL, 1.5 mmol). The reaction mixture was stirred for 15 h and then the solvent was removed under reduced pressure. For hydrolysis, the residue was dissolved in a mixture of 5 mL of acetic acid and 2.5 mL of 1 M aqueous hydrochloric acid and stirred at 95° C. The reaction was monitored by TLC (RP-18, water—acetonitrile=1:1, v/v), and was completed in about one hour. The reaction mixture was filtered to remove any polymeric materials, filtrate was collected and solvent was removed on a rotary evaporator. The resulting crude product was passed through a Dowex 50WX8 (hydrogen form) ion-exchange column and then column purified on RP-18 (acetonitrile/water gradient) to yield 8 mg (6%) of squaraine-rotaxane SR-8. $\lambda_{max}$(abs): 674 nm, $\lambda_{max}$(em): 695 nm, QY.: <1% (phosphate buffer, pH 7.4).

Example 13

Synthesis of Symmetrical Amine-Substituted Squaraine-Rotaxane SR-9

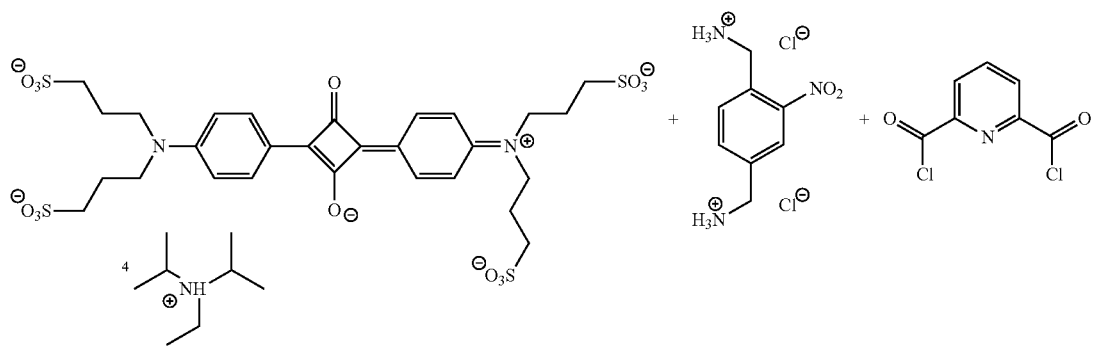

1) NEt$_3$, Chloroform
2) Hydrolysis
3) Cation-exchange column

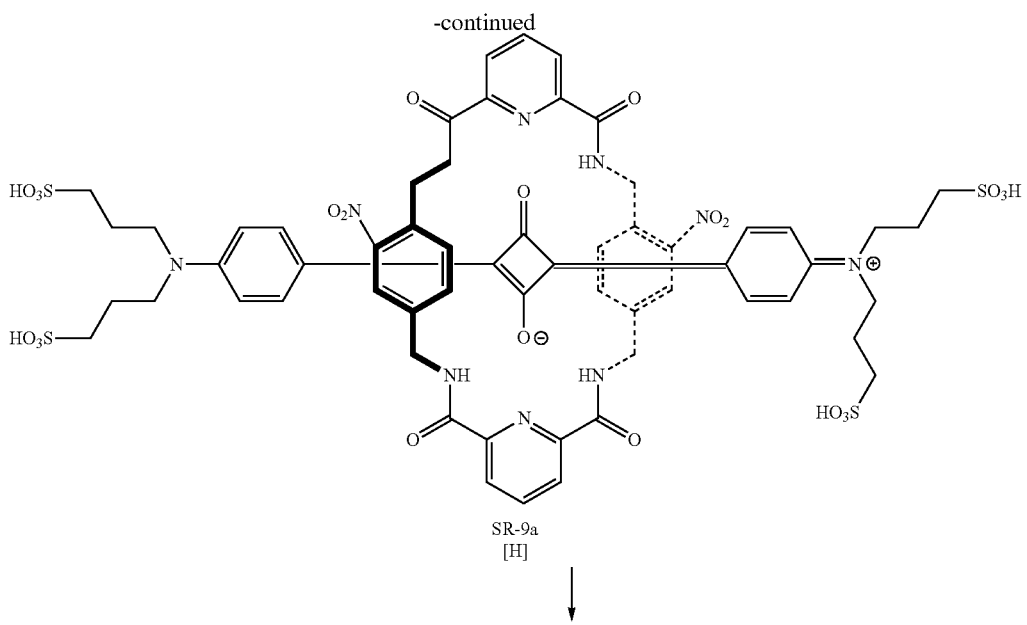

SR-9a
[H]

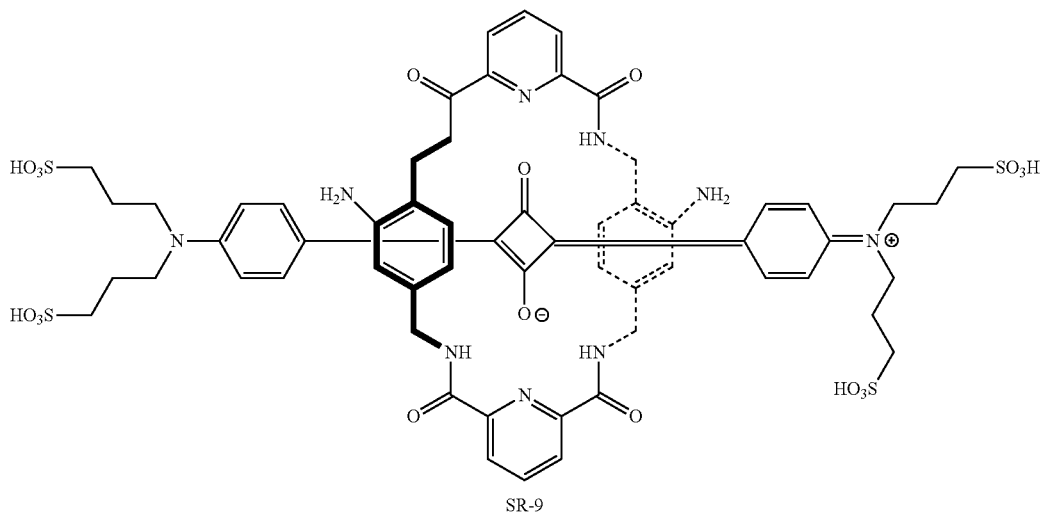

SR-9

Clear solutions of 2,6-pyridinedicarbonyl dichloride (64.3 mg, 0.32 mmol) in 6 mL of chloroform and (2-nitro-1,4-phenylene)dimethanaminium dichloride (81.3 mg, 0.32 mmol) in 6 mL of chloroform were simultaneously added dropwise over a 4 h period to a stirred solution of 3 (102 mg, 0.08 mmol) in 7 mL of CHCl₃ with triethylamine (210 µL, 1.5 mmol). The reaction mixture was stirred for 15 h and then the solvent was removed under reduced pressure. For hydrolysis, the residue was dissolved in a mixture of 5 mL of acetic acid and 2.5 mL of 1 M aqueous hydrochloric acid and stirred at 95° C. The reaction was monitored by TLC (RP-18, water—acetonitrile=1:1, v/v), which was finished in about an hour. The reaction mixture was filtered to remove any polymeric materials, filtrate was collected and solvent was removed on a rotary evaporator. The resulting crude product was passed through a Dowex 50WX8 (hydrogen form) ion-exchange column and then column purified on RP-18 (acetonitrile/water gradient) to yield 12 mg (11%) of the nitro compound SR-9a.

Reduction: First a hydrazine glyoxylate was prepared by neutralizing of hydrazine hydrate (1 µL, 0.02 mmol) in 100 µL of deionized water with glyoxylic acid (1.8 mg, 0.02 mmol) with stirring and the obtained hydrazine glyoxylate solution was used for the reduction. A suspension of 12 mg (0.009 mmol) nitro compound SR-9a and 1.5 mg of zinc powder in 0.5 mL of water/methanol (1:1, v/v) was stirred with hydrazine glyoxylate at RT. After the completion of the reaction in about 3 hours (monitored by TLC), the precipitate was filtered, and the filtrate was collected and solvent was removed by rotary evaporation. The resulting crude product was passed through a Dowex 50WX8 (hydrogen form) cation-exchange column and then column purified on RP-18 (acetonitrile/water gradient) to yield squaraine-rotaxane SR-9 (7.9 mg, 68%).

Example 14

Synthesis of Symmetrical Squaraine-Rotaxane SR-10

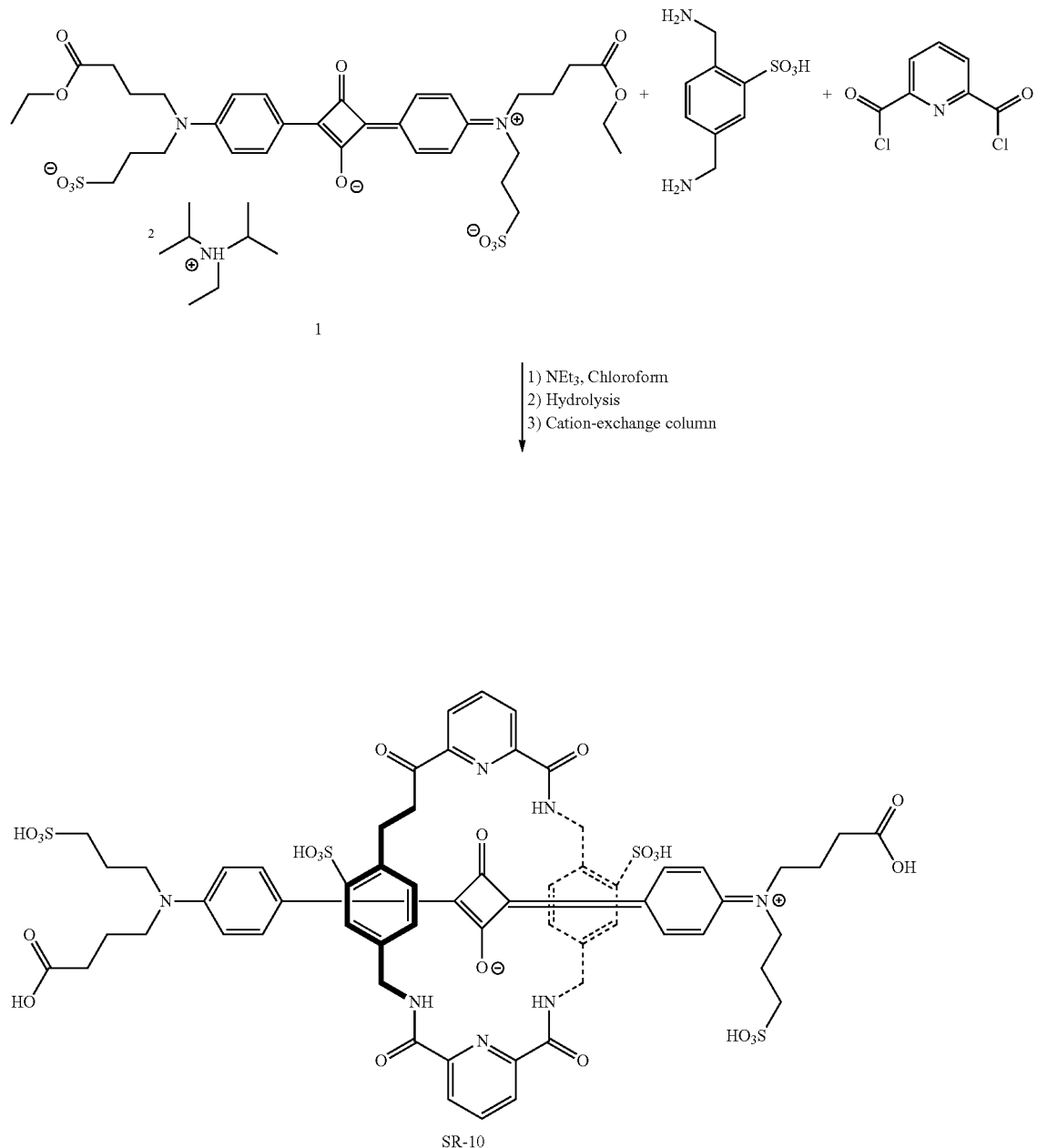

Clear solution of 2,6-pyridinedicarbonyl dichloride 50 mg (0.245 mmol) in 3 mL of chloroform and a suspension of 2,5-bis(aminomethyl)benzenesulfonic acid 53 mg (0.245 mmol) in 2.5 mL of chloroform and 0.5 ml of DMSO were simultaneously added dropwise over a 4 h period to a stirred mixture of squaraine dye 1 (60 mg, 0.061 mmol) in 3 mL of $CHCl_3$ and triethylamine (130 μl, 0.93 mmol). After stirring overnight, the reaction mixture was filtered, filtrate was collected and solvent was removed by a rotary evaporation. The resulting crude product was column purified (RP-18, methanol/water gradient) to yield SR-10 with esterified carboxy-groups. The obtained 5.3 mg of SR-10 ethyl ester were dissolved in a mixture of 2.5 mL of acetic acid and 1.5 mL of 1 M aqueous hydrochloric acid and stirred at 95° C. The reaction was monitored by TLC (RP-18, water—acetonitrile=2:1, v/v), and was completed in about one hour. The reaction mixture was filtered, filtrate was collected and solvent was removed by a rotary evaporator. The resulting solution was column purified again (RP-18; acetonitrile/water, gradient) to yield 3.4 mg (12%) of squaraine-rotaxane SR-10.

Example 15
Synthesis of Symmetrical Squaraine-Rotaxane
SR-11
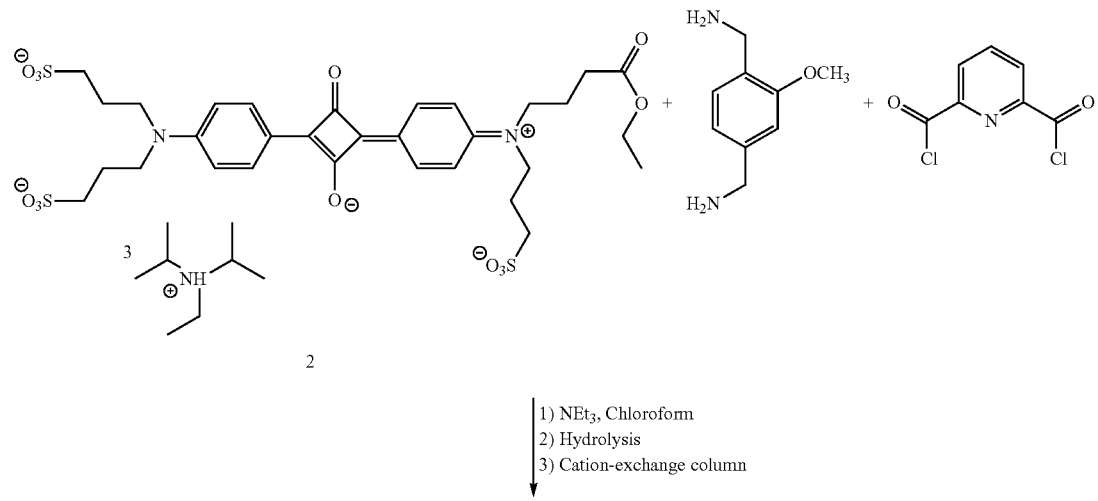
1) NEt₃, Chloroform
2) Hydrolysis
3) Cation-exchange column
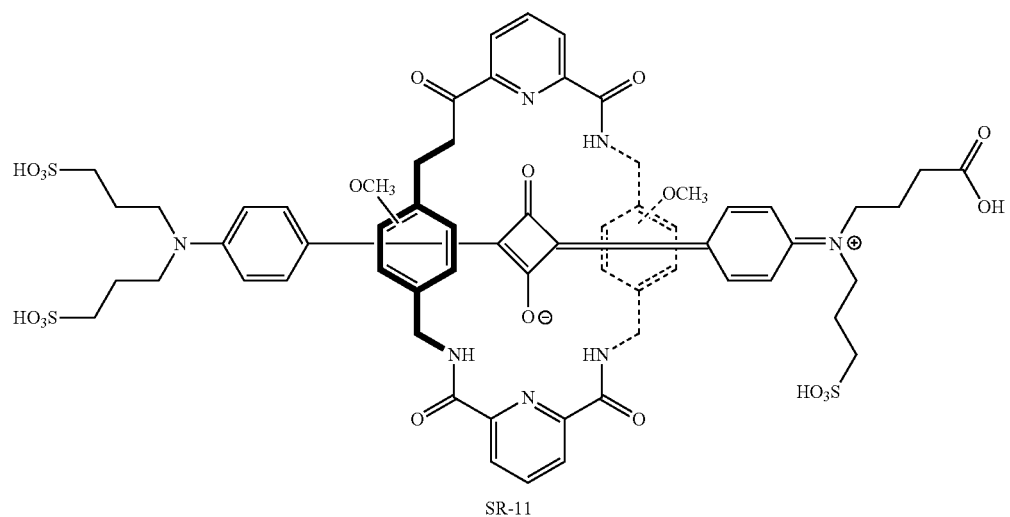
SR-11

A clear solution 61 mg (0.3 mmol) of 2,6-pyridinedicarbonyl dichloride in 3 mL of chloroform and 50 mg (0.3 mmol) of (2-methoxy-1,4-phenylene)dimethanamine in 3 mL of chloroform were simultaneously added dropwise over a 3 h period to a stirred solution of squaraine dye 2 (85 mg, 0.075 mmol) and triethylamine (105 µl, 0.75 mmol) in 3 mL of CHCl₃. The reaction mixture was stirred for 10 h and then the solvent was removed under reduced pressure. The residue was dissolved in a mixture of 5 mL of acetic acid and 3 mL of 1 M aqueous hydrochloric acid and stirred for 1 hour at 95° C. The reaction was monitored by TLC (RP-18, water—acetonitrile=1:1, v/v), and was completed in about one hour. The reaction mixture was filtered, filtrate was collected and solvent was removed by a rotary evaporator. The resulting solution was column purified (RP-18; acetonitrile/water gradient) to yield 15.7 mg (16%) squaraine-rotaxane SR-11.

Example 16

Synthesis of Squaraine-Rotaxane SR-12

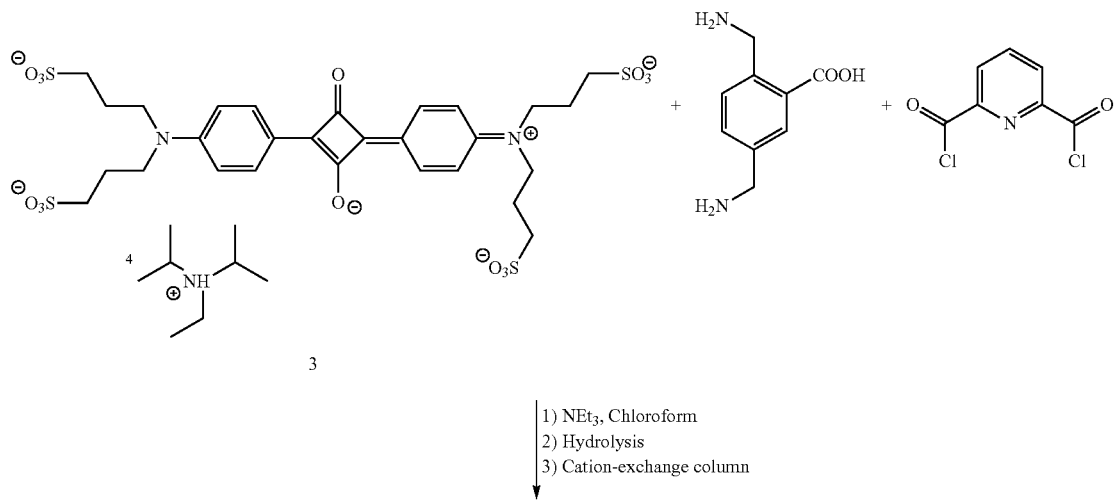

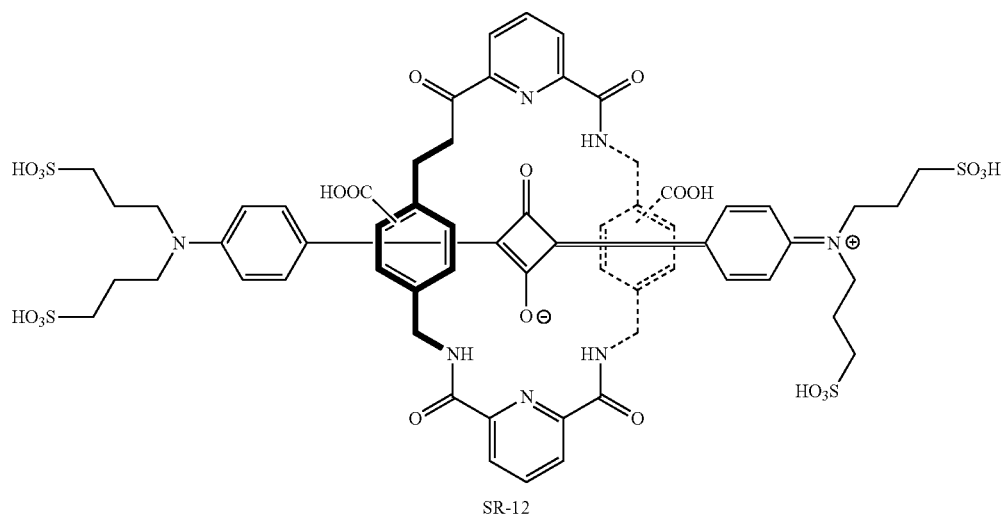

SR-12

A solution of 82 mg (0.4 mmol) of 2,6-pyridinedicarbonyl dichloride in 3 mL of chloroform and 72 mg (0.4 mmol) of 2,5-bis(aminomethyl)benzoic acid in 3 mL of chloroform were simultaneously added dropwise over a 3 h period to a stirred solution of squaraine dye 3 (127 mg, 0.1 mmol) and triethylamine (168 μl, 1.2 mmol) in 3 mL of CHCl₃. The reaction mixture was stirred for 12 h and then the solvent was removed under reduced pressure. The residue was dissolved in a mixture of 5 mL of acetic acid and 3 mL of 1 M aqueous hydrochloric acid and stirred for 1 hour at 95° C. The reaction was monitored by TLC (RP-18, water—acetonitrile=1:1, v/v), and was completed in about one hour. The reaction mixture was filtered, filtrate was collected and solvent was removed by a rotary evaporator. The resulting solution was column purified again (RP-18; acetonitrile/water gradient) to yield 8 mg of squaraine-rotaxane SR-12.

Example 17

Synthesis of Symmetrical Squaraine-Rotaxane SR-13

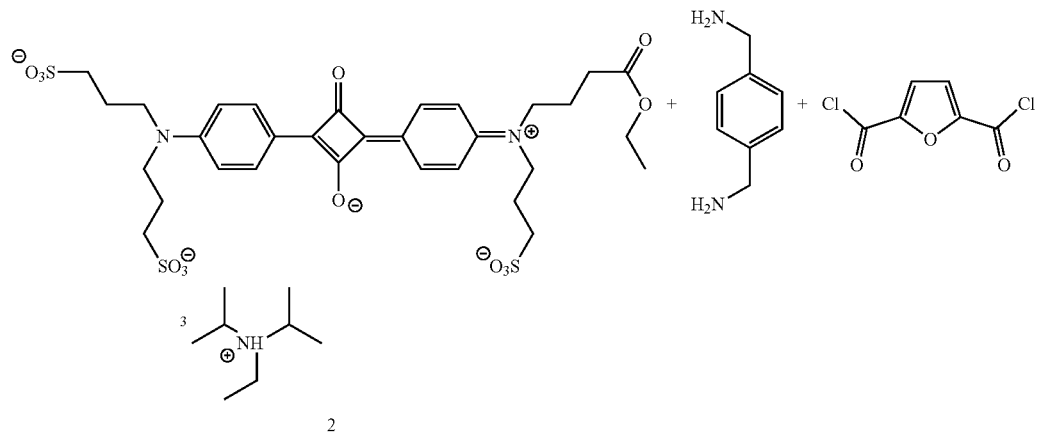

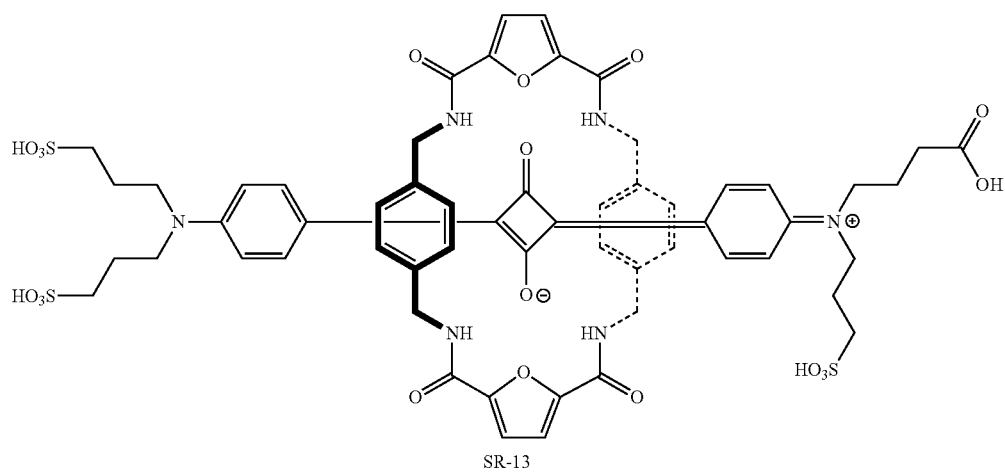

SR-13

Clear solutions of 2,5-furanedicarbonyl dichloride (77.2 mg, 0.4 mmol) in 3 mL of chloroform and p-xylylenediamine (54.5 mg, 0.4 mmol) in 3 mL of chloroform were simultaneously added dropwise over a 6 h period to a stirred solution of 2 (74.5 mg, 0.1 mmol) in 2 mL of CHCl$_3$ with triethylamine (140 µL, 1.0 mmol). The reaction mixture was stirred for 15 h and then the solvent was removed under reduced pressure. For hydrolysis, the residue was dissolved in a mixture of 5 mL of acetic acid and 3 mL of 1 M aqueous hydrochloric acid and stirred for 1 hour at 95° C. The reaction was monitored by TLC (RP-18, water—acetonitrile=1:1, v/v), and was completed in about one hour. The reaction mixture was filtered, filtrate was collected and solvent was removed by a rotary evaporator. The resulting crude product was passed through a Dowex 50WX8 (hydrogen form) ion-exchange column and then column purified on RP-18 (acetonitrile/water gradient) to yield 17.2 mg (14%) of squaraine-rotaxane SR-13.

Example 18

Synthesis of Symmetrical Squaraine-Rotaxane SR-14

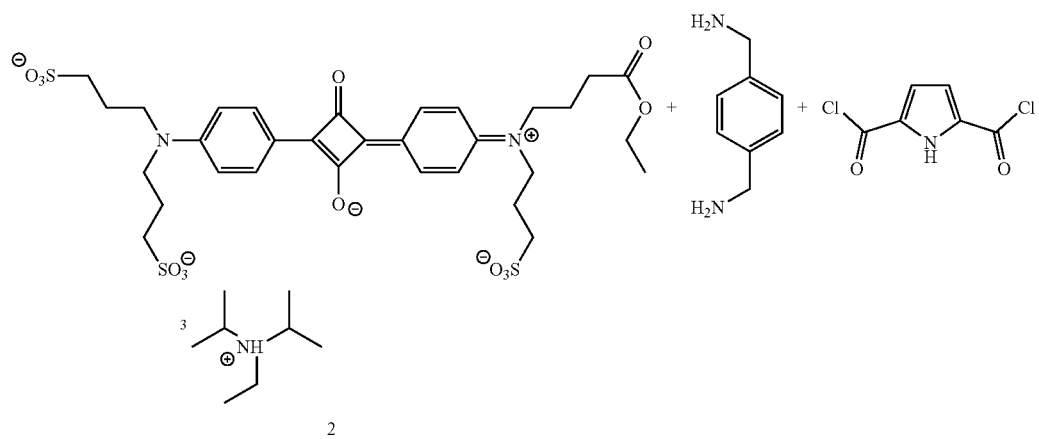

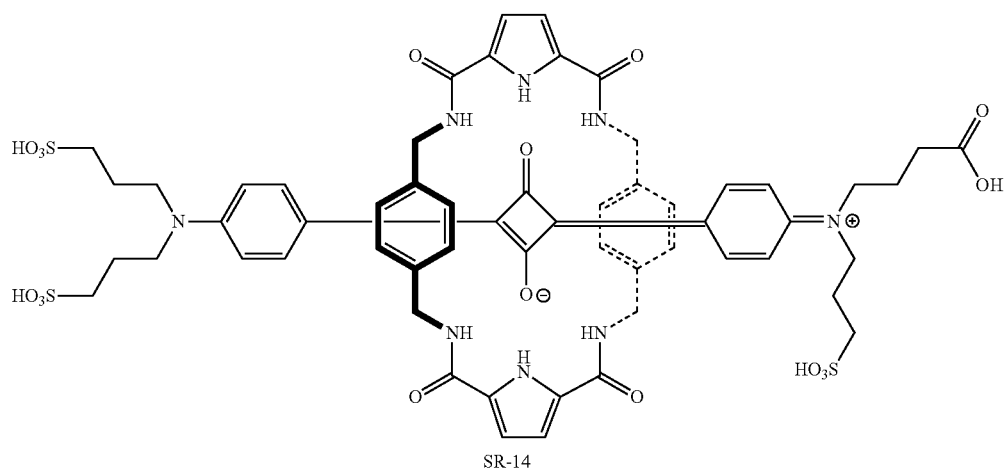

SR-14

Clear solutions 2,5-pyrroledicarbonyl dichloride (76.8 mg, 0.4 mmol) in 3 mL of chloroform and p-xylylenediamine (54.5 mg, 0.4 mmol) in 3 mL of chloroform were simultaneously added dropwise over a 6 h period to a stirred solution of 2 (74.5 mg, 0.1 mmol) in 2 mL of $CHCl_3$ with triethylamine (140λ, 1.0 mmol). The reaction mixture was stirred for 15 h and then the solvent was removed under reduced pressure. For hydrolysis, the residue was dissolved in a mixture of 5 mL of acetic acid and 3 mL of 1 M aqueous hydrochloric acid and stirred at 95° C. The reaction was monitored by TLC (RP-18, water—acetonitrile=1:1, v/v), and was completed in about an hour. The reaction mixture was filtered, filtrate was collected and solvent was removed by a rotary evaporator. The resulting crude product was passed through a Dowex 50WX8 (hydrogen form) ion-exchange column and then column purified on RP-18 (acetonitrile/water gradient) to yield 12.2 mg (10%) of squaraine-rotaxane SR-14.

Example 19

Synthesis of Unsymmetrical Squaraine-Rotaxane SR-15

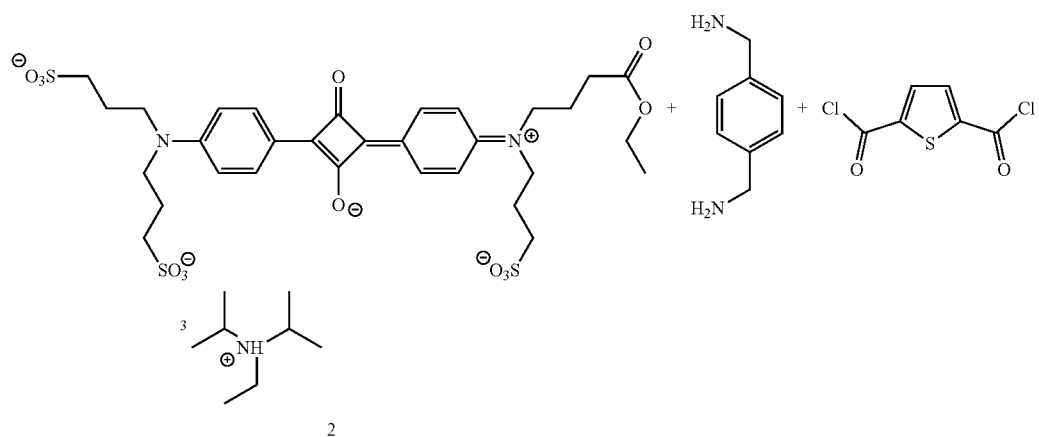

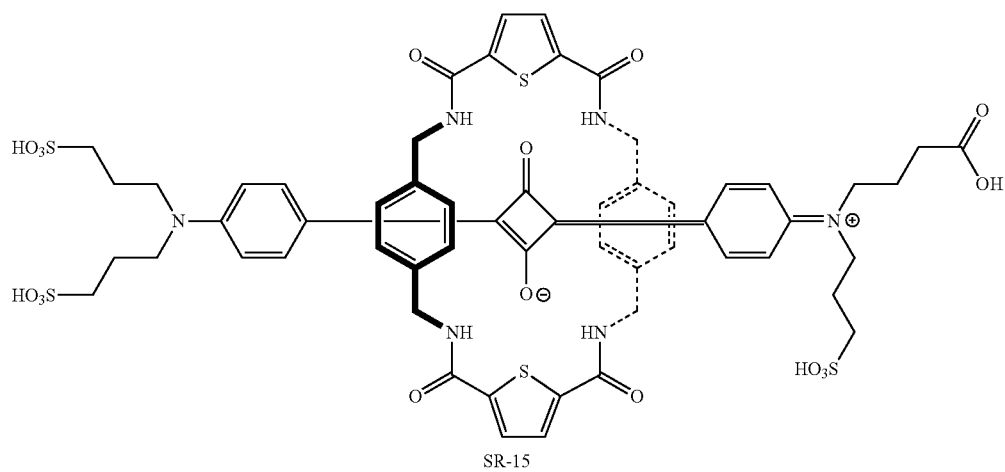

SR-15

Clear solutions 2,5-thiophenedicarbonyl dichloride (83.6 mg, 0.4 mmol) in 2.5 mL of chloroform and 4-aminomethyl-phenylmethanamine (54.5 mg, 0.4 mmol) in 2.5 mL of chloroform were simultaneously added dropwise by syringe pump over a 5 h period to a stirred solution of 2 (74.5 mg, 0.1 mmol) in 2 mL of CHCl$_3$ with triethylamine (140 μL, 1.0 mmol). The reaction mixture was stirred for 15 h and then the solvent was removed under reduced pressure. For hydrolysis, the residue was dissolved in a mixture of 5 mL of acetic acid and 3 mL of 1 M aqueous hydrochloric acid and stirred at 95° C. The reaction was monitored by TLC (RP-18, water—acetonitrile=1:1, v/v), and was completed in about one hour. The reaction mixture was filtered, filtrate was collected and solvent was removed by a rotary evaporator. The resulting crude product was passed through a Dowex 50WX8 (hydrogen form) ion-exchange column and then column purified on RP-18 (acetonitrile/water gradient) to yield 16.4 mg (13%) of squaraine-rotaxane SR-15.

Example 20

Synthesis of Symmetrical Squaraine-Rotaxane SR-16

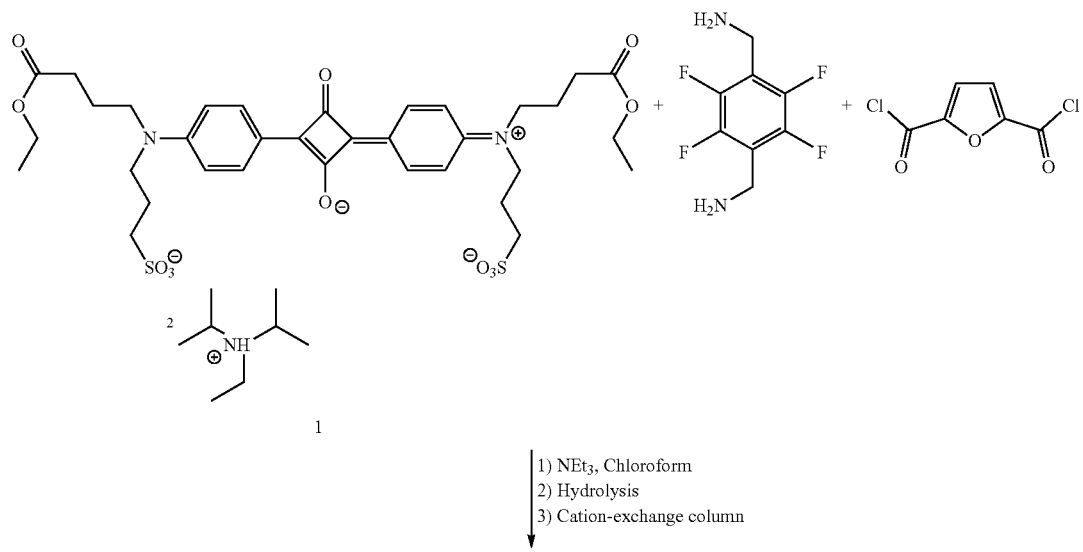

1) NEt$_3$, Chloroform
2) Hydrolysis
3) Cation-exchange column

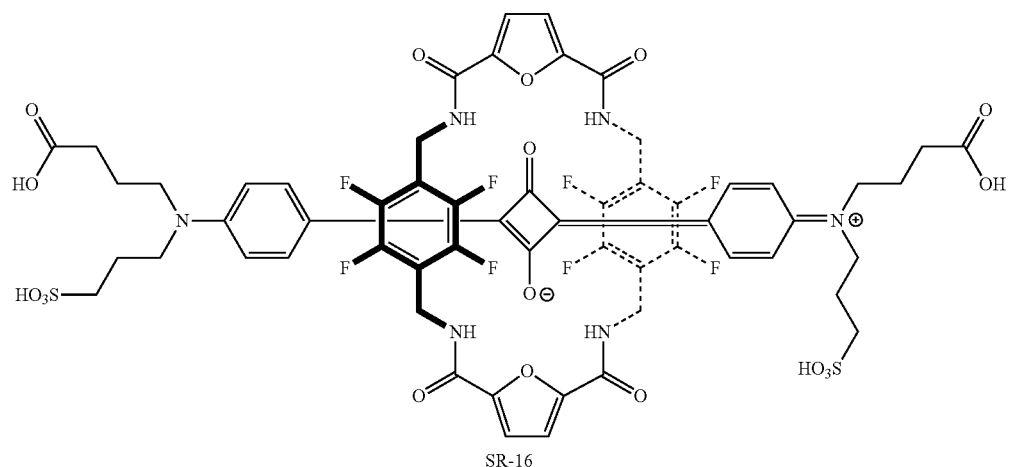

SR-16

Clear solutions of 2,5-furanedicarbonyl dichloride (37 mg, 0.19 mmol)—in 2 mL of chloroform and 4-aminomethyl-2,3,5,6-tetrafluoro-phenylmethanamine (40 mg, 0.19 mmol) in 2 mL of chloroform were simultaneously added dropwise over a 4 h period to a stirred solution of 1 (47 mg, 0.048 mmol) in 5 mL of $CHCl_3$ with triethylamine (67 μL, 0.48 mmol). The reaction mixture was stirred for 15 h and then the solvent was removed under reduced pressure. For hydrolysis, the residue was dissolved in a mixture of 5 mL of acetic acid and 2 mL of 1 M aqueous hydrochloric acid and stirred at 90° C. The reaction was monitored by TLC (RP-18, water—acetonitrile=1:1, v/v), which and was completed in about one hour. The reaction mixture was filtered, filtrate was collected and solvent was removed on a rotary evaporator. The resulting crude product was passed through a Dowex 50WX8 (hydrogen form) ion-exchange column and then column purified on RP-18 (acetonitrile/water gradient) to yield 6.3 mg (10%) of squaraine-rotaxane SR-16.

$\lambda_{max}$(abs): 673 nm, E 285,000 $M^{-1}cm^{-1}$, $\lambda_{max}$(em): 695 nm, QY.: 14%-(phosphate buffer, pH 7.4).

Example 21

Synthesis of Symmetrical Squaraine-Rotaxane SR-17

Clear solutions of 2,5-furanedicarbonyl dichloride (106 mg, 0.55 mmol)—in 2 mL of chloroform and 4-aminomethyl-2,3,5,6-tetrachloro-phenylmethanamine (151 mg, 0.55 mmol) in 2 mL of chloroform were simultaneously added dropwise over a 4 h period to a stirred solution of 1 (135 mg, 0.137 mmol) in 5 mL of $CHCl_3$ with triethylamine (193 μL, 1.37 mmol). The reaction mixture was stirred for 15 h and then the solvent was removed under reduced pressure. For hydrolysis, the residue was dissolved in a mixture of 7 mL of acetic acid and 4 mL of 1 M aqueous hydrochloric acid and stirred for about an hour at 90° C. The reaction was monitored by TLC (RP-18, water—acetonitrile=1:1, v/v). The reaction mixture was filtered, filtrate was collected and solvent was removed on a rotary evaporator. The resulting crude product was passed through a Dowex 50WX8 (hydrogen form) ion-exchange column and then column purified on RP-18 (acetonitrile/water gradient) to yield 17 mg (8.5%) of squaraine-rotaxane SR-17. $\lambda_{max}$(abs): 682 nm, ε 294,000 $M^{-1}cm^{-1}$, $\lambda_{max}$(em): 705 nm, QY.: 49%-(phosphate buffer, pH 7.4).

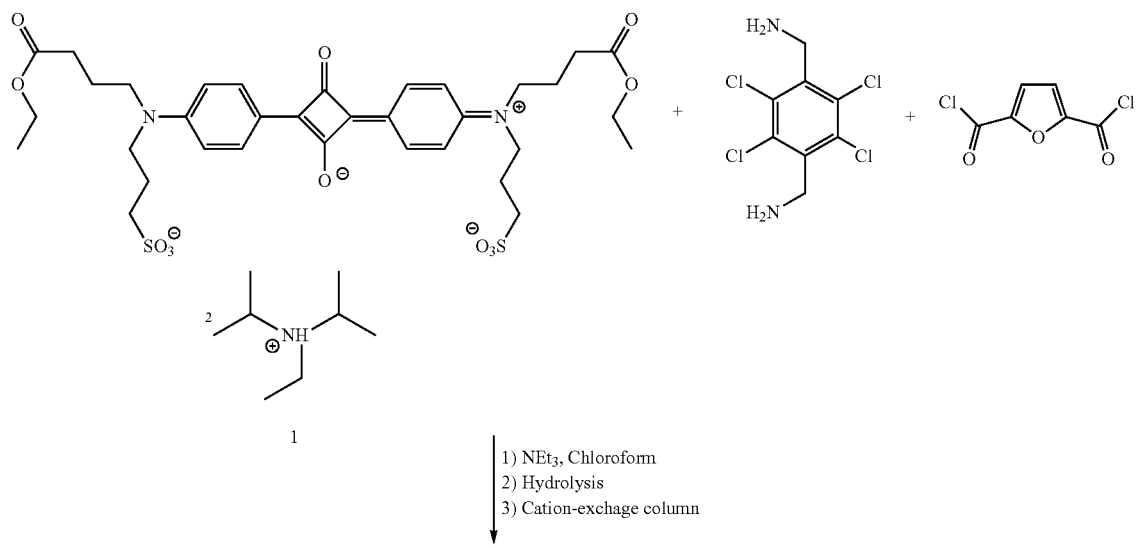

-continued

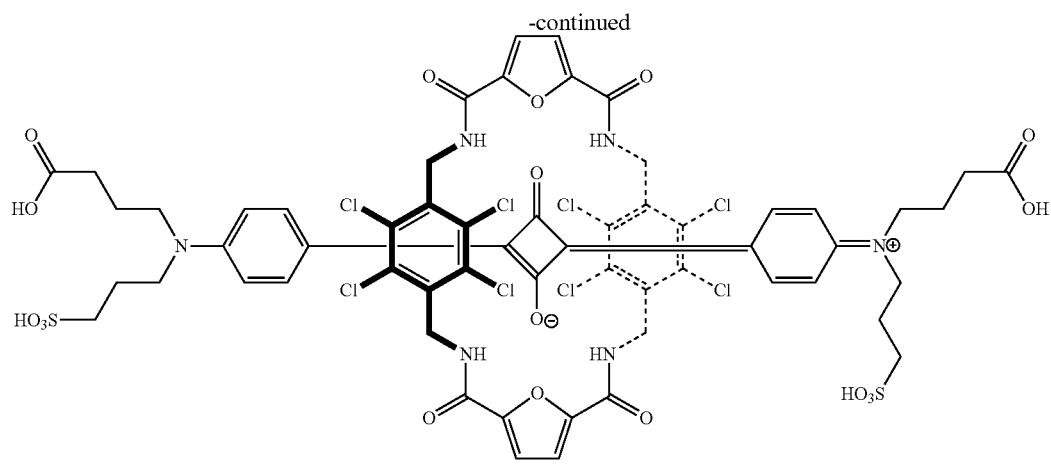

SR-17

Example 22

Synthesis of Symmetrical Squaraine-Rotaxane SR-18

Clear solutions of 2,5-furanedicarbonyl dichloride (65.4 mg, 0.34 mmol)—in 2.5 mL of chloroform and 4-aminomethyl-2,3,5,6-tetrachloro-phenylmethanamine (92.9 mg, 0.34 mmol) in 2.5 mL of chloroform were simultaneously added dropwise over a 4 h period to a stirred solution of 2 (96 mg, 0.085 mmol) in 3 mL of CHCl$_3$ with triethylamine (119 μL, 0.85 mmol). The reaction mixture was stirred for 15 h and then the solvent was removed under reduced pressure.

For hydrolysis, the residue was dissolved in a mixture of 5 mL of acetic acid and 3 mL of 1 M aqueous hydrochloric acid and stirred at 95° C. The reaction was monitored by TLC (RP-18, water—acetonitrile=1:1, v/v), and was completed in about one hour. The reaction mixture was filtered, filtrate was collected and solvent was removed by a rotary evaporator. The resulting crude product was passed through a Dowex 50WX8 (hydrogen form) ion-exchange column and then column purified on RP-18 (acetonitrile/water gradient) to yield 21.8 mg (17%) of squaraine-rotaxane SR-18; $\lambda_{max}$(abs): 681 nm, ε 287,000 M$^{-1}$cm$^{-1}$, $\lambda_{max}$(em): 704 nm, QY.: 31% (phosphate buffer, pH 7.4).

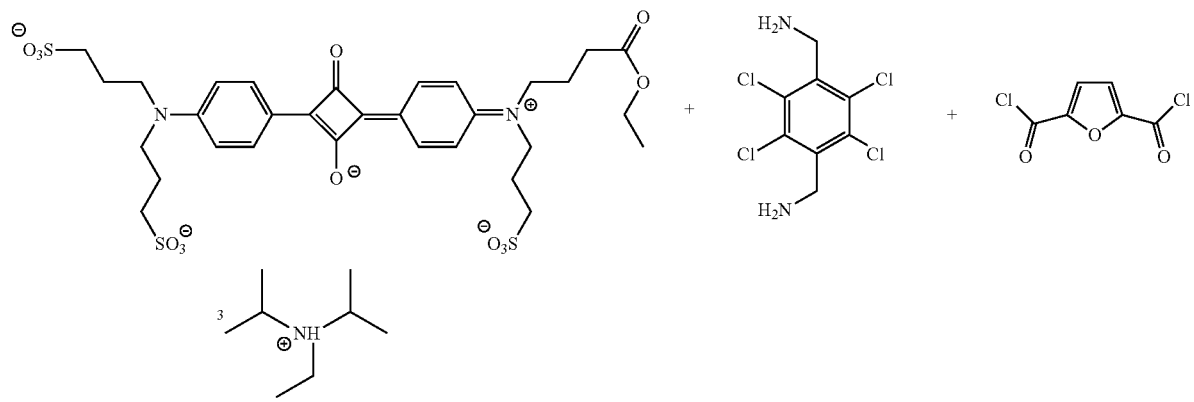

1) NEt$_3$, Chloroform
2) Hydrolysis
3) Cation-exchange column

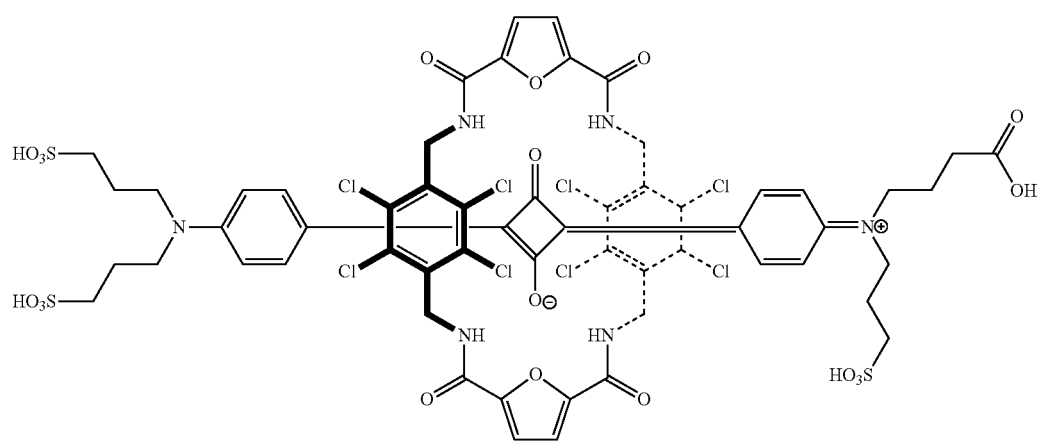
SR-18
Example 23
Synthesis of Symmetrical Squaraine-Rotaxane SR-19-NHS Ester
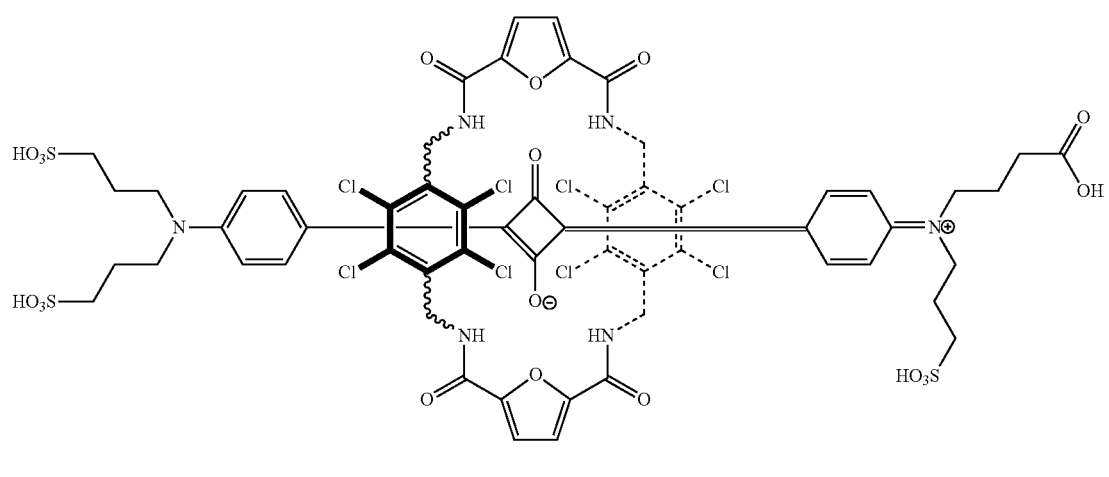
SR-19
TSTU, DIPEA

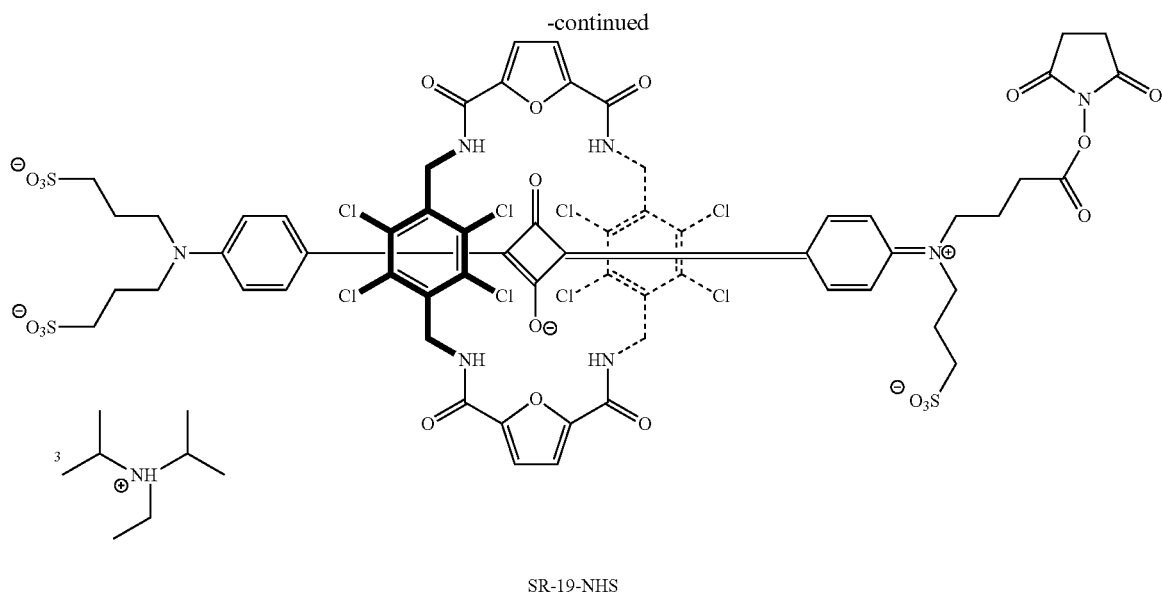

SR-19-NHS 10 mg of SR-19, 4.0 mg of TSTU, and 6 μmol of DIPEA were dissolved in 0.75 mL of DMF. The solution was stirred at room temperature for 1 h to give SR-9-NHS ester, which is used for labelling of IgG or other amine-containing species without additional purification.

Example 24

Synthesis of Symmetrical Squaraine-Rotaxane SR-20

Clear solutions of 2,5-pyrroledicarbonyl dichloride (104.8 mg, 0.546 mmol) in 3 mL of chloroform and 4-aminomethyl-2,3,5,6-tetrafluoro-phenylmethanamine (113.7 mg, 0.546 mmol) in 3 mL of chloroform were simultaneously added dropwise over a 3 h period to a stirred solution of 1 (134 mg, 0.136 mmol) in 5 mL of $CHCl_3$ with triethylamine (190 μL, 1.36 mmol). The reaction mixture was stirred for 15 h and then the solvent was removed under reduced pressure. For hydrolysis, the residue was dissolved in a mixture of 3 mL of acetic acid and 2 mL of 1 M aqueous hydrochloric acid and stirred for about an hour at 90° C. The reaction was monitored by TLC (RP-18, water—acetonitrile=1:1, v/v). The reaction mixture was filtered, filtrate was collected and the solvent was removed by a rotary evaporator. The resulting crude product was passed through a Dowex 50WX8 (hydrogen form) ion-exchange column and then column purified on RP-18 (acetonitrile/water gradient) to yield 7 mg of squaraine-rotaxane SR-20.

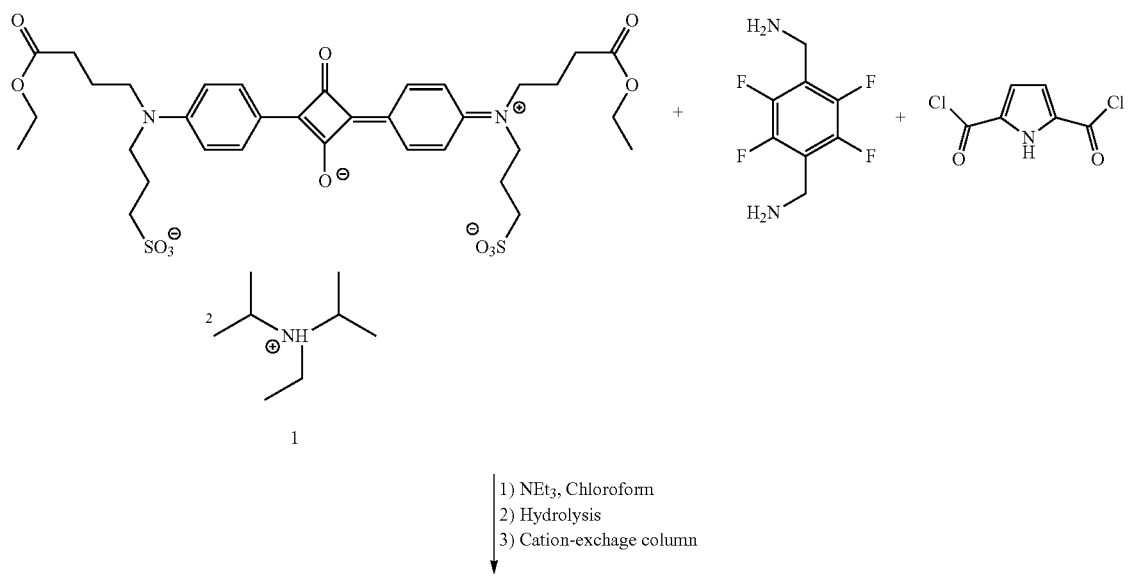

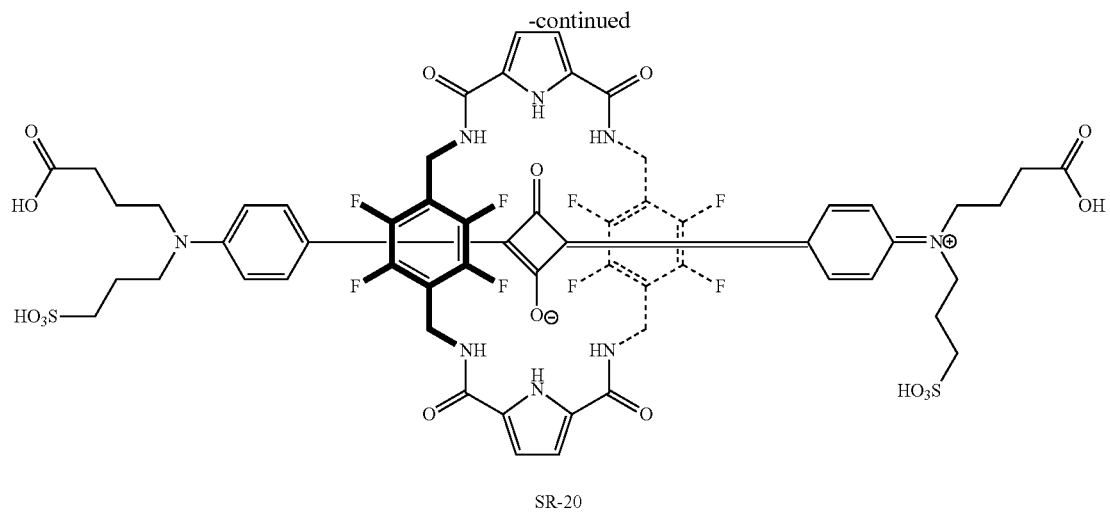

SR-20

Example 25

Synthesis of Symmetrical Squaraine-Rotaxane SR-21

A solution of 2,5-pyrroledicarbonyl dichloride (52 mg, 0.27 mmol)—in 3 mL in chloroform and 4-aminomethyl-2,3,5,6-tetrachloro phenylmethanamine (74 mg, 0.27 mmol) in 3 mL of chloroform were simultaneously added dropwise over a 3 h period to a stirred solution of 1 (66 mg, 0.067 mmol) in 6 mL of CHCl$_3$ and triethylamine (94 μL, 0.67 mmol). The reaction mixture was stirred for 15 h and then the solvent was removed under reduced pressure. For hydrolysis, the residue was dissolved in a mixture of 3 mL of acetic acid and 2 mL of 1 M aqueous hydrochloric acid and stirred at 90° C. The reaction was monitored by TLC (RP-18, water/acetonitrile=1:1, v/v), and was completed in an hour. The reaction mixture was filtered, filtrate was collected and solvent was removed on a rotary evaporator. The resulting crude product was passed through a Dowex 50WX8 (hydrogen form) ion-exchange column and then column purified on RP-18 (acetonitrile/water gradient) to yield 5.3 mg of squaraine-rotaxane SR-21.

$\lambda_{max}$(abs): 676 nm, $\lambda_{max}$(em): 707 nm, QY.: 13.5% (phosphate buffer, pH 7.4).

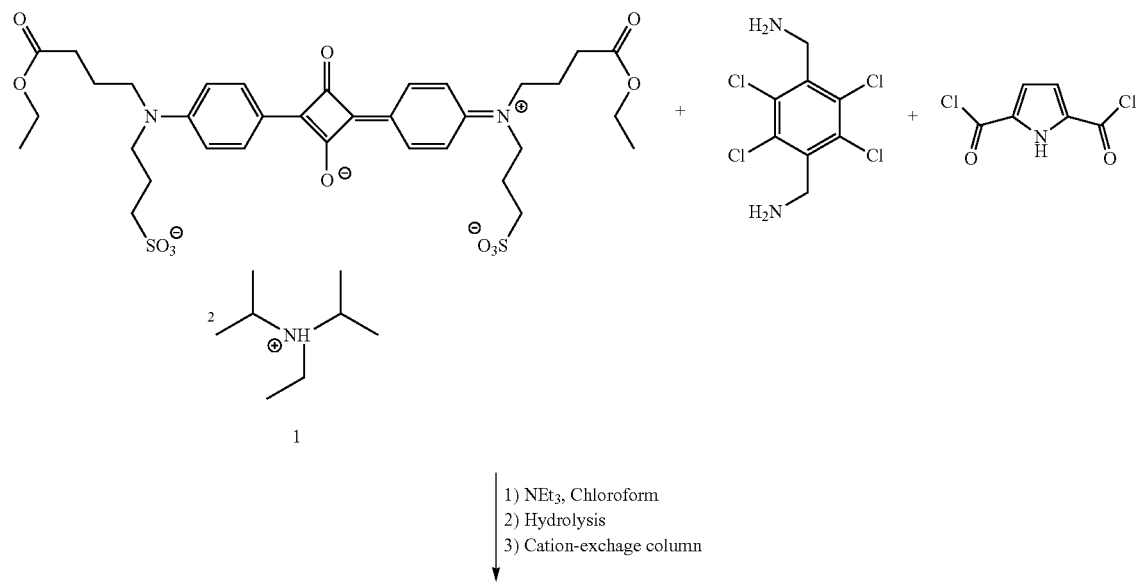

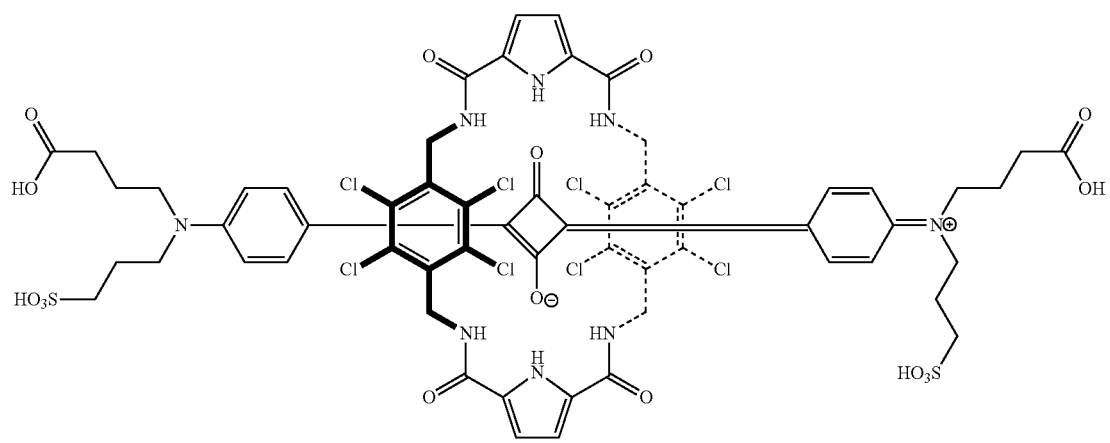
SR-21
Example 26
Synthesis of Symmetrical Squaraine-Rotaxane SR-22
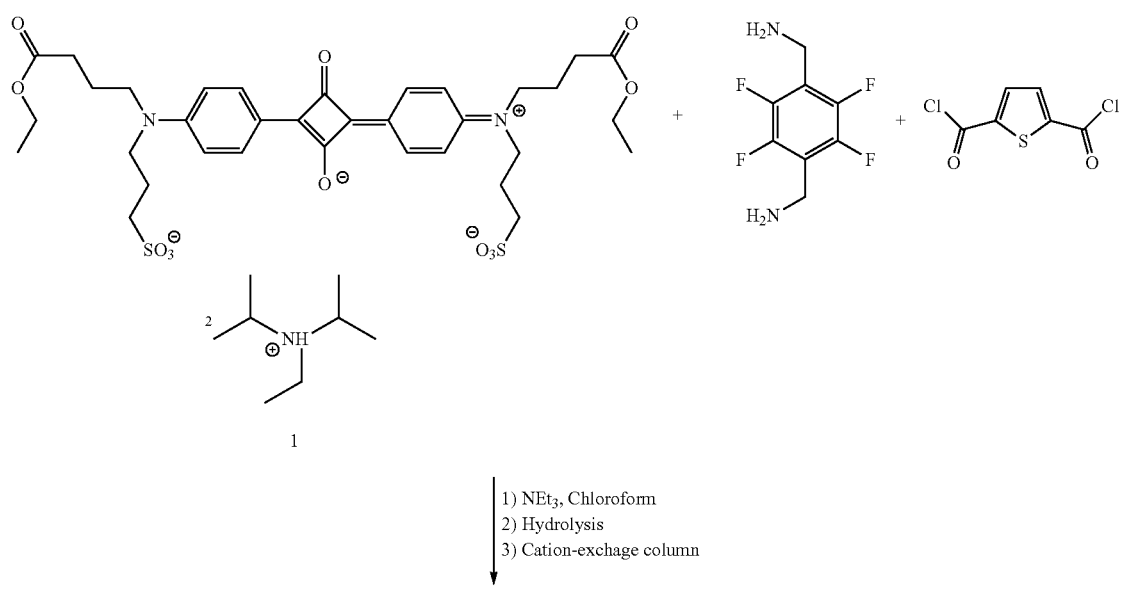
1) NEt₃, Chloroform
2) Hydrolysis
3) Cation-exchage column

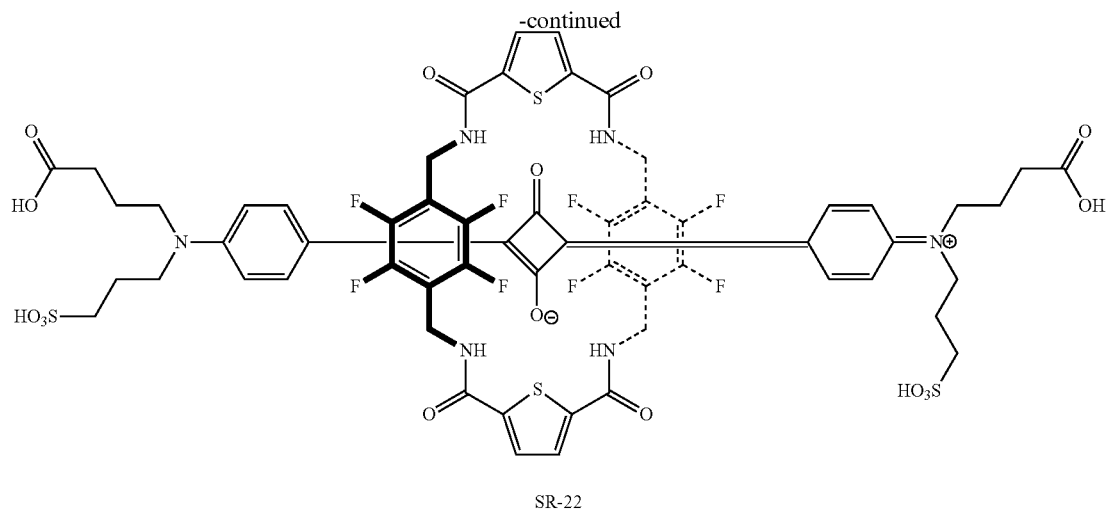

SR-22

Clear solutions of 2,5-thiophenedicarbonyl dichloride (43.5 mg, 0.208 mmol) in 3 mL of chloroform and 4-aminomethyl-2,3,5,6-tetrafluoro-phenylmethanamine (43.3 mg, 0.208 mmol) in 3 mL of chloroform were simultaneously added dropwise over a 4 h period to a stirred solution of 1 (51 mg, 0.052 mmol) in 6 mL of CHCl$_3$ with triethylamine (734, 0.52 mmol). The reaction mixture was stirred for 15 h and then the solvent was removed under reduced pressure. For hydrolysis, the residue was dissolved in a mixture of 4 mL acetic acid and 2 mL of 1 M aqueous hydrochloric acid and stirred at 90° C. The reaction was monitored by TLC (RP-18, water—acetonitrile=1:1, v/v), which was ended in an hour. The reaction mixture was filtered, filtrate was collected and the solvent was removed by a rotary evaporator. The resulting crude product was passed through a Dowex 50WX8 (hydrogen form) ion-exchange column and then column purified on RP-18 (acetonitrile/water gradient) to yield two isomers of squaraine-rotaxane SR-22. Isomer I (SR-22-I), yield: 1.5 mg: $\lambda_{max}$(abs): 645 nm, $\lambda_{max}$(em): 674 nm. Isomer II (SR-22-11), yield: 1.1 mg: $\lambda_{max}$(abs): 647 nm, $\lambda_{max}$(em): 681 nm.

Example 27

Synthesis of Squaraine-Rotaxane SR-23

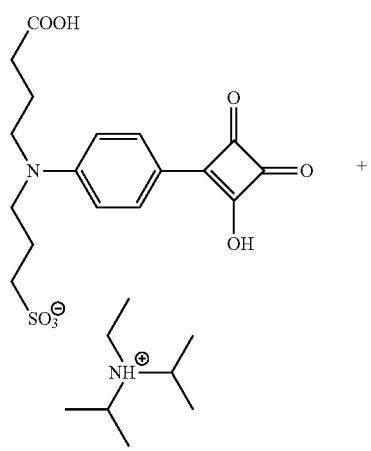

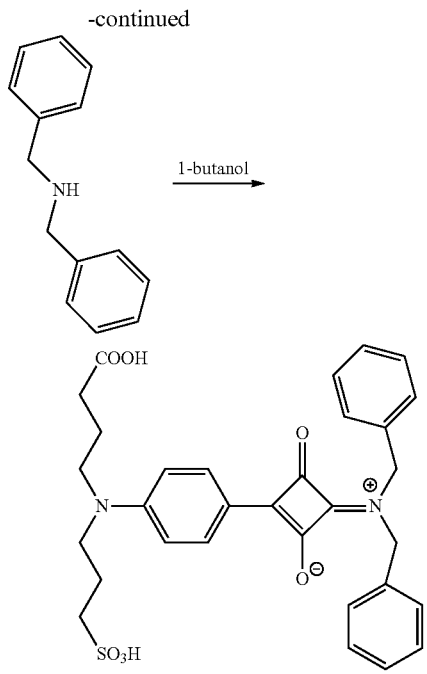

Ethyl-diisopropyl-ammonium 3-((3-carboxypropyl)(4-(2-hydroxy-3,4-dioxocyclobut-1-en-1-yl)phenyl)amino)propane-1-sulfonate (645 mg, 1.22 mmol) and dibenzylamine (322 mg, 1.63 mmol) were dissolved and mixed under heating in 8 ml of butanol. After 1.5 hours the solvent was evaporated under reduced pressure; the residue was passed through the cation exchange resin Dowex 50WX8 and purified by flash chromatography (Silica gel RP-18, acetonitrile/water gradient) to yield 2-(4-((3-carboxypropyl)(3-sulfopropyl)amino)phenyl)-4-(dibenzyliminio)-3-oxocyclobut-1-enolate.

$^1$H NMR (DMSO-d6): 1.75-1.78 (2H, t), 1.84-1.87 (2H, t), 2.29-2.32 (2H, t), 2.52 (2H, t), 3.39-3.43 (2H, t), 3.50-3.54 (2H, t), 4.92 (4H, s), 6.92-6.94 (2H, d), 7.36-7.44 (10H, m), 7.97-7.99 (2H, d). $\lambda_{max}$(abs): 461 nm, $\lambda_{max}$(em): 517 nm, QY.: 1.3% (phosphate buffer, pH 7.4).

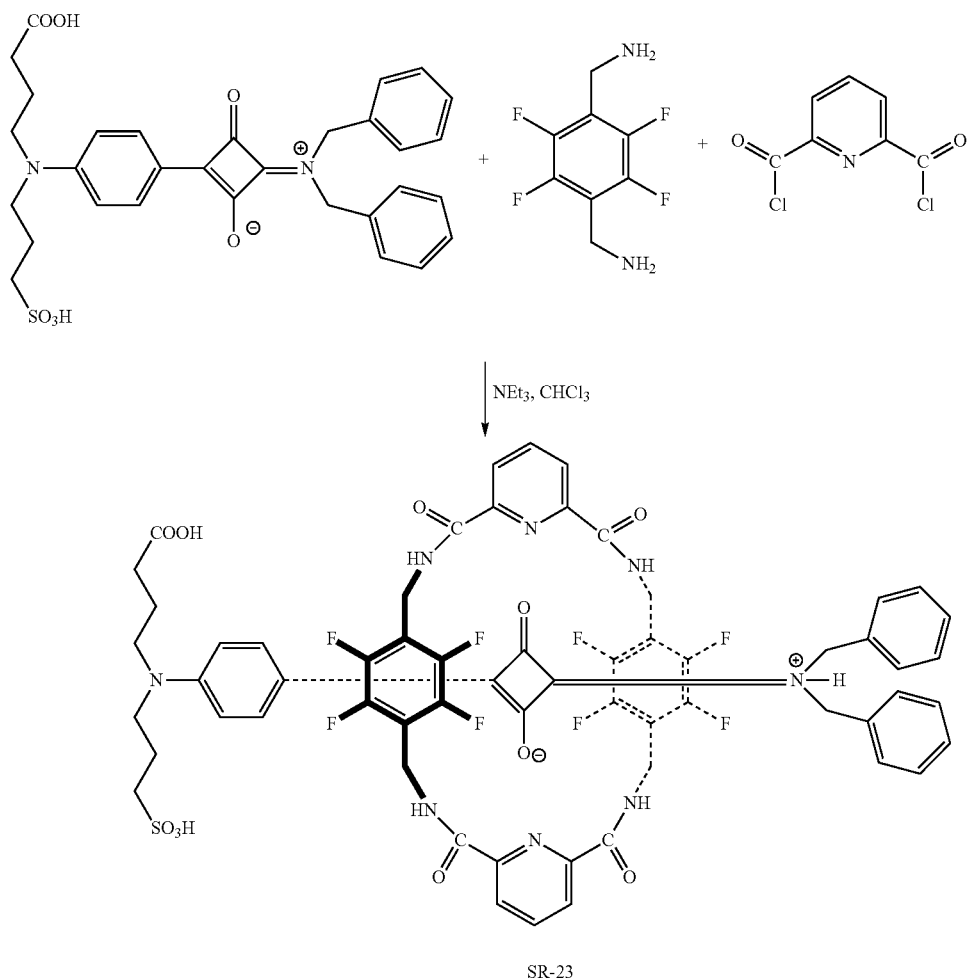

SR-23

Clear solutions of 2,6-pyridinedicarbonyl dichloride (141 mg, 0.692 mmol) in 5 mL of chloroform and 4-aminomethyl-2,3,5,6-tetrafluoro phenylmethanamine (144 mg, 0.692 mmol) in 5 mL of chloroform were simultaneously added dropwise over a 5 h period to a stirred solution of 2-(4-((3-carboxypropyl)(3-sulfopropyl)amino)phenyl)-4-(dibenzyliminio)-3-oxocyclobut-1-enolate (100 mg, 0.173 mmol) and triethylamine (1.73 mmol). After stirring overnight, the reaction mixture was filtered to remove any polymeric materials, and the resulting crude product was column purified (Silica gel 60 RP-18, acetonitrile/water gradient).

SR-23: $\lambda_{max}$(abs): 483 nm, $\varepsilon$ 65,000 M$^{-1}$cm$^{-1}$, $\lambda_{max}$(em): 536 nm, QY.: 30% (phosphate buffer, pH 7.4).

Example 28

Synthesis of Squaraine-Rotaxane SR-24

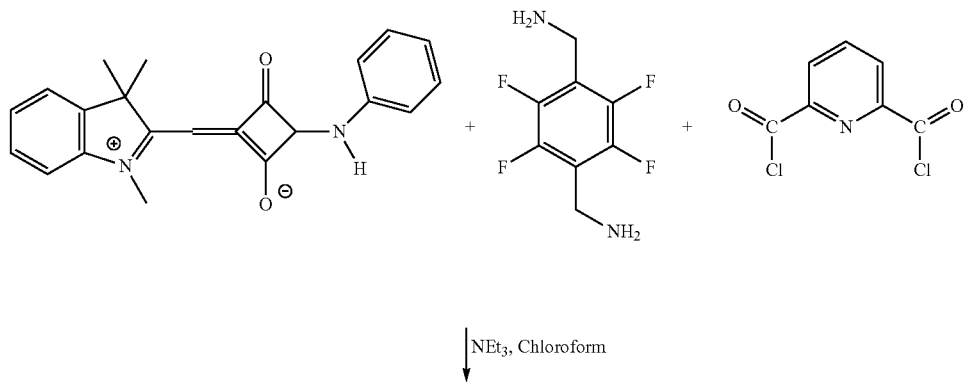

NEt$_3$, Chloroform

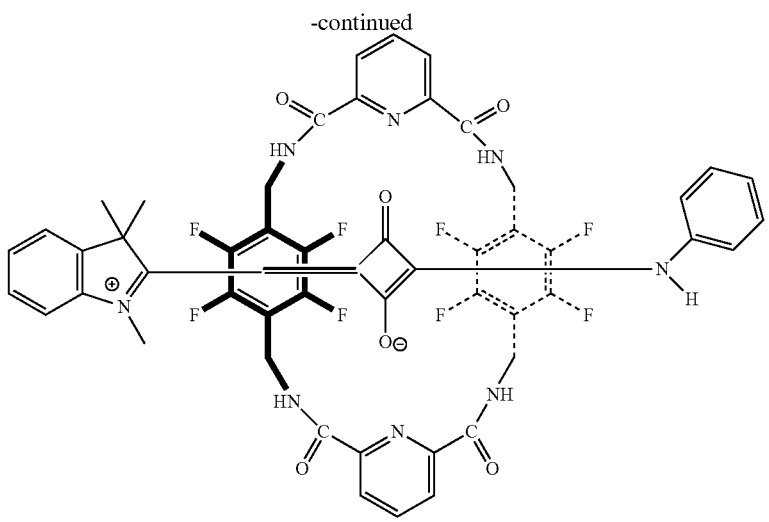

SR-24

Clear solutions of 2,6-pyridinedicarbonyl dichloride (0.58 mmol) in 5 mL of chloroform and 4-aminomethyl-2,3,5,6-tetrafluorophenylmethanamine (0.58 mmol) in 5 mL of chloroform were simultaneously added dropwise over a 5 h period to a stirred solution of squaraine dye (3-oxo-2-(phenylamino)-4-((1,3,3-trimethyl-3H-indol-1-ium-2-yl)methylene)cyclobut-1-enolate) (50 mg, 0.145 mmol) and triethylamine (1.45 mmol). The reaction mixture was stirred overnight, then filtered to remove any polymeric materials, and the resulting crude product was column purified (silica gel 60, methanol/chloroform gradient). $\lambda_{max}$(abs): 524 nm, $\lambda_{max}$(em): 538 nm (Chloroform).

Example 29

Synthesis of Squaraine-Rotaxane SR-25

3-((2,6-Di-tert-butyl-4H-pyran-4-ylidene)methyl)-4-methoxycyclobut-3-ene-1,2-dione (150 mg, 0.477 mmol) was mixed with 45 mL of ethanol and 0.4 mL of 40% sodium hydroxide. The mixture was boiled for 7 minutes. After cooling it was acidified with hydrochloric acid to pH=2-3. Ethanol was evaporated under reduced pressure, and precipitate formed was filtered off. Yield 125 mg (86%).

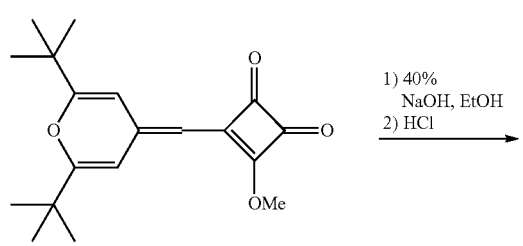

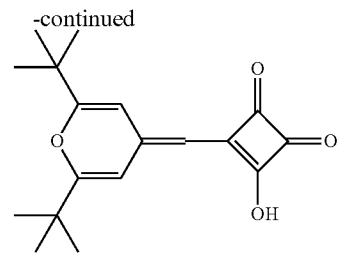

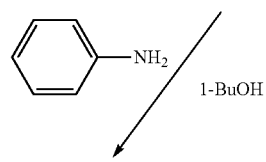

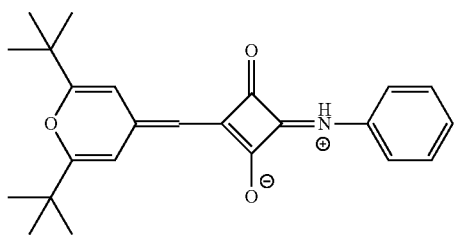

3-((2,6-di-tert-butyl-4H-pyran-4-ylidene)methyl)-4-hydroxycyclobut-3-ene-1,2-dione (91 mg, 0.3 mmol) was dissolved in 3 mL of 1-butanol followed by 36.45 μL (0.4 mmol) of aniline were added. The mixture was heated at around 100° C. for 3.5 h. Then the solvent was evaporated under reduced pressure; the residue was purified by flash chromatography (Silica gel 60, acetonitrile/chloroform gradient). The fraction containing the product was evaporated on a rotary evaporator. Yield: 18.2 mg (16.1%). $\lambda_{max}$(abs): 534 nm, 573 nm, $\lambda_{max}$(em): 590 nm (Chloroform).

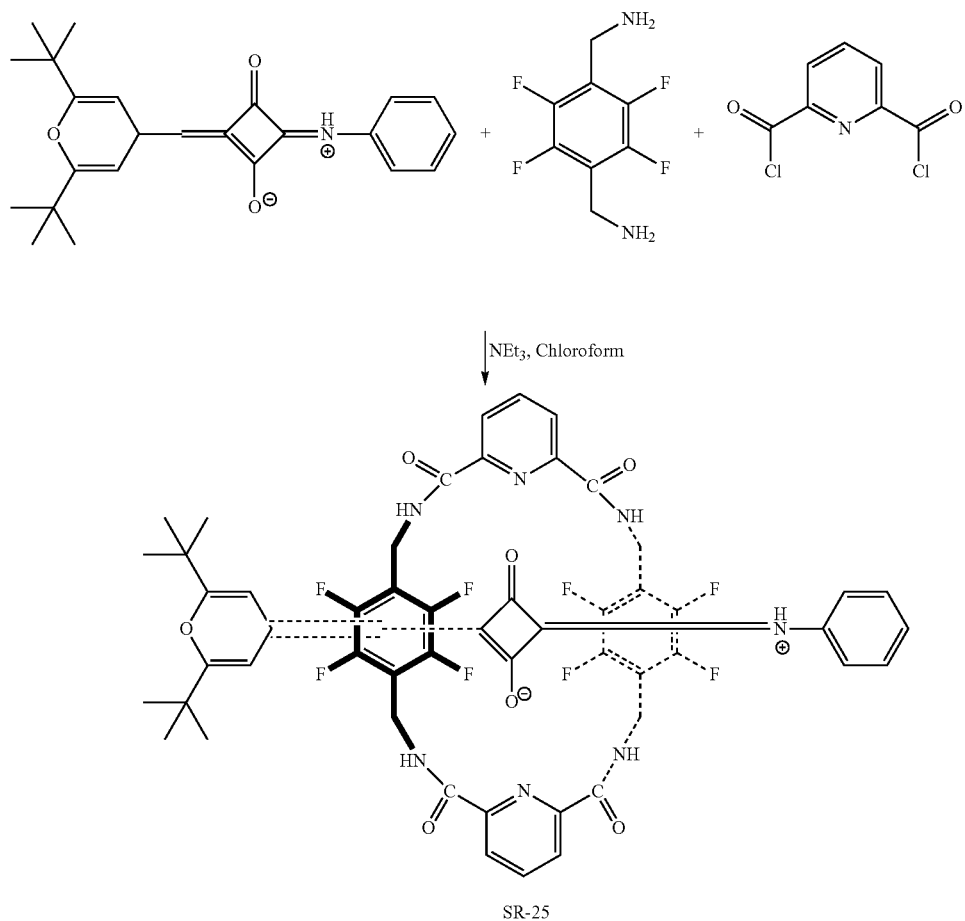

SR-25

Example 30

Synthesis of Squaraine-Rotaxane SR-26

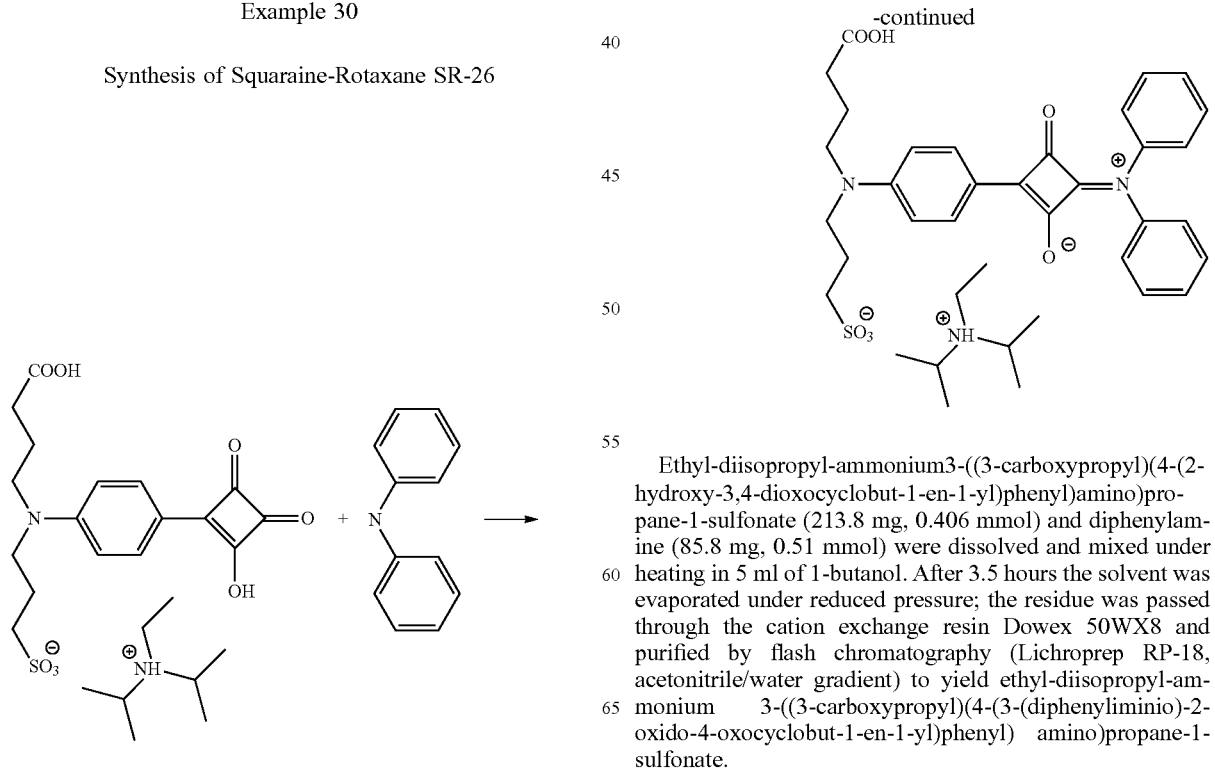

Ethyl-diisopropyl-ammonium3-((3-carboxypropyl)(4-(2-hydroxy-3,4-dioxocyclobut-1-en-1-yl)phenyl)amino)propane-1-sulfonate (213.8 mg, 0.406 mmol) and diphenylamine (85.8 mg, 0.51 mmol) were dissolved and mixed under heating in 5 ml of 1-butanol. After 3.5 hours the solvent was evaporated under reduced pressure; the residue was passed through the cation exchange resin Dowex 50WX8 and purified by flash chromatography (Lichroprep RP-18, acetonitrile/water gradient) to yield ethyl-diisopropyl-ammonium 3-((3-carboxypropyl)(4-(3-(diphenyliminio)-2-oxido-4-oxocyclobut-1-en-1-yl)phenyl) amino)propane-1-sulfonate.

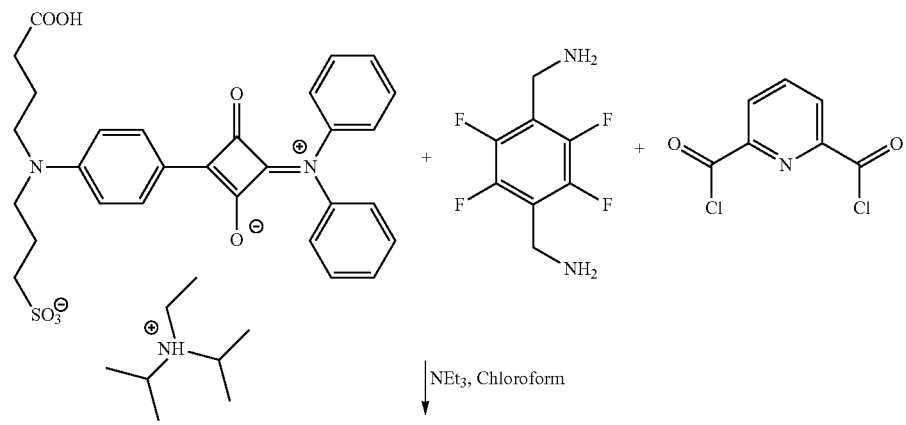
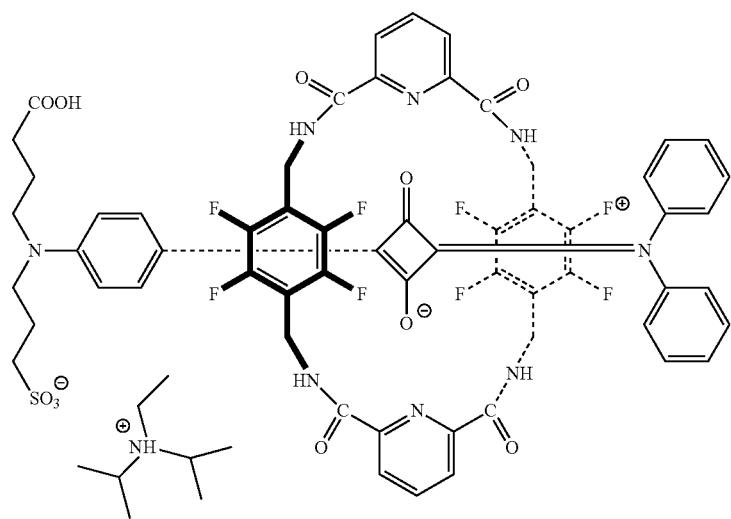
SR-26

Clear solutions of 2,6-pyridinedicarbonyl dichloride (0.08 mmol) in 5 mL of chloroform and 4-aminomethyl-2,3,5,6-tetrafluorophenylmethanamine (0.08 mmol) in 5 mL of chloroform were simultaneously added dropwise over a 5 h period to a stirred solution of 14 mg (0.02 mmol) of ethyl-diisopropyl-ammonium 3-((3-carboxypropyl)(4-(3-(diphenyliminio)-2-oxido-4-oxocyclobut-1-en-1-yl)phenyl)amino)propane-1-sulfonate and triethylamine (0.2 mmol). The reaction mixture was stirred overnight, then filtered to remove any polymeric materials, and the resulting crude product was column purified (Lichroprep RP-18, acetonitrile/water gradient). SR-26: $\lambda_{max}$(abs): 516 nm, $\lambda_{max}$(em): 576 nm (phosphate buffer, pH 7.4).

Example 31

Synthesis of Conjugate of Squaraine-Rotaxane with Trolox a) SR-27-Trolox

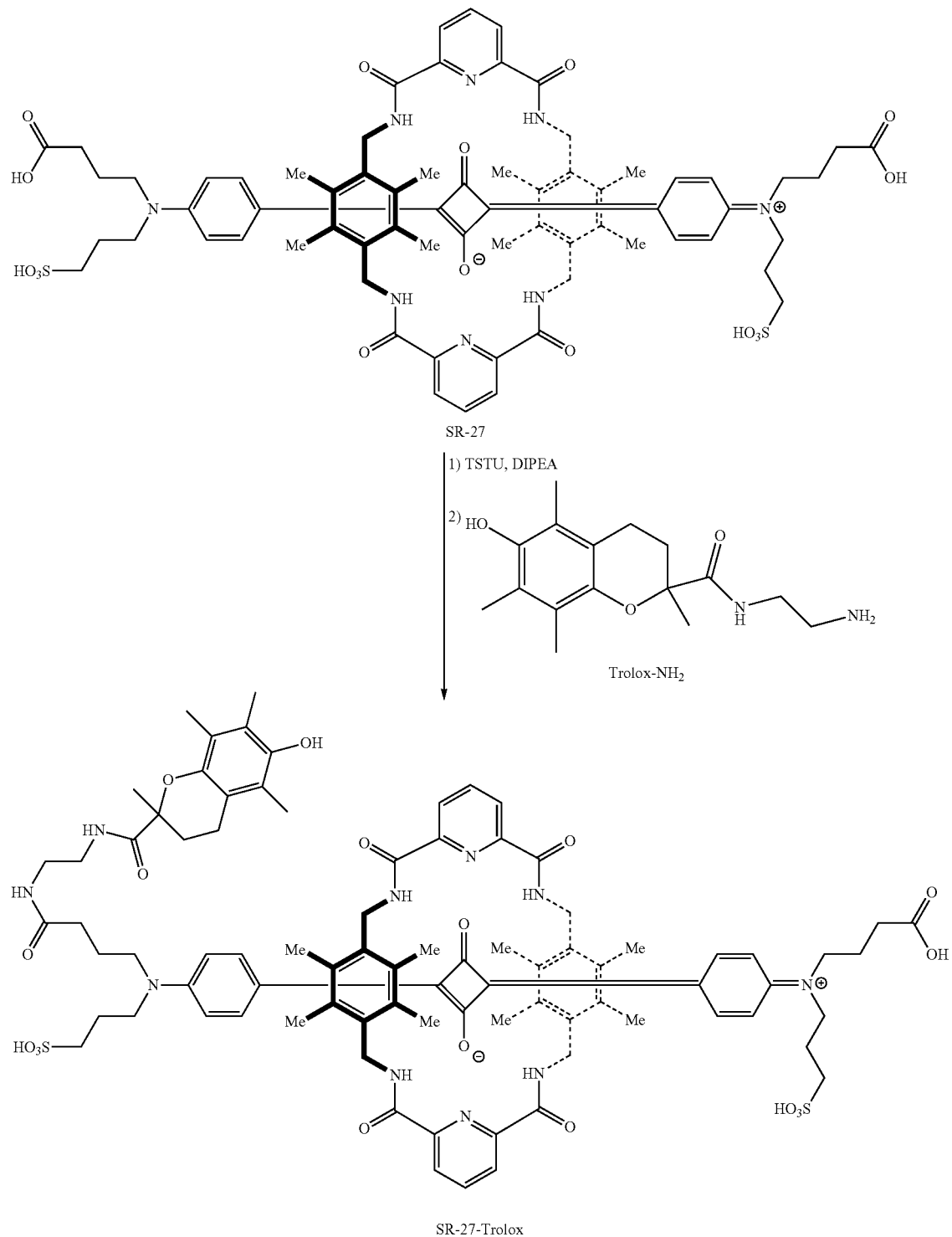

8.8 mg (6.7 μmol) of SR-27, 6 mg (0.02 mmol) of TSTU, and 6 μL (33.3 μmol) of DIPEA were dissolved in 0.8 mL of DMF. The solution was stirred at room temperature for 1 h. The reaction product was precipitated and washed with ether 3×5 ml each to give 8.5 mg (72%) of SR-27-di-NHS ester.

8.5 mg (4.8 μmol) of SR-27-di-NHS ester and 1.0 mg (3.4 μmol) of amino-modified Trolox (Trolox-NH$_2$), obtained by procedure of R. B. Altman et al., Nature Methods, Vol. 9, P. 68-71 (2012), were dissolved in 0.4 mL of borate buffer (pH 8.5). The solution was stirred at room temperature for 0.5 h. The reaction was monitored by HPLC. The reaction product was precipitated and the resulting residue was column purified on RP-18 (acetonitrile/water gradient) to yield 3.8 mg (43%) of SR-27-Trolox conjugate. $\lambda_{max}$(abs): 650 nm, $\lambda_{max}$(em): 693 nm (phosphate buffer, pH 7.4).

b) SR-12-Trolox

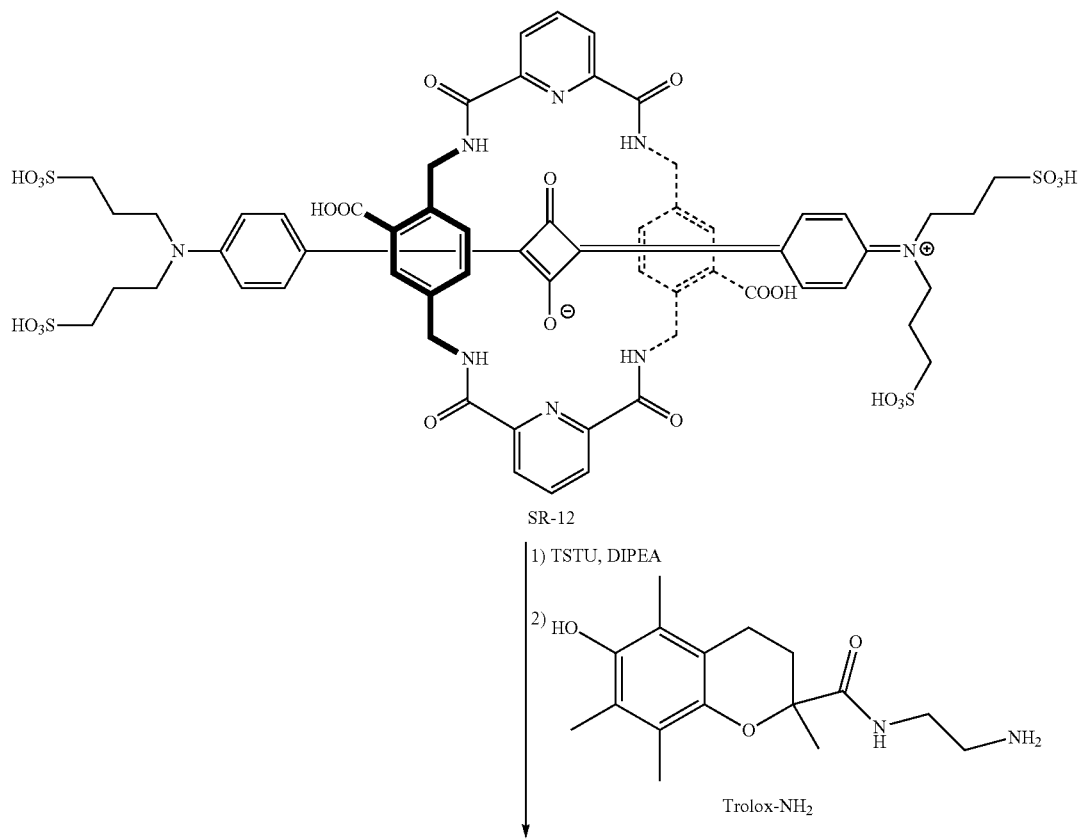

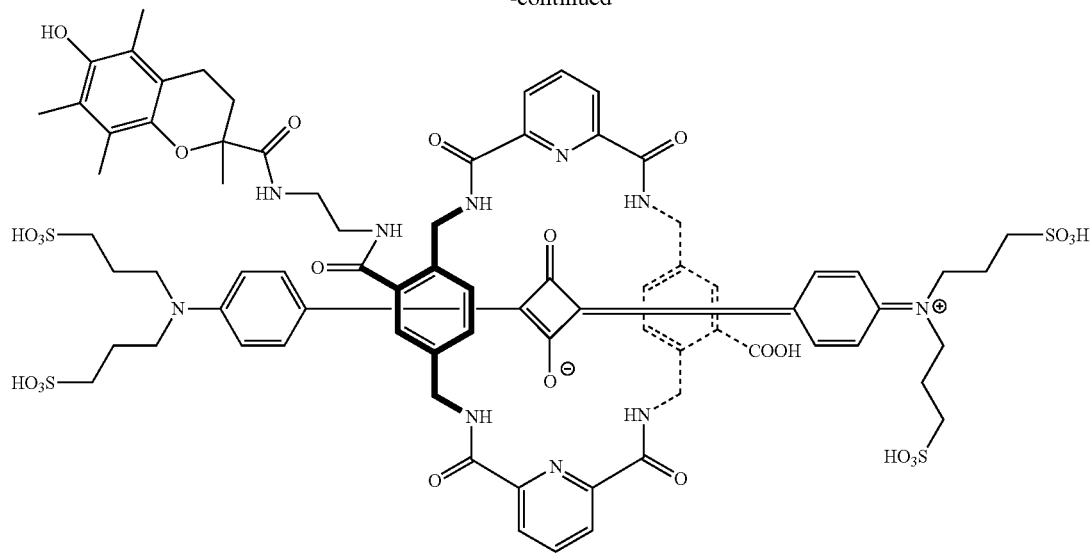

SR-12-Trolox 13.8 mg (0.01 mmol) of SR-12, 9 mg (0.03 mmol) of TSTU, and 14 µL (0.08 mmol) of DIPEA were stirred in 0.8 mL of DMF for 1 h at room temperature. The reaction product was precipitated and treated with diethyl ether 3×5 ml each to yield SR-12-di-NHS ester (15.6 mg, 75%).

15.6 mg (7.5 µmol) of SR-12-di-NHS ester and 2.6 mg (9 µmol) of amino-modified Trolox (Trolox-NH$_2$), obtained by procedure of R. B. Altman et al. Nature Methods, Vol. 9, P. 68-71 (2012), were dissolved in 0.5 mL of borate buffer (pH 8.5). The solution was stirred at room temperature for an hour (reaction was monitored by HPLC). The reaction product was precipitated and then the resulting crude product was column purified on RP-18 (acetonitrile/water gradient) to yield 6 mg (48.5%) of squaraine-rotaxane conjugate SR-12-Trolox, containing one carboxy group for functionalization.

Example 32

Photostability of Novel Squaraine-Rotaxane Dyes

The photostability of several of the newly synthesized squaraine-rotaxanes (SR-dyes) was measured in phosphate buffer, pH 7.4. Solutions with an absorbance (optical density) in the range between 0.18 and 0.23 (measured in standard 1-cm quartz cells with stoppers) at the absorbance maximum were prepared. The samples in stoppered cells were placed at a distance of 30 cm in a cell holder covered with an aluminum foil as a reflector and irradiated with a metal-halogen lamp Philips HPI-T Plus 400W/645 without any filters. The temperature measured at close proximity from the samples during light exposure was 45° C. The relative photostabilities were calculated as the ratio between (i) the measured absorbances at the long-wavelength maximum before and after exposure (A/A0) and (ii) relative fluorescence intensities before and after exposure (I/I0), and the corresponding plot (FIG. 7.) was generated.

Example 33

Examples of Novel Macrocyclic Structures

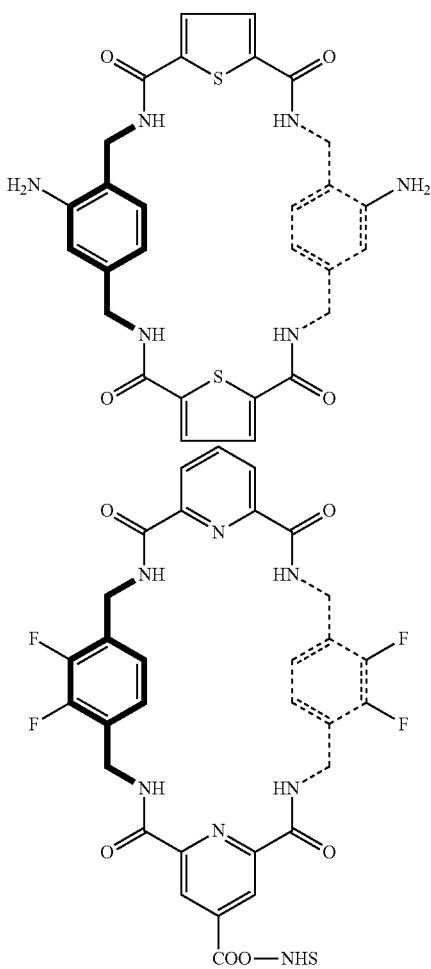

89
-continued
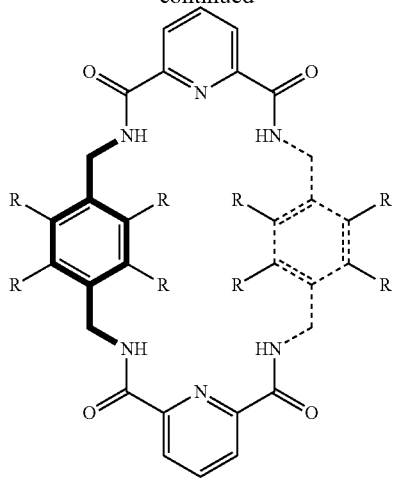
R = H, Halogen, Cyano, OH
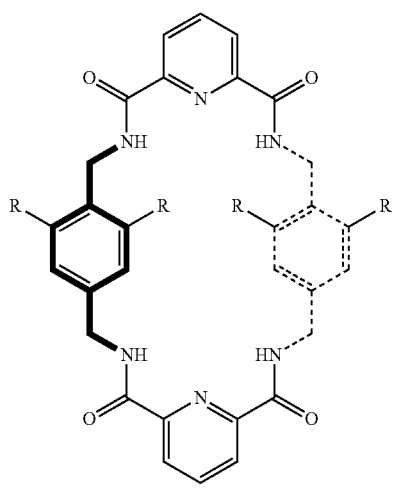
R = Nitro, Halogen
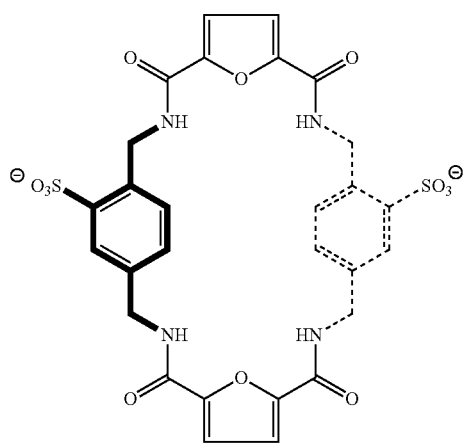
90
-continued
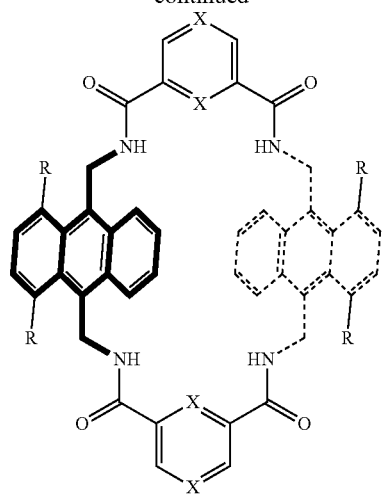
X = CH or N
R = Halogen
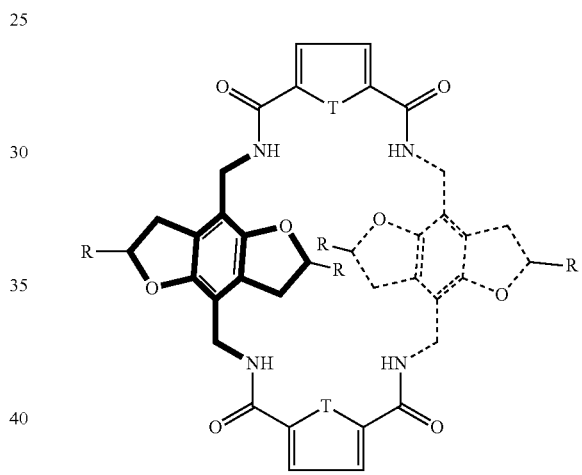
T = O, NH, S
R = H, Halogen, alkyl, OMe
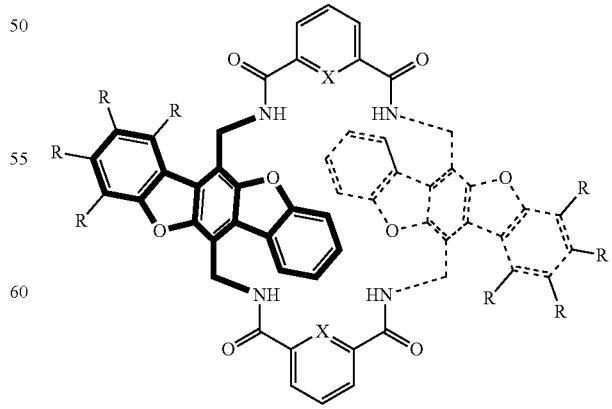
X = CH or N
R = Halogen or H

91
-continued
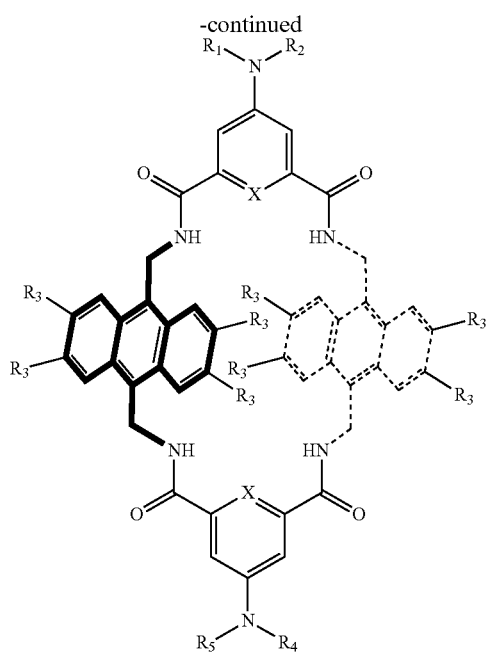
X = CH or N
R₃ = Sulfo
R₁, R₂, R₄, R₅ are independently
—(CH₂)ₙ—R,  R = CH₃, COOH, COONHS, SO₃H,
—PO(OH)₂, —POc(OAlk)₂, n = 0-10
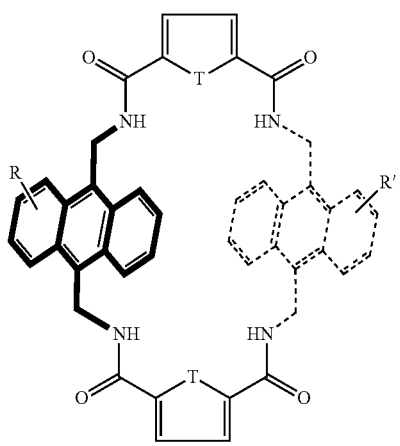
T = O, NH, S
R or R' is
—(CH₂)ₙ—CH₃, OH, —O—(CH₂)ₙ—CH₃,
—(CH₂)ₙ—COOH, n = 0-10
92
-continued
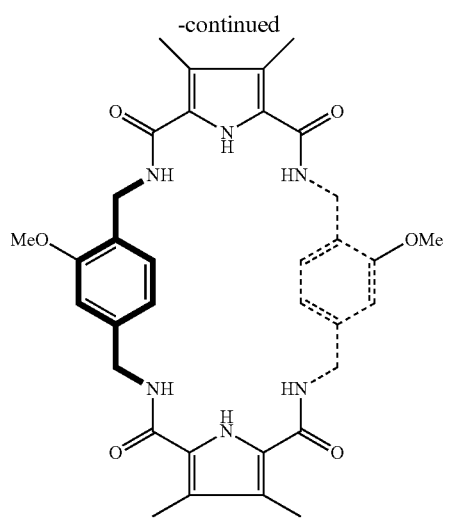
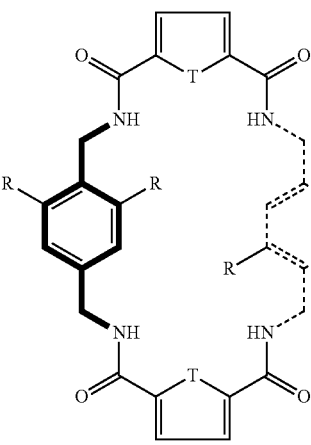
T = O, S, NH
R = COOH, COONHS, SO₃H,
—PO(OH)₂, —PO(OAlk)₂,  n = 1-10
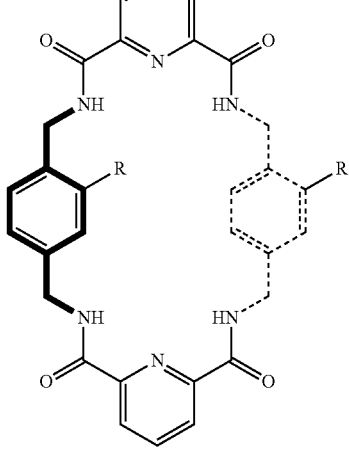
R = Nitro, SO₃H, Halogen, COOH, NH₂

R = Nitro, SO₃H, Halogen
Example 34
Examples of Representative Rotaxane Structures
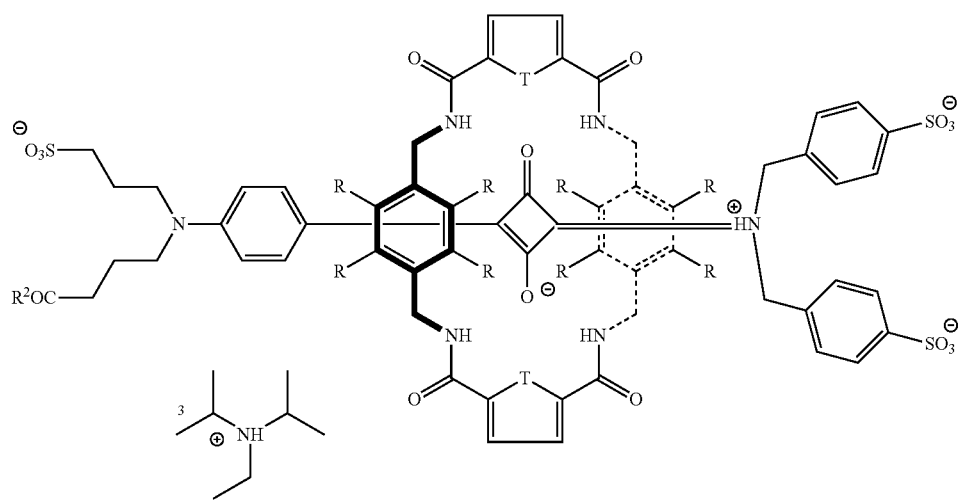
T = O, S, NH
R = H, CH₃, Halogen, NO₂, OCH₃, SO₃H, COOH, NH₂
R² = OH, NHS, NH—CH₂CH₂-maleimide -continued
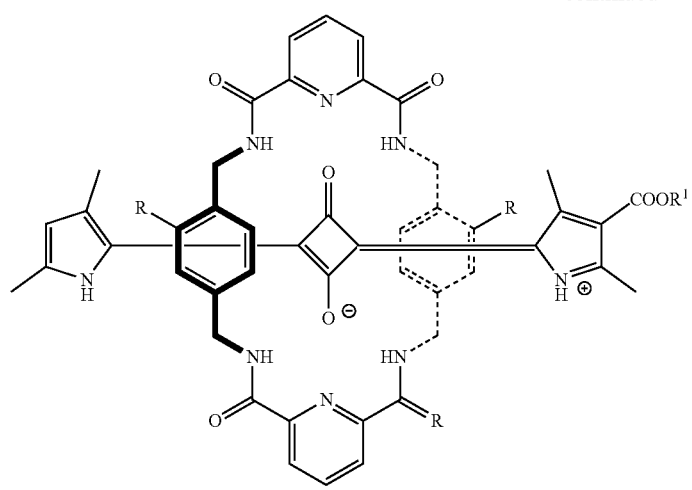
R = Halogen or H
R[1] = H, —NHS, —NH—CH₂CH₂-maleimide
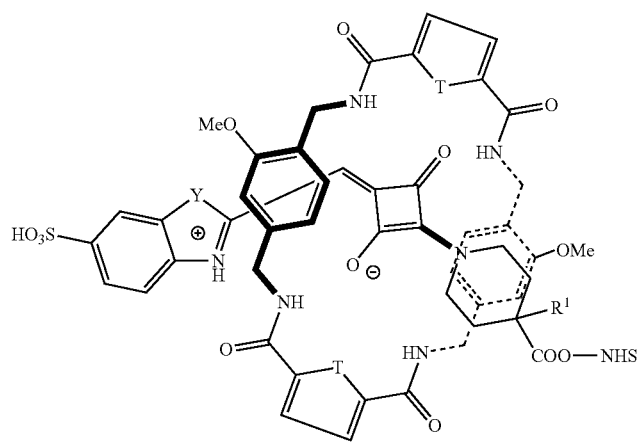
Y = CMe₂, O, S, Se
T = O, S, NH
R[1] = (CH₂O)$_n$CH₃ $n$ = 1-10
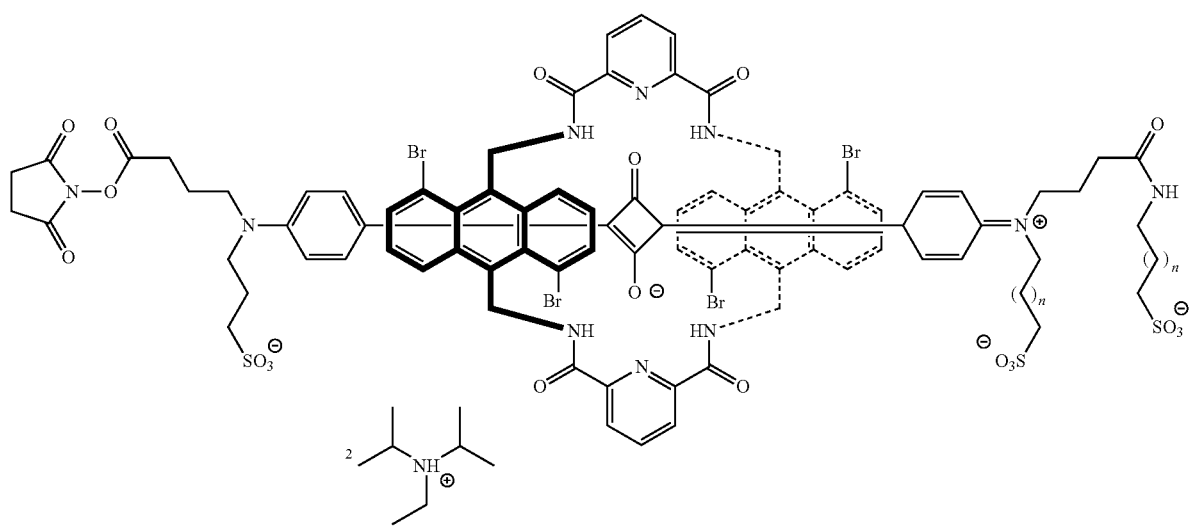
$n$ = 0, 1 or 2

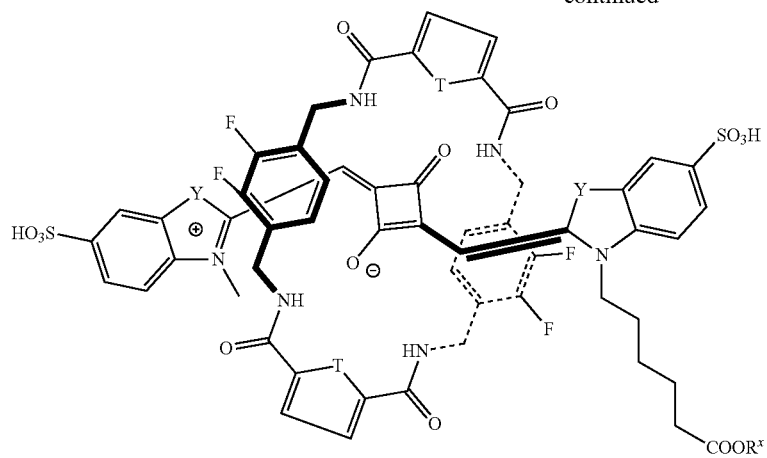
T = O, S, NH
Y = O, S, Se
R$^x$ = H, NHS
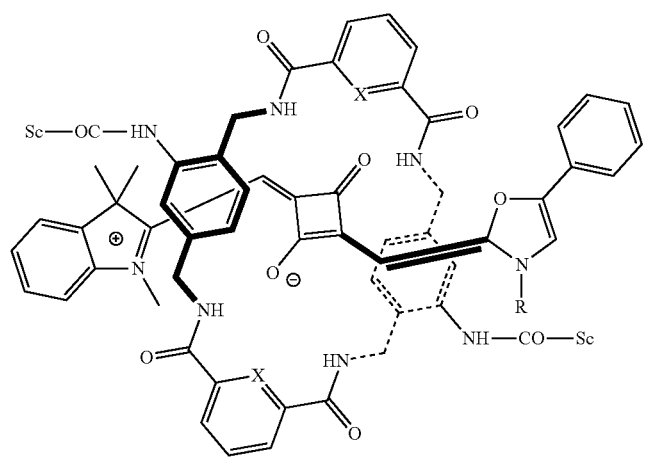
X = N, CR$^2$
R = H, Me, L—R$^x$
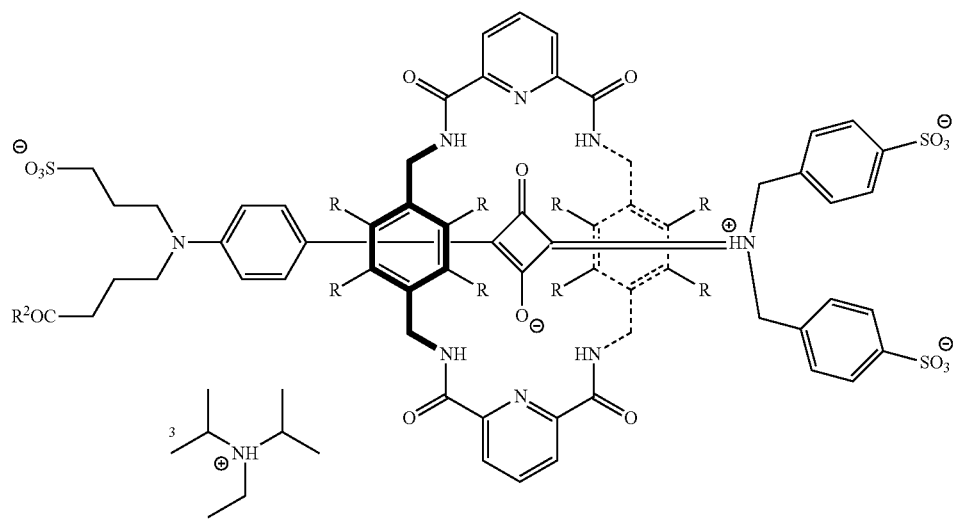
R = H, CH$_3$, Halogen, NO$_2$, OCH$_3$, COOH, SO$_3$H, NH$_2$
R$^2$ = OH, NHS, NH—CH$_2$CH$_2$-maleimide

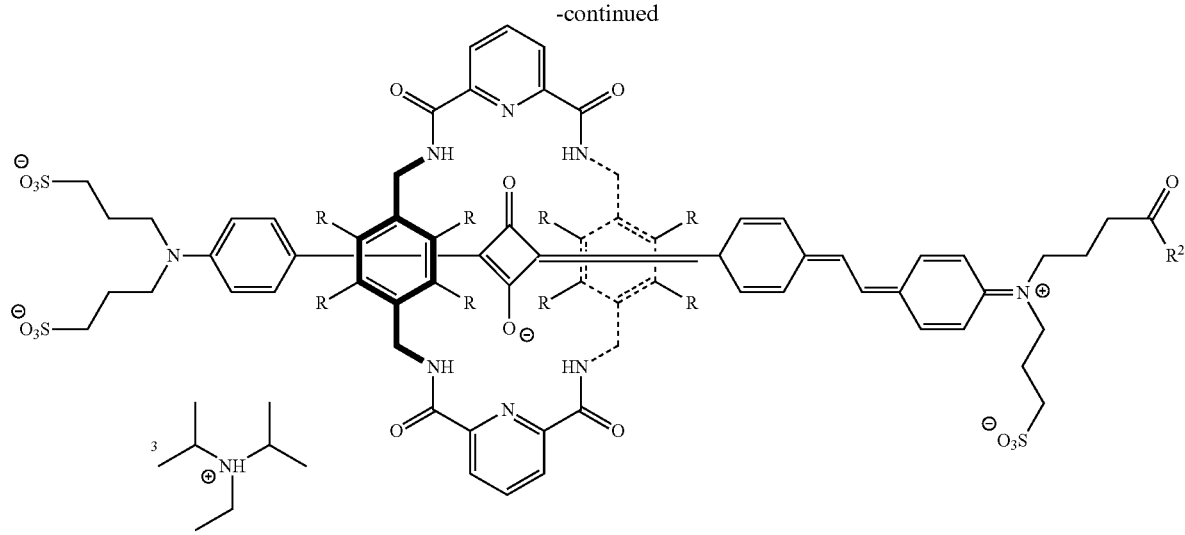
R = H, CH₃, Halogen, NO₂, OCH₃, SO₃H, COOH, NH₂
R² = OH, NHS, NH—CH₂CH₂-maleimide
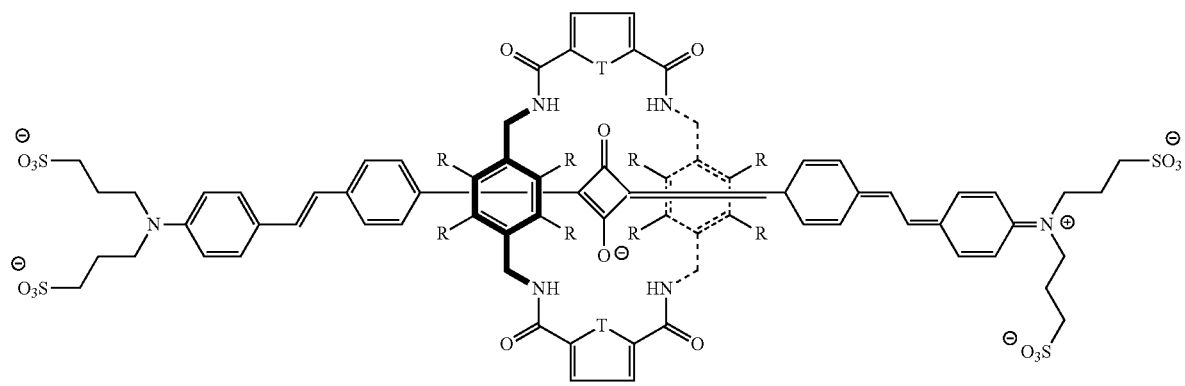
T = O, S, NH
R = H, CH₃, Halogen, NO₂, OCH₃, SO₃H, COOH, NH₂
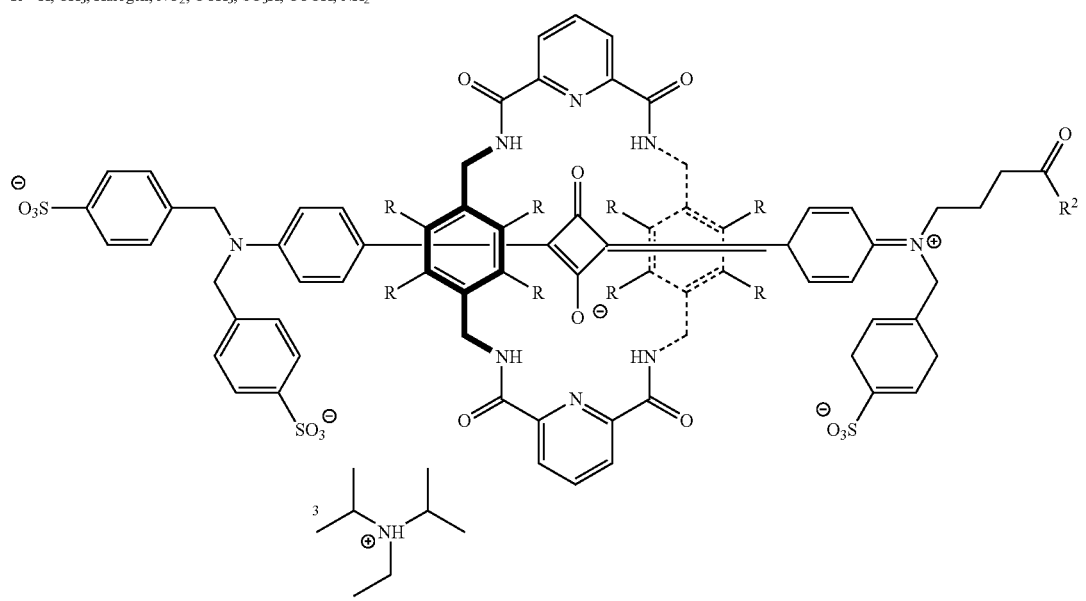
R² = OH, NHS, NH—CH₂CH₂-maleimide
R = H, CH₃, Halogen, NO₂, COOH, OCH₃, SO₃H, NH₂

-continued
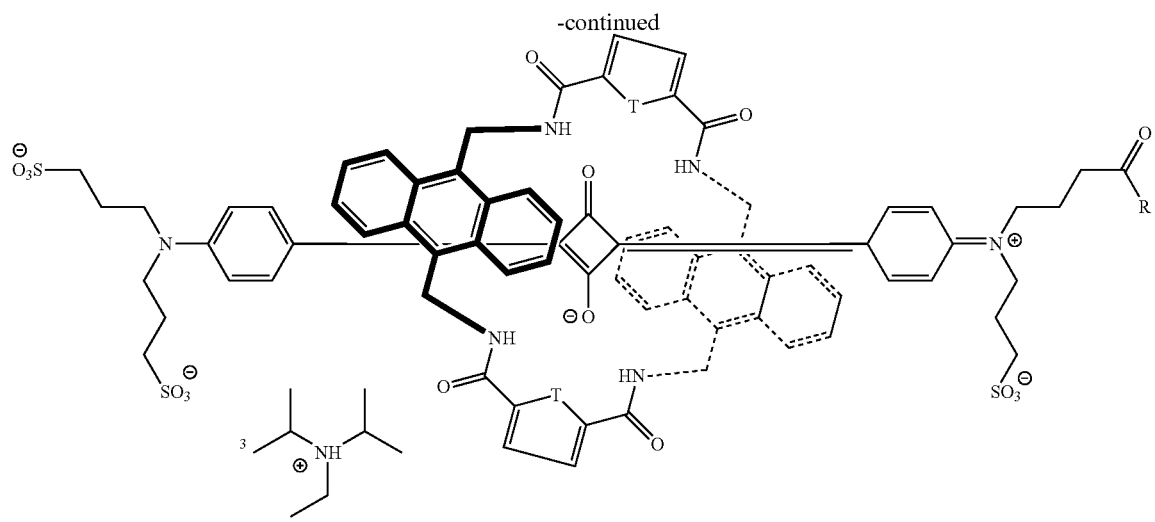
T = O, S, NH
R = OH, NHS, NH—CH₂CH₂-maleimide
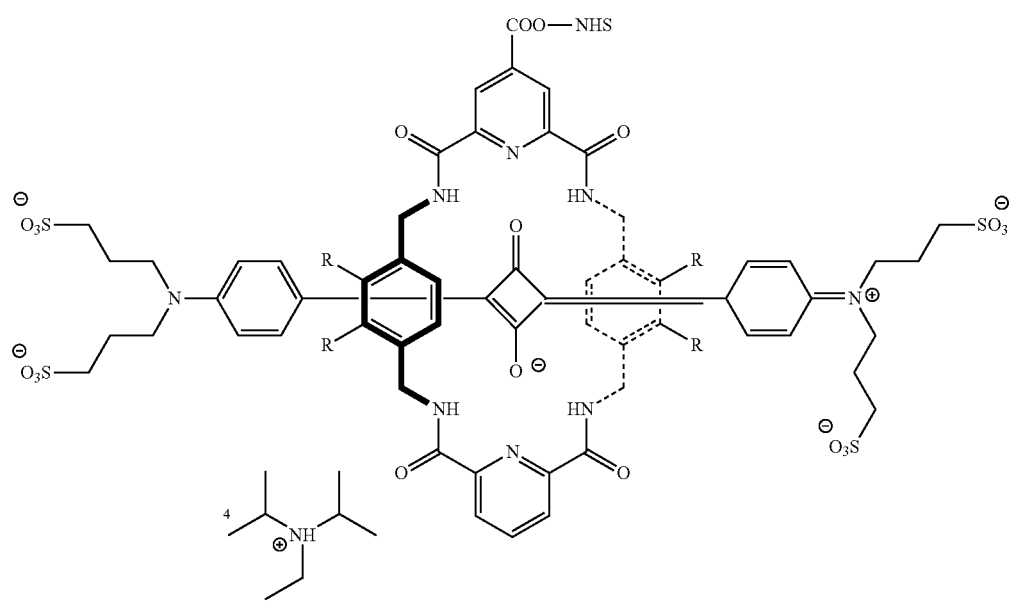
R = H, CH₃, Halogen, NO₂, OCH₃, COOH, SO₃H, NH₂
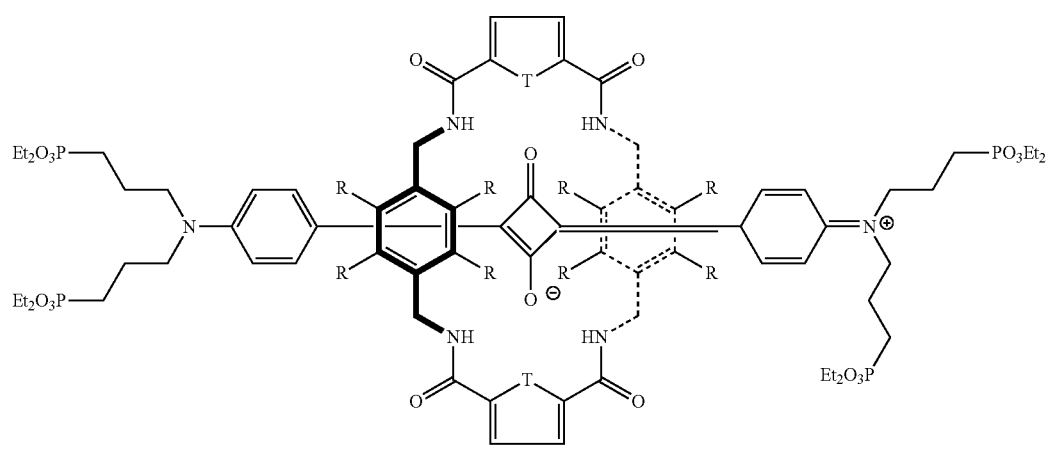
R = H, CH₃, Halogen, NO₂, OCH₃, SO₃H, NH₂
T = O, S, NH

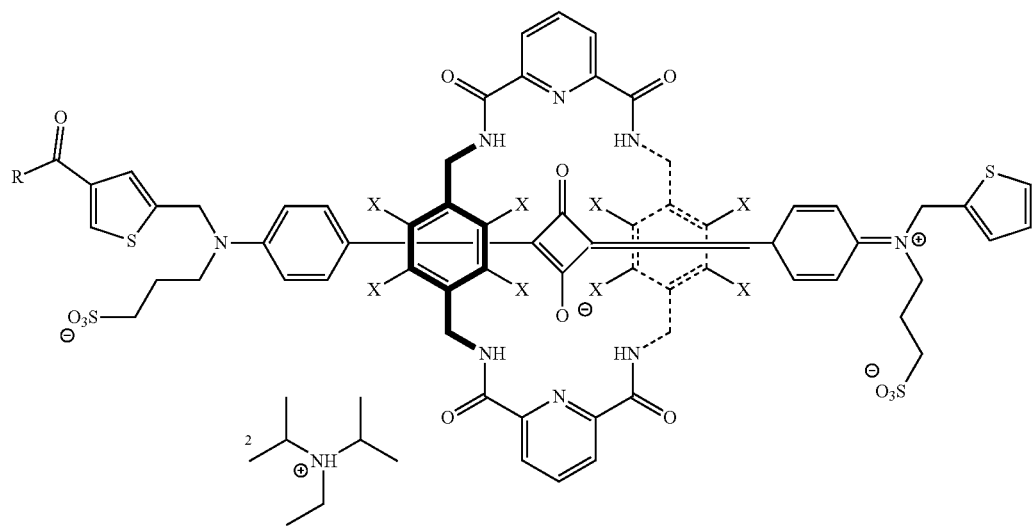
X = H, CH₃, Halogen, NO₂, OCH₃, SO₃H, NH₂
R = OH, NHS, NH—CH₂CH₂-maleimide
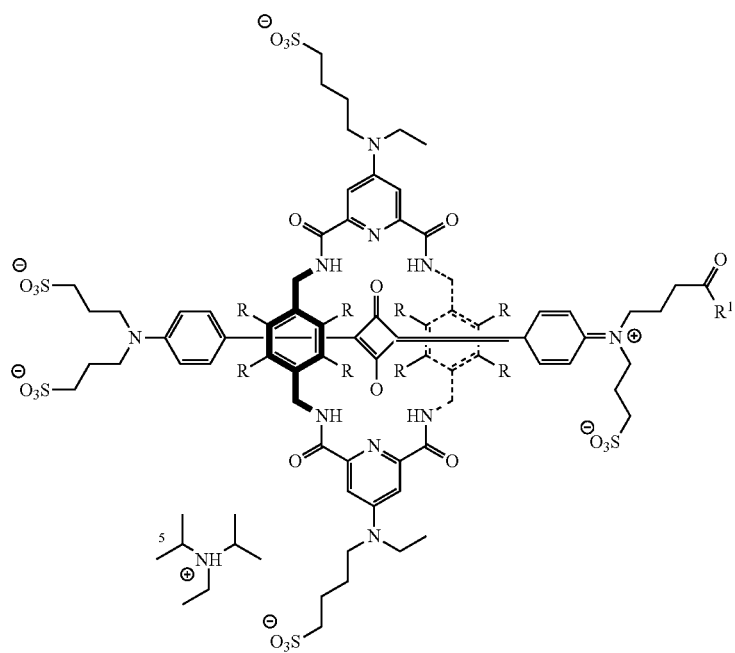
R¹ = OH, NHS, NH—CH₂CH₂-maleimide
R = H, CH₃, Halogen, NO₂, OCH₃, SO₃H, NH₂

-continued
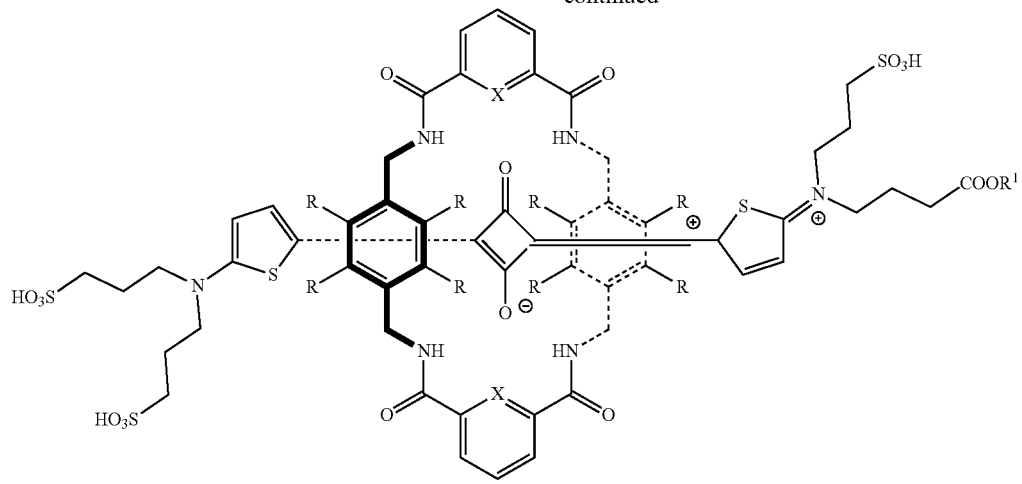
X = N, CH
R[1] = H, NHS
R = H, CH₃, Halogen, NO₂, OCH₃, SO₃H, NH₂
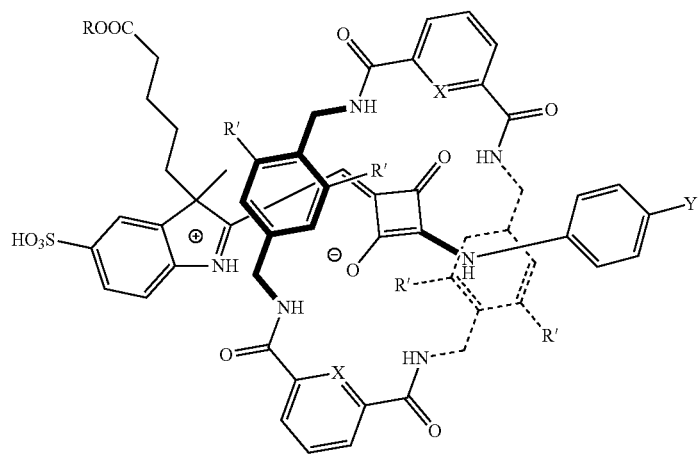
X = N, CR[2]
R = H, NHS
Y = L, L—R[+]
R = H, CH₃, Halogen, NO₂, OCH₃, SO₃H, NH₂
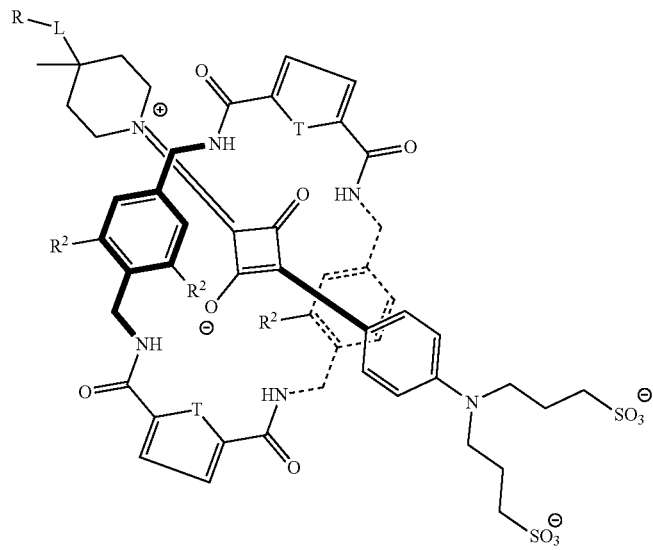

T = O, S, NH
R² = H, Halogen, NH₂, COOH, SO₃H
R = OH, NHS, NH—CH₂CH₂-maleimide
L is linker

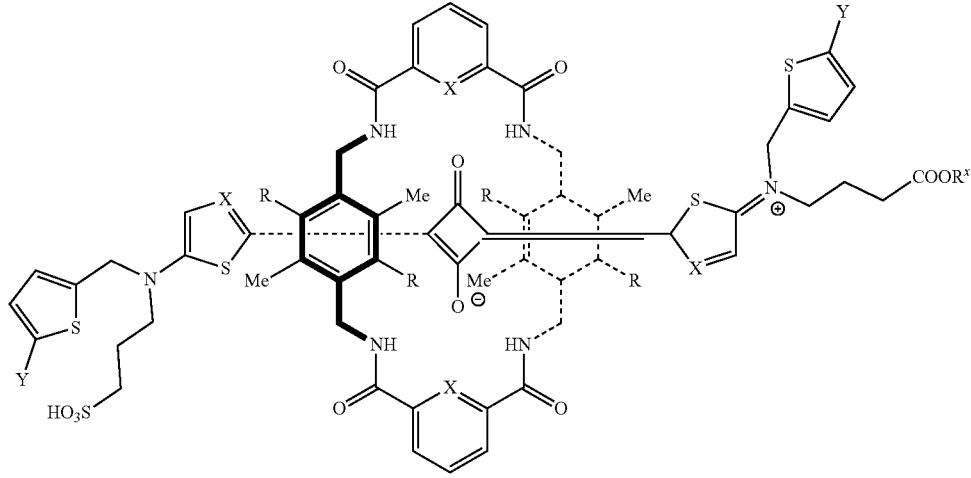

Y = SO₃H, H
X = N, CH
Rˣ = H, NHS
R = H, CH₃, Halogen, NO₂, OCH₃, SO₃H, NH₂

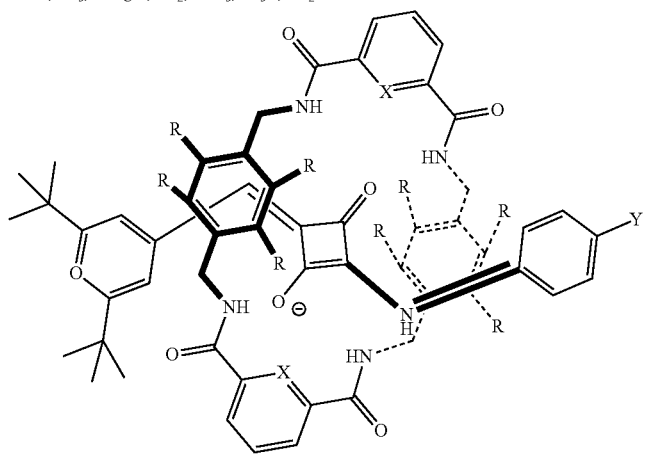

X = N, CR²
Y = R±, L, L—R±
R = H, CH₃, Halogen, NO₂, OCH₃, SO₃H, NH

Example 35

General Protein Labelling Procedures and Determination of Dye-to-Protein Ratios Protein labelling reactions are carried out using a 50 mM bicarbonate buffer (pH 9.1). A stock solution of 1 mg of dye in 100 μL of anhydrous DMF is prepared. 10 mg of protein is dissolved in 1 mL of 100 mM bicarbonate buffer (pH 9.1). Dye from the stock solution is added, and the mixture is stirred for 3-12 h at room temperature.

Unconjugated dye is separated from labeled protein using gel permeation chromatography with SEPHADEX G50 (0.5 cm×20 cm column) and a 22 mM phosphate buffer solution (pH 7.3) as the eluent. The first colored band contains the dye-protein conjugate. The blue band with the much higher retention time contains the separated free dye. A series of labeling reactions using different dye-to-protein starting ratios are set up to obtain different dye-to-protein ratios for the labeled protein. Compared to the free forms, the protein-bound forms of the dyes sometimes show distinct changes in their spectral properties, in particular when the dye is a squaraine dye.

The protein concentration can either be determined using a BCA Protein Assay Reagent Kit from Pierce (Rockford, Ill.) or alternatively, the protein concentration can be determined by measurement of the absorption around 280 nm. The dye-to-protein ratio (D/P) gives the number of dye molecules covalently bound to the protein.

Figure 2:
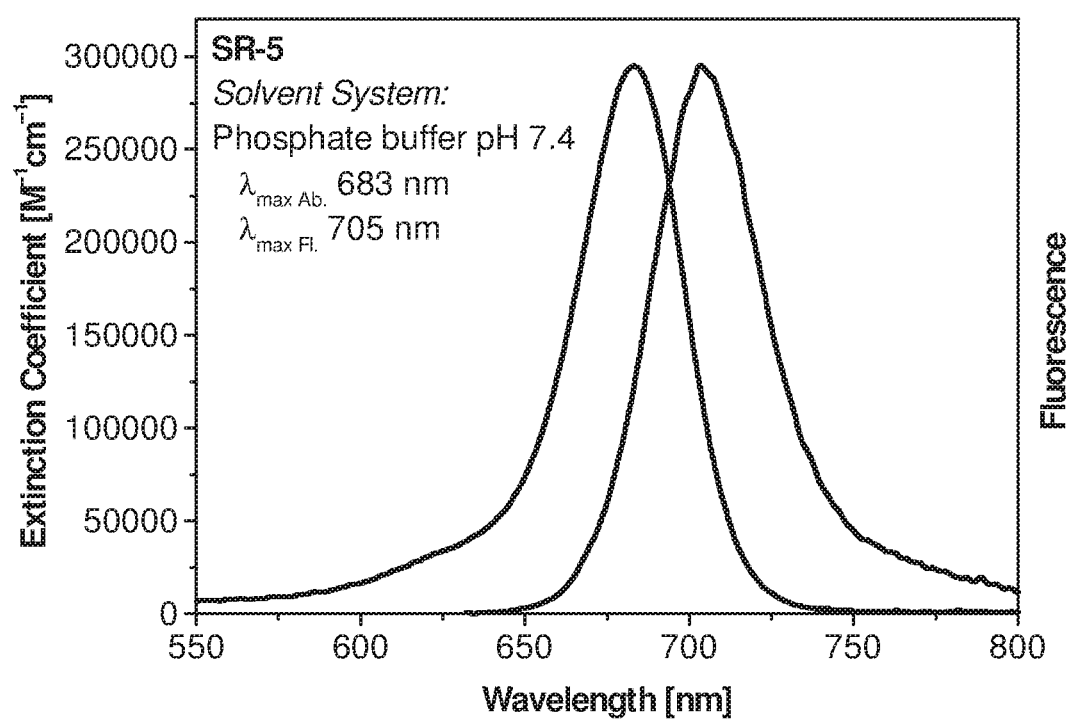
FIG. 2 is a plot showing the absorption and emission spectrum of squaraine-rotaxane compound SR-5 in phosphate buffer 7.4.
Figure 3:
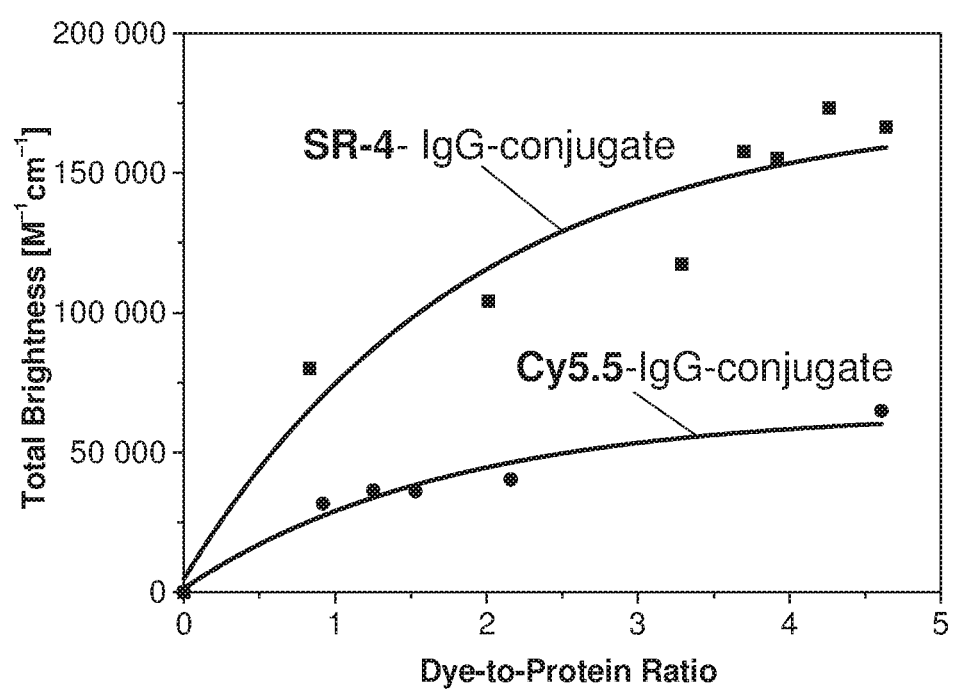
FIG. 3 is a plot showing the total brightness (QY×ε×D/P) vs. dye-to-protein ratio (D/P) of SR-3-IgG conjugates in comparison to Cy5.5-IgG conjugates in phosphate buffer pH 7.4.
Figure 4:
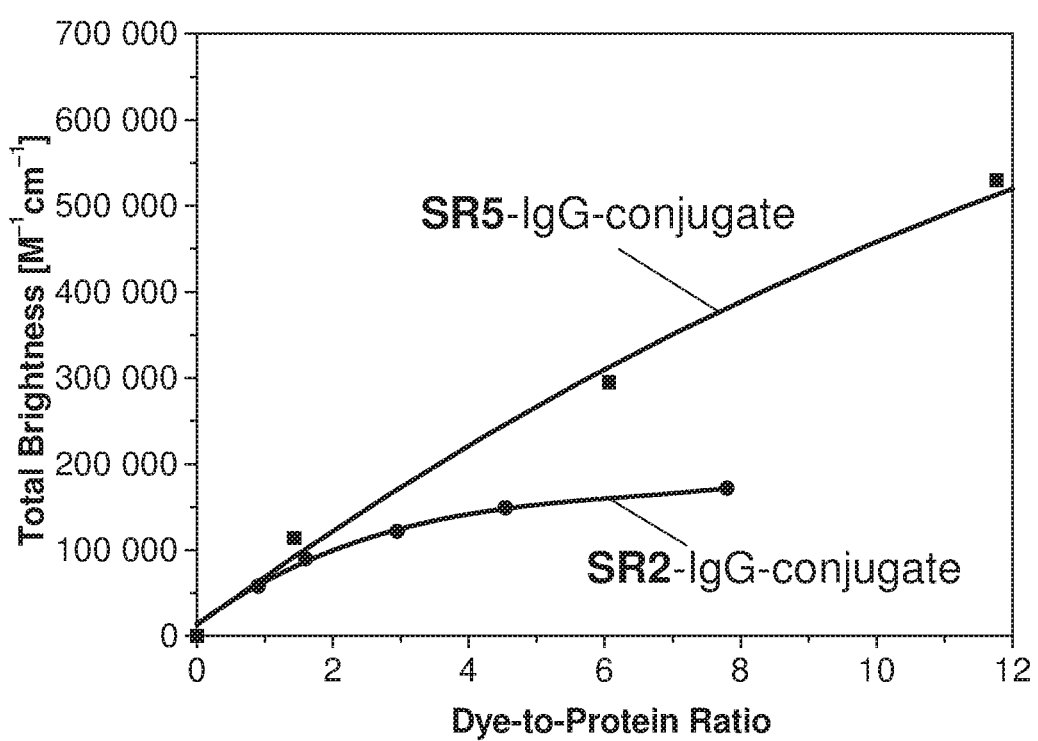
FIG. 4 is a plot showing the total brightness (QY×ε×D/P) vs. dye-to-protein ratio (D/P) of SR-5-IgG conjugates in comparison to SR-2-IgG conjugates in phosphate buffer pH 7.4.
Figure 5:
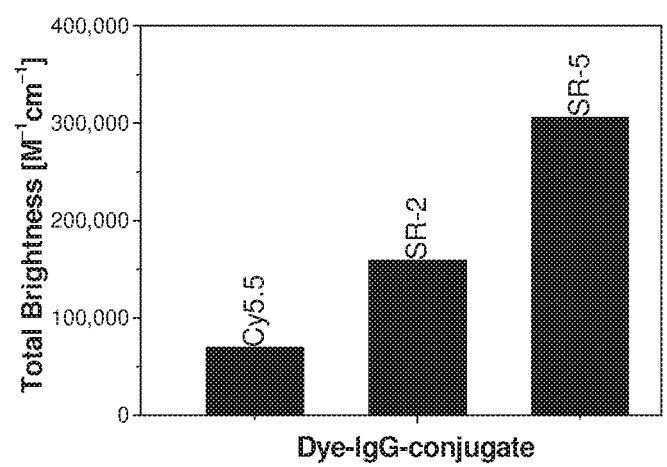
FIG. 5 is a plot showing the total brightness (QY×ε×D/P) of IgG conjugates at dye-to-protein ratio (D/P=6.0) for Cy5.5™, SR-2, and SR-5 in phosphate buffer (pH 7.4).
Figure 6:
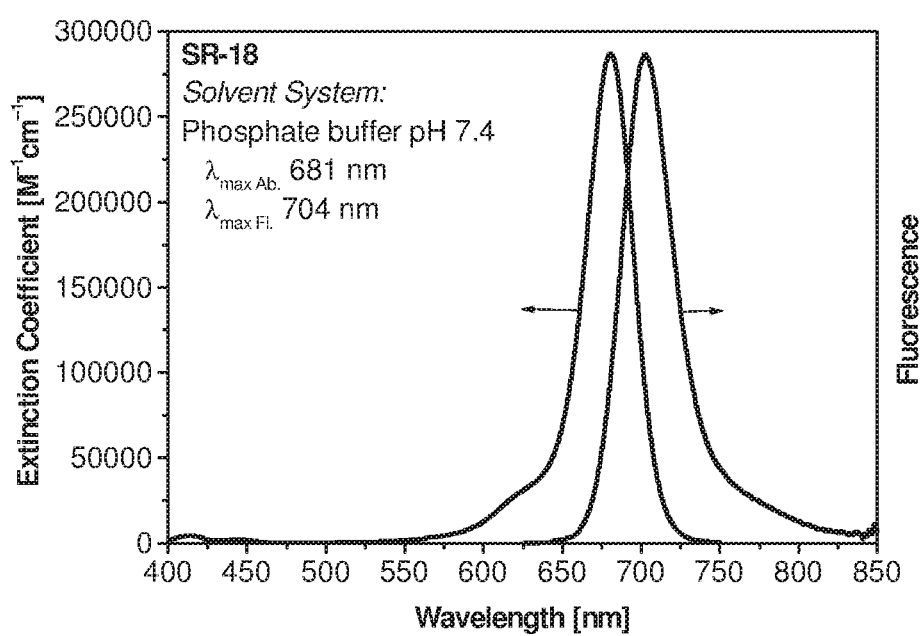
FIG. 6 is a plot showing the absorption and emission spectrum of squaraine-rotaxane SR-18 in phosphate buffer 7.4.

The table below is showing data on the photophysical properties for rotaxane-protein conjugates at various dye-to-protein ratios. The absorption and emission spectra of relevant squaraine rotaxanes are shown in FIGS. 1 and 2. A graph of the brightness of IgG-conjugates of SR-4 for different D/P ratios in comparison to Cy5.5, a commercially available protein marker, is shown in FIG. 3. A graph of the brightness of IgG-conjugates of SR-5 for different D/P ratios in comparison to SR-2, an unsubsituted marker, is shown in FIG. 4.

TABLE

| Sample | Dye-to-protein Ratio | Absorption max. [nm] | Extinction Coefficient [$M^{-1} \cdot cm^{-1}$] | Emission max. [nm] | Quantum Yield [%] |
|---|---|---|---|---|---|
| SR-5 | — | 683 | 295,000 | 705 | 58 |
| SR-5-IgG conjugate 1 | 1.0 | 682 | | 703 | 47 |
| SR-5-IgG conjugate 2 | 2.0 | 682 | | 703 | 40 |
| SR-5-IgG conjugate 3 | 4.0 | 682 | | 703 | 32 |
| SR-5-IgG conjugate 4 | 6.0 | 682 | | 703 | 27 |

Spectral and photophysical properties of compound SR-5 and SR-5-IgG

Covalent Labelling to IgG

385 μL (5.2 mg/mL) of IgG is dissolved in a 750 μL bicarbonate buffer (0.1 M, pH 9.0). 1 mg of NHS-ester (e.g. SR-5-NHS) is dissolved in 50 μL of DMF and slowly added to the above-prepared protein solution with stirring. After 20 h of stirring, the protein-conjugate is separated from the free dye using Sephadex G50 and a phosphate buffer (22 mM, pH 7.2). The first blue band that is isolated contains the labeled conjugate.

Conjugation to HSA 0.5 mg of the relevant NHS in 50 μL of DMF are slowly added to a stirred solution of 5 mg of HSA in 750 μL of bicarbonate buffer (0.1 M, pH 9.0). The mixture is stirred for another 6 h at room temperature. The mixture is dialyzed against a phosphate buffer (22 mM, pH 7.2) using a dialysis membrane (1500 FT, Union Carbide) with a cutoff of 10.000.

The labelling procedures of alternative reporter compounds having reactive functional groups are analogous to the one reported here.

Conjugation to Polyethylene-Glycol

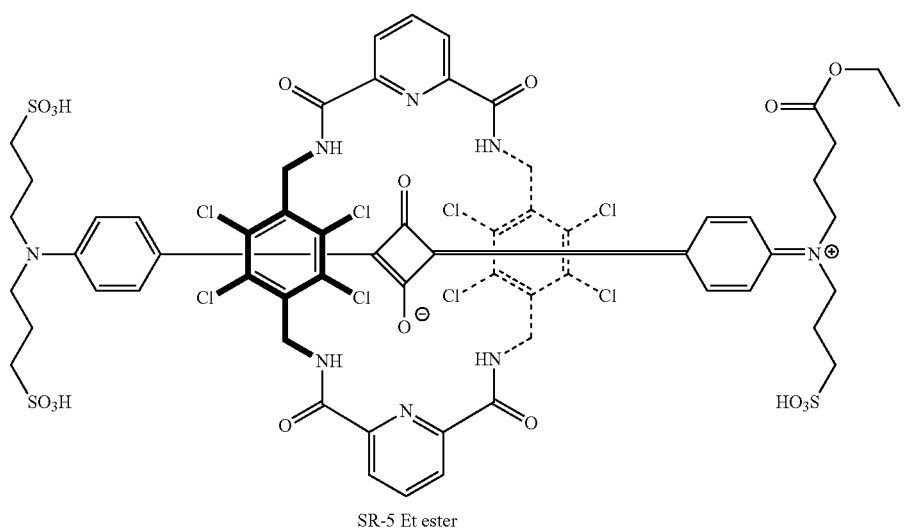

SR-5 Et ester

1) $SOCl_2$, DMF
2) $NH_2CH_2CH_2(OCH_2CH_2)_7OCH_3$
3) 1M HCl, $CH_3COOH$

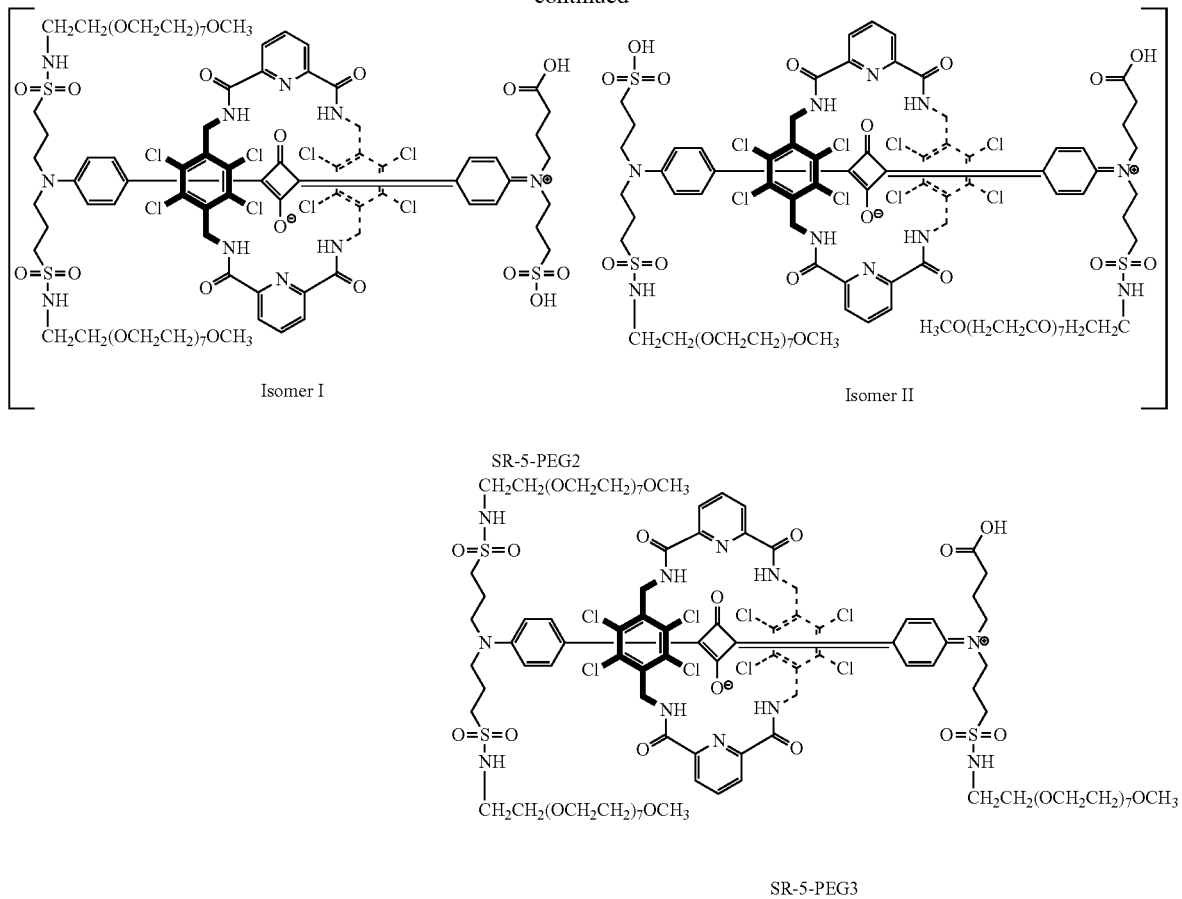

SR-5-PEG3

Figure 8:
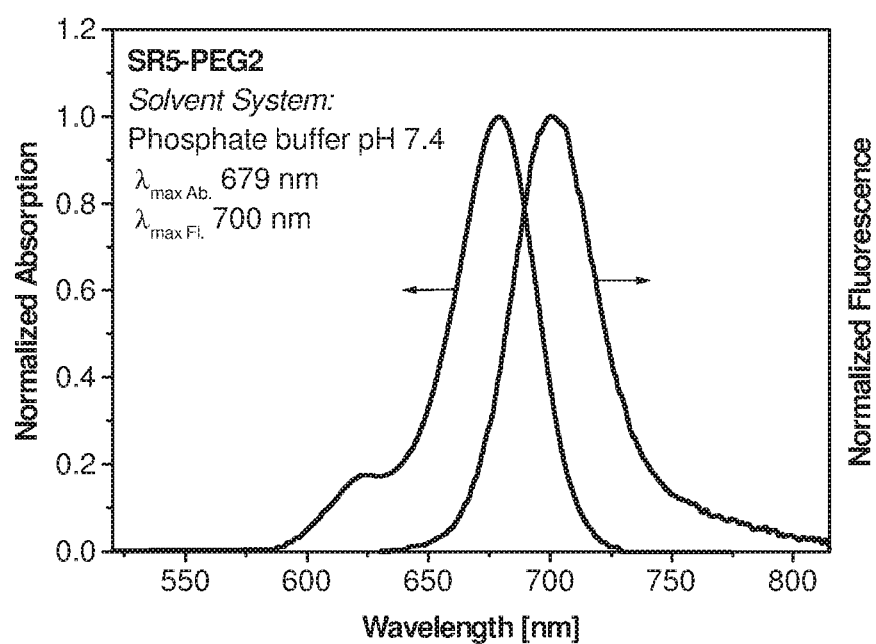
FIG. 8 is a plot showing the absorption and emission spectrum of SR-5 modified with polyethylene glycol.

100 µL of thionyl chloride were added dropwise at 10° C. to a suspension of 20 mg (12.8 µmol) of SR-5 ethyl ester in 350 µL of DMF and stirred for 4 hours. Then 5 mL of ice-water were added to the reaction mixture, and the sulfonyl chloride derivative of SR-5 ethyl ester was extracted with 5 mL of chloroform. The organic layer was separated and washed 3 times with water to neutral reaction of washing water. Chloroform was evaporated by a rotary evaporator. The residue was mixed with 0.5 mL of 1,4-dioxane and a solution of 50 µL of amino-PEG$_8$ in 150 µL of 1,4-dioxane. Sodium bicarbonate was added to the reaction mixture to pH=8 and stirred at room temperature for 15 hours. The solvent was evaporated by a rotary evaporator. The residue was dissolved in 3 mL of glacial acetic acid and 2 mL of 1 M aqueous hydrochloric acid and heated for 40 minutes at 90° C. for hydrolysis. The reaction was monitored by TLC (RP-18, water—acetonitrile=1:1, v/v). After hydrolysis, the solvent was evaporated and product was column purified on RP-18 (acetonitrile/water gradient with 0.05% TFA) to yield 7 mg (20.8%) of SR-5-PEG3 (dye containing three PEG residues) and 5.5 mg (17.8%) of SR-5-PEG2 (dye containing two PEG residues), as a mixture of two isomers (ratio Isomer I:Isomer II=1:2). SR-5-PEG3: $\lambda_{max}$(abs): 620 nm, 675 nm, $\lambda_{max}$(em): 699 nm (phosphate buffer, pH 7.4); SR-5-PEG2: $\lambda_{max}$(abs): 679 nm, $\lambda_{max}$(em): 700 nm (phosphate buffer, pH 7.4) (see FIG. 8.)

Description of Applications of the Invention

The above disclosed compositions exhibit utility for a variety of useful methods and for various assay formats:

The assay may be a competitive assay that includes a recognition moiety, a binding partner, and an analyte. Binding partners and analytes may be selected from the group consisting of biomolecules, drugs, and polymers, among others. In some competitive assay formats, one or more components are labeled with photoluminescent compounds in accordance with the invention. For example, the binding partner may be labeled with such a photoluminescent compound, and the displacement of the compound from an immobilized recognition moiety may be detected by the appearance of fluorescence in a liquid phase of the assay. In other competitive assay formats, an immobilized enzyme may be used to form a complex with the fluorophore-conjugated substrate.

The binding of antagonists to a receptor can be assayed by a competitive binding method in so-called ligand/receptor assays. In such assays, a labeled antagonist competes with an unlabeled ligand for the receptor binding site. One of the binding partners can be, but not necessarily has to be, immobilized. Such assays may also be performed in microplates. Immobilization can be achieved via covalent attachment to the well wall or to the surface of beads.

Other preferred assay formats are immunological assays. There are several such assay formats, including competitive binding assays, in which labeled and unlabeled antigens compete for the binding sites on the surface of an antibody (binding material). Typically, there is a certain incubation time required to provide sufficient time for equilibration. Such assays can be performed in a heterogeneous or homogeneous fashion.

Sandwich assays may use secondary antibodies and excess binding material may be removed from the analyte by a washing step.

Other types of reactions include binding between avidin and biotin, protein A and immunoglobulins, lectins and sugars (e.g., concanavalin A and glucose).

Certain dyes of the invention are charged due to the presence of sulfonic groups. These compounds are impermeant to membranes of biological cells. In these cases treatments such as electroporation and shock osmosis can be used to introduce the dye into the cell. Alternatively, such dyes can be physically inserted into the cells by pressure microinjection, scrape loading etc.

The reporter compounds described here also may be used to sequence nucleic acids and peptides. For example, fluorescently-labeled oligonucleotides may be used to trace DNA fragments. Other applications of labeled DNA primers include fluorescence in-situ hybridization methods (FISH) and for single nucleotide polymorphism (SNIPS) applications, among others.

Multicolor labeling experiments may permit different biochemical parameters to be monitored simultaneously. For this purpose, two or more reporter compounds are introduced into the biological system to report on different biochemical functions. The technique can be applied to fluorescence in-situ hybridization (FISH), DNA sequencing, fluorescence microscopy, and flow cytometry. One way to achieve multicolor analysis is to label biomolecules such as nucleotides, proteins or DNA primers with different luminescent reporters having distinct luminescence properties. Luminophores with narrow emission bandwidths are preferred for multicolor labeling, because they have only a small overlap with other dyes and hence increase the number of dyes possible in a multicolor experiment. Importantly, the emission maxima have to be well separated from each other to allow sufficient resolution of the signal. The aim of the current application is to increase the range of absorption and emission wavelength for water-soluble squaraine rotaxanes that are suitable for biological applications.

The simultaneous use of FISH (fluorescence in-situ hybridization) probes in combination with different fluorophores is useful for the detection of chromosomal translocations, for gene mapping on chromosomes, and for tumor diagnosis, to name only a few applications. One way to achieve simultaneous detection of multiple sequences is to use combinatorial labeling. The second way is to label each nucleic acid probe with a luminophore with distinct spectral properties. Similar conjugates can be synthesized from this invention and can be used in a multicolor multi-sequence analysis approach.

In another approach, the dye-compositions of this invention might be used to directly stain or label a sample so that the sample can be identified and or quantitated. Such dyes might be added/labeled to a target analyte as a tracer. Such tracers could be used, e.g., in photodynamic therapy where the labeled compound is irradiated with a light source and thus producing singlet oxygen that helps to destroy tumor cells and diseased tissue samples.

The reporter compounds of the invention can also be used for screening assays for a combinatorial library of compounds. The compounds can be screened for a number of characteristics, including their specificity and avidity for a particular recognition moiety.

Assays for screening a library of compounds are well known. A screening assay is used to determine compounds that bind to a target molecule, and thereby create a signal change which is generated by a labeled ligand bound to the target molecule. Such assays allow screening of compounds that act as agonists or antagonists of a receptor, or that disrupt a protein-protein interaction. It also can be used to detect hybridization due to binding of DNA and/or RNA.

Other screening assays are based on compounds that affect the enzyme activity. For such purposes, quenched enzyme substrates of the invention could be used to trace the interaction with the substrate. In this approach, the cleavage of the fluorescent substrate leads to a change in the spectral properties, such as the excitation and emission maxima, intensity and/or lifetime, which allows distinguishing between the free and the bound luminophore.

The reporter compounds disclosed above may also be relevant to single molecule fluorescence microscopy (SMFM) where detection of single probe molecules depends on the availability of a fluorophore with high fluorescence yield, high photostability, and long excitation wavelength, including stability against radical oxygen species.

While anthracene and benzene-type diamines are symmetrical, rotaxanes based on naphthalene-type diamines are unsymmetrical and could be used to introduce non-linear properties in these rotaxane molecules. In addition these molecules could be useful as molecular switches.

The dye compositions are also useful for use as biological stains. There are limitations in some instances to the use of compounds as labels. For example, typically only a limited number of dyes may be attached to a biomolecule without altering the fluorescence properties of the dyes (e.g. quantum yields, lifetime, polarization, emission characteristics, etc.) and/or the biological activity of the bioconjugate. Typically, quantum yields may be reduced at higher degrees of labelling. The current invention should help to overcome some of these limitations by reducing the aggregation tendencies of these dye compositions.

Another means to overcome the above limitation for the use of such compounds as fluorescent markers offers encapsulation into beads. Fluorescent beads and polymeric materials are becoming increasingly attractive as labels and materials for bioanalytical and sensing applications. Various companies offer particles with defined sizes ranging from nanometers to micrometers. Noncovalent encapsulation in beads may be achieved by swelling the polymer in an organic solvent, such as toluene or chloroform, containing the dye. Covalent encapsulation may be achieved using appropriate reactive functional groups on both the polymer and the dyes.

In general, hydrophobic versions of the invention may be used for non-covalent encapsulation in polymers, and one or more dyes could be introduced at the same time. Surface-reactive fluorescent particles allow covalent attachment to molecules of biological interest, such as antigens, antibodies, receptors etc. Hydrophobic versions of the invention such as dye having lipophilic substituents such as phospholipids will non-covalently associate with lipids, liposomes, lipoproteins. They are also useful for probing membrane structure and membrane potentials.

Dyes lacking ionic charges are used for cell-based applications where the dye conjugate is dissolved in the loading buffer and allowed to diffuse through the cell membrane into the interior of the cell. For this purpose, rotaxanes with neutral groups such as phosphonate or sulfonamides that sustain water-solubility of the compound without adding ionic charges are preferred.

Hydrophobic versions of these compositions are also useful for the detection of proteins (BSA, HSA, globins etc.) based on gel and capillary electrophoresis.

Compounds of this invention may also be attached to the surface of metallic nanoparticles such as gold or silver nanoparticles or colloids. It has recently been demonstrated that fluorescent molecules may show increased quantum yields near metallic nanostructures, e.g., gold or silver nanoparticles (O. Kulakovich et al., Nanoletters 2(12) 1449-52 (2002)). This enhanced fluorescence may be attributable to the presence of a locally enhanced electromagnetic field around metal nanostructures. The changes in the photophysical properties of a fluorophore in the vicinity of the metal surface may be used to develop novel assays and sensors. In one example, the nanoparticle may be labeled with one member of a specific binding pair (antibody, protein, receptor, etc.) and the complementary member (antigen, ligand) may be labeled with a fluorescent molecule in such a way that the interaction of both binding partners leads to a detectable change in one or more fluorescence properties (such as intensity, quantum yield, lifetime, among others). Replacement of the labeled binding partner from the metal surface may lead to a change in fluorescence that can then be used to detect and/or quantify an analyte.

Gold colloids can be synthesized by citrate reduction of a diluted aqueous $HAuCl_4$ solution. These gold nanoparticles are negatively charged due to chemisorption of citrate ions. Surface functionalization may be achieved by reacting the nanoparticles with thiolated linker groups containing amino or carboxy functions. In another approach, thiolated biomolecules are used directly for coupling to these particles.

Researchers (T. Fare et al., Anal. Chem. 75(17), 4672-4675 (2003) made an observation that the fluorescence signals of cyanine dyes such as the CY5 dye and the ALEXA 647 dye in microarrays are strongly dependent on the concentration of ozone during post-hybridization array washing. Controlled exposures of microarrays to ozone confirmed this factor as the root cause, and showed the susceptibility of a class of cyanine dyes (e.g., CY5 dyes, ALEXA 647 dyes) to ozone levels as low as 5-10 ppb for periods as short as 10-30 s.

One of the significant findings was the low dose level (ozone concentration multiplied by exposure time) that could induce the onset of the phenomenon, suggesting many labs may be at risk. For example, it is not uncommon that the environmental ozone levels would exceed 60 ppb during peak traffic hours on a sunny summer afternoon. Reporter compounds present on or in arrays that are exposed to these levels for as short as 1 min may begin to show significant degradation in a typical laboratory setting.

There are ways that help to eliminate the occurrence of ozone effects on microarrays, for example equipping laboratories with HVAC systems having filters to significantly reduce ozone levels, or the use of dye-protecting solutions to avoid signal degradation. However, each of these approaches may add additional costs and/or time to perform the assay. These findings suggest the need for dyes and labels in the 600 to 700 nm wavelength range with improved chemical and photochemical stability. Dye compositions of this invention exhibit increased photochemical but also chemical stability in particular against oxidative reagents such as peroxides and should therefore be excellent reagents for the use in microarrays.

Analytes

The invention may be used to detect an analyte that interacts with a recognition moiety in a detectable manner. As such, the invention can be attached to a recognition moiety, which is known to those of skill in the art. Such recognition moieties allow the detection of specific analytes. Examples are pH-, or potassium sensing molecules, e.g., synthesized by introduction of potassium chelators such as crown-ethers (aza crowns, thio crowns etc). Dyes with N—H substitution in the heterocyclic rings such as 4 exhibit pH-sensitive absorption and emission (S. Miltsov et al., Tetrahedron Lett. 40: 4067-68 (1999), M. E. Cooper et al., J. Chem. Soc. Chem. Commun. 2000, 2323-2324), Calcium-sensors based on the BAPTA (1,2-Bis(2-aminophenoxy) ethan-N,N,N'',N''-tetra-acetic acid) chelating moiety are frequently used to trace intracellular ion concentrations. The combination of a compound of the invention and the calcium-binding moiety BAPTA may lead to new long-wavelength absorbing and emitting Ca-sensors which could be used for determination of intra- and extracellular calcium concentrations (Akkaya et al., Tetrahedron Lett. 38:4513-4516 (1997)). Additionally, or in the alternative, reporter compounds already having a plurality of carboxyl functional groups may be directly used for sensing and/or quantifying physiologically and environmentally relevant ions.

NH-substituted dyes of this invention are pH sensitive and may also be useful for the assessment of the intracellular pH and for applications where the local pH of the environment changes, e.g., cell-based measurements of G-protein coupled receptors as described in M. E. Cooper et al. J. Chem. Soc. Chem. Commun. 2000, 2323-2324. The water-soluble dyes may be used directly or the reactive pH-sensitive dyes of the invention are associated with specific biomolecules which bind to certain domains in cells thus enabling the pH of only that specific environment to be assessed. While the dioxo-squaraines and dioxo-squaraine-rotaxanes have pKa values in the basic pH range (Miltsov et al., Tetrahedron Lett. 40, 4067-68 (1999)), the pKa's of squaraine-ring-substituted versions like the thio-derivatives may be closer to the physiological pH range, which would make them more useful for this type of measurements. It is understood that the dyes pKa's can be tuned to cover a broad pH-range by variation of the substituents on the heterocyclic bases as well as on the squaraine bridge.

Fluorescence Methods

The disclosed reporter compounds may be detected using common intensity-based fluorescence methods. Unrotaxanated squaraine dyes are known to have lifetimes in the range of hundreds of ps to a few ns. The table below provides some of the lifetime data of the newly synthesized squaraine rotaxanes. The lifetimes for the aniline-based squaraine SR-2 increases about 2-times upon fluorination of the outer benzene ring and 5-fold upon chlorination (table below).

The nanosecond lifetime and long-wavelength absorption and emission of these dyes may allow them to be measured using relatively inexpensive instrumentation that employs laser diodes for excitation and avalanche photodiodes for detection. Typical assays based on the measurement of the fluorescence lifetime as a parameter include for example FRET (fluorescence resonance energy transfer) assays. The binding between a fluorescent donor labeled species (typically an antigen) and a fluorescent acceptor labeled species may be accompanied by a change in the intensity and the fluorescence lifetime. The lifetime can be measured using intensity- or phase-modulation-based methods (J. R. Lakowicz, Principles of Fluorescence Spectroscopy ($2^{nd}$ ed. 1999)).

The ns lifetimes for some of the rotaxane-dye structures in aqueous solution (see Table below) make these labels also useful as tracers for applications in fluorescence polarization-based assays. Fluorescence polarization immunoassays (FPI) are widely applied to quantify low molecular weight antigens. The assays are based on polarization measurements of antigens labeled with fluorescent probes. The requirement for polarization probes used in FPIs is that emission from the unbound labeled antigen be depolarized and increase upon binding to the antibody. Low molecular weight species labeled with the compounds of the invention can be used in such binding assays, and the unknown analyte concentration can be determined by the change in polarized emission from the fluorescent tracer molecule.

The long fluorescence lifetimes of benzo-selenazole-based squaraines in chloroform suggest that water-soluble rotaxane-analogs of these dyes might be useful as polarization probes.

TABLE

Fluorescence lifetimes of novel squaraine rotaxanes
($\lambda_{ex}$: 630 nm, $\lambda_{obs}$: 670 nm)

| Compound | Solvent | τ [ns] | $\chi^2$ |
| --- | --- | --- | --- |
| Rotaxane SR-2 | PB 7.4 | 0.9 | 1.1 |
| Rotaxane SR-4 | PB 7.4 | 1.6 | 1.5 |
| Rotaxane SR-5 | PB 7.4 | 2.95 | 0.9 |

Luminescent dyes of this invention are also useful as fluorescent acceptors in TR-FRET applications with luminescent lanthanides as donors. In these assays the emission from both the donor and the acceptor is collected and ratioed to increase the robustness of the assay.

The luminescent rotaxanes of the invention are also useful for in vivo near infrared diagnostic methods, as described in U.S. Pat. No. 6,083,485 (hereby incorporated by reference). Such methods typically include administering a rotaxane of the present invention to diseased tissue, exposing the diseased tissue to light in the visible and near infrared range, and recording the emitted light produced from the rotaxane.

Compositions and Kits

The invention also provides compositions, kits and integrated systems for practicing the various aspects and embodiments of the invention, including producing the novel compounds and practicing of assays. Such kits and systems may include a reporter compound as described above, and may optionally include one or more of solvents, buffers, calibration standards, enzymes, enzyme substrates, and additional reporter compounds having similar or distinctly different optical properties.

Although the invention has been disclosed in preferred forms, the specific embodiments thereof as disclosed and illustrated herein are not to be considered in a limiting sense, because numerous variations are possible. Applicant regards the subject matter of his invention to include all novel and nonobvious combinations and subcombinations of the various elements, features, functions, and/or properties disclosed herein. No single element, feature, function, or property of the disclosed embodiments is essential. The following claims define certain combinations and subcombinations of elements, features, functions, and/or properties that are regarded as novel and nonobvious. Other combinations and subcombinations may be claimed through amendment of the present claims or presentation of new claims in this or a related application. Such claims, whether they are broader, narrower, or equal in scope to the original claims, also are regarded as included within the subject matter of applicant's invention.

We claim:

1. A rotaxane having the formula:

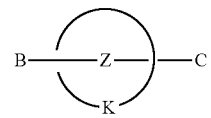

where B—Z—C is a reporter molecule and K is a macrocycle that encircles and interlocks with the reporter molecule;

K has the formula $K^1$, $K^2$, $K^3$, where $K^1$ is

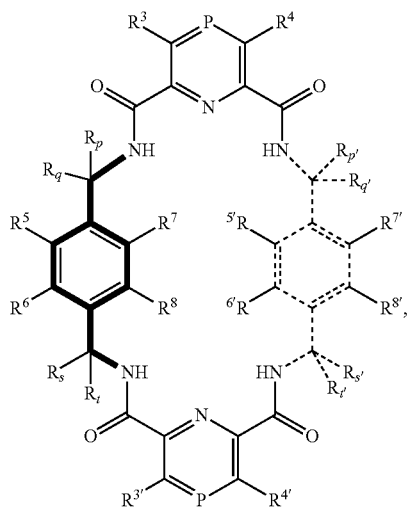

$K^2$ is

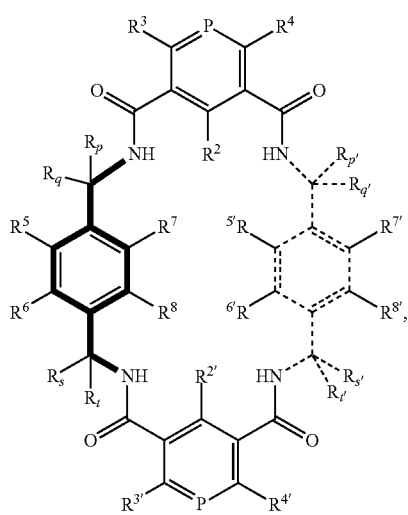

and $K^3$ is

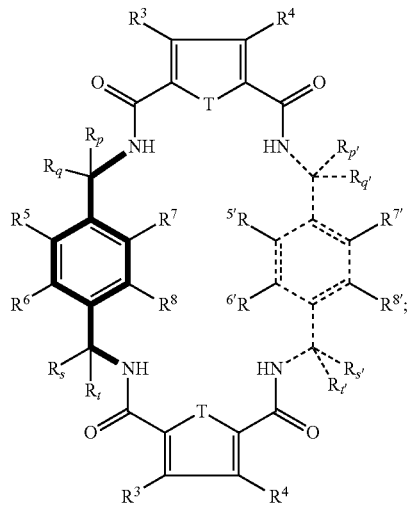

where substituents $R^2, R^{2'}, R^3, R^{3'}, R^4, R^{4'}, R^5, R^{5'}, R^6, R^{6'}, R^7, R^{7'}, R^8$ and $R^{8'}$, when present, are independently selected from the group of H, L-$R^x$, L-$S_c$ and L-$R^{\pm}$, alkyl, aryl, alkoxy, alkyl-aryl, F, Br, Cl, I, OH, nitro, cyano, carboxy, sulfo, $R^x$ and $R^{\pm}$; or $R^5$ in combination with $R^6$, $R^7$ in combination with $R^8$, $R^{5'}$ in combination with $R^{6'}$, and $R^{7'}$ in combination with $R^{8'}$ may independently form an aromatic, heterocyclic or aliphatic ring system that is further substituted by L-$R^x$, L-$S_c$ and L-$R^{\pm}$, F, Br, Cl, I; $R_p, R_q, R_s, R_t, R_{p'}, R_{q'}, R_{s'}, R_{t'}$ are independently selected from H, $CH_3$, alkyl, —$CH_2OH$, —$CH_2O$—alkyl, F, Br, Cl, I, L-$R^x$, L-$S_c$ and L-$R^{\pm}$;

P is either $CR^3$, N, $^+$N—$R^3$ or $^+$O;

L is a single covalent bond, a covalent linkage that is linear or branched, cyclic or heterocyclic, saturated or unsaturated, having 1-20 non-carbon atoms from the group of N, P, O and S, in such a way that the linkage contains any combination of ether, thioether, amine, ester, amide bonds; single, double, triple or aromatic carbon-carbon bonds; or carbon-sulfur bonds, carbon-nitrogen bonds, phosphorus-sulfur, nitrogen-nitrogen, nitrogen-oxygen or nitrogen-platinum bonds, or aromatic or heteroaromatic bonds;

$R^x$ is a reactive group;

$S_c$ is a conjugated substance; and $R^{\pm}$ is an ionic group;

T is O, S, N—H;

provided that at least one substituent on $K^1$, $K^2$, or $K^3$ is a halogen;

Z has the formula

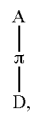

where π is a four-membered aromatic ring;

and wherein B and C are separated by one of substituents A or D, then B is one of $W^2, W^4, W^6, W^8, W^{10}, W^{12}, W^{14}, W^{16}, W^{18}, W^{20}, W^{22}, W^{24}, W^{26}$ or $W^{28}$ and C is one of $W^1, W^3, W^5, W^7, W^9, W^{11}, W^{13}, W^{15}, W^{17}, W^{19}, W^{21}, W^{23}, W^{25}$ or $W^{27}$, in which case one of A or D is negatively charged;

where A and D are neutral, they are selected from the group consisting of =O, =S, =Se, =Te, =N—$R^a$, and =C($R^b$)($R^c$), where $R^a$, $R^b$ and $R^c$ are selected from the group consisting of H, L-$S_c$, L-$R^x$, L-$R^{\pm}$, aliphatic, aromatic, alicyclic, and aryl-alkyl, where each aliphatic residue may incorporate up to six heteroatoms selected from N, O, S, and can be substituted one or more times by F, Cl, Br, I, hydroxy, alkoxy, carboxy, sulfo, phosphate, amino, sulfate, phosphonate, cyano, nitro, azido, alkyl-amino, dialkyl-amino or trialkylammonium; —COOH, —CN, —OH, —$SO_3H$, —$PO_3H_2$, —O—$PO_3H_2$, —$PO_3R_2^m$, —O—$PO_3R_2^m$, —CONH$R^m$, —$CONH_2$, COO—NHS and COO—$R^m$, where $R^m$ is selected from a group consisting of L-$S_c$, L-$R^x$, L-$R^{\pm}$, aliphatic substituents and aromatic substituents; or $R^b$ and $R^c$, taken in combination, form a cyclic or heterocyclic ring structure;

where A and D are present and negatively charged, they are independently selected from the group consisting of —$O^\ominus$, —$S^\ominus$, —$Se^\ominus$, —$Te^\ominus$, —(N—$R^a$)$^\ominus$, —(C($R^b$)($R^c$))$^\ominus$;

$W^1, W^2, W^3, W^4, W^5, W^6, W^7, W^8, W^9, W^{10}, W^{11}, W^{12}, W^{13}, W^{14}, W^{15}, W^{16}, W^{17}, W^{18}, W^{19}, W^{20}, W^{21}, W^{22}, W^{23}, W^{24}, W^{25}, W^{26}, W^{27}$ and $W^{28}$ have the respective formulae $W^1$ is

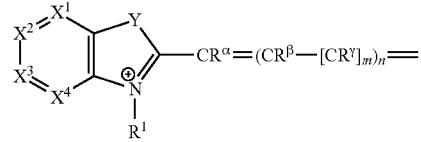

$W^2$ is

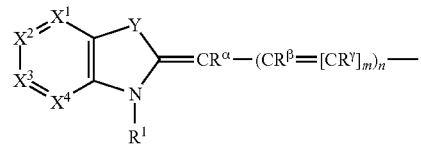

$W^3$ is

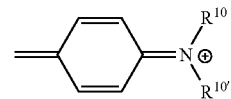

$W^4$ is

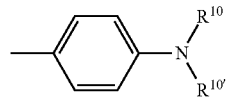

| 121 | 122 |
|---|---|
| W⁵ is 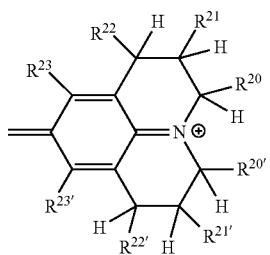 | W¹⁰ is 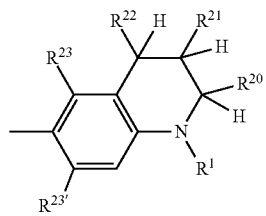 |
| W⁶ is 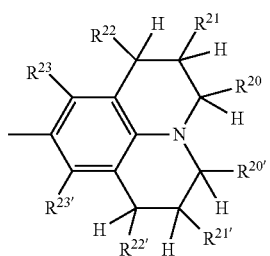 | W¹¹ is 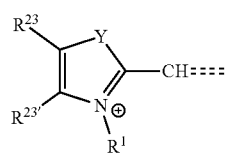 |
| | W¹² is 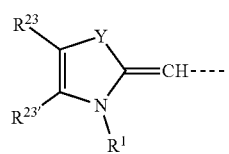 |
| W⁷ is 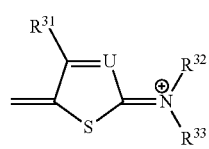 | W¹³ is 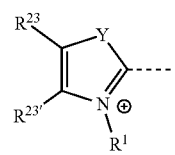 |
| W⁸ is 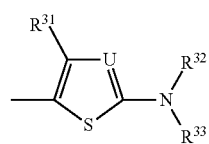 | W¹⁴ is 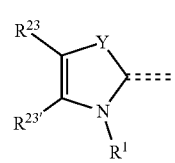 |
| W⁹ is 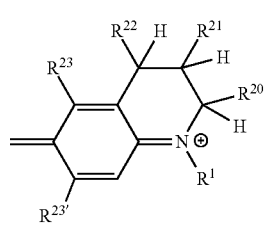 | W¹⁵ is 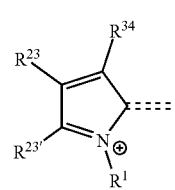 |

123
$W^{16}$ is
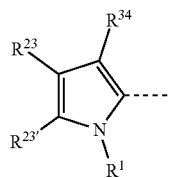
$W^{17}$ is
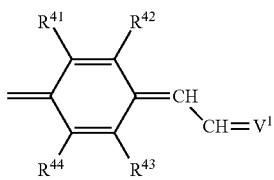
$W^{18}$ is
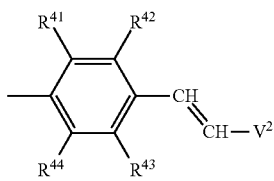
$W^{19}$ is
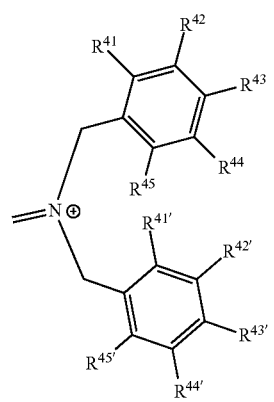
124
$W^{20}$ is
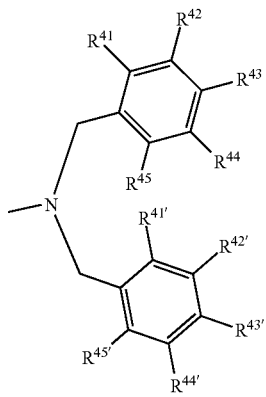
$W^{21}$ is
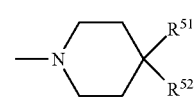
$W^{22}$ is
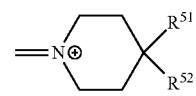
$W^{23}$ is
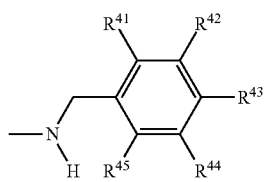
$W^{24}$ is
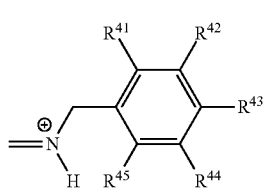

$W^{25}$ is

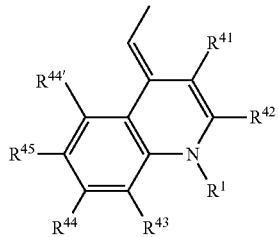

$W^{26}$ is

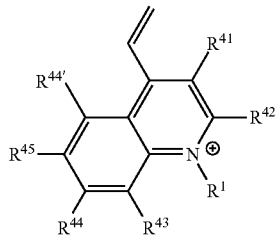

$W^{27}$ is

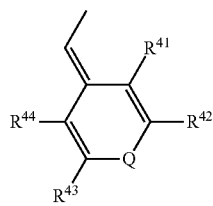

$W^{28}$ is

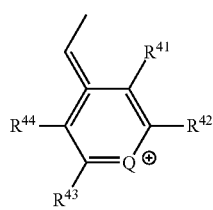

where m and n are independently 0 or 1 for each of B and C;

each Y is independently selected from the group consisting of O, S, N—$R^d$, $CR^e$=$CR^f$ and $C(R^i)(R^j)$, where $R^d$ is selected from the group consisting of H, L-$S_c$, L-$R^x$, L-$R^±$, —CH$_2$—CONH—SO$_2$-Me, aliphatic groups, alicyclic groups, aromatic groups;

$R^e$ and $R^f$ are independently H, $R^x$, $R^±$, L-$S_c$, L-$R^x$, L-$R^±$, —CH$_2$—CONH—SO$_2$-Me, aliphatic groups, alicyclic groups, or aromatic groups; where each aliphatic residue may incorporate up to six heteroatoms selected from N, O, S, and can be substituted one or more times by F, Cl, Br, I, hydroxy, alkoxy, carboxy, sulfo, phosphate, amino, sulfate, phosphonate, cyano, nitro, azido, alkyl-amino, dialkyl-amino or trialkylammonium;

$R^i$ and $R^j$ are independently H, L-$S_c$, L-$R^x$, L-$R^±$, —CH$_2$—CONH—SO$_2$-Me, aliphatic groups, alicyclic groups, or aromatic groups, where each aliphatic residue may incorporate up to six heteroatoms selected from N, O, S, and can be substituted one or more times by F, Cl, Br, I, hydroxy, alkoxy, carboxy, sulfo, phosphate, amino, sulfate, phosphonate, cyano, nitro, azido, alkyl-amino, dialkyl-amino or trialkylammonium; or $R^i$ and $R^j$ taken in combination form a ring-system that is optionally further substituted by one or more reactive or ionic substituents;

$R^1$ is selected from H, L-$S_c$, L-$R^x$, L-$R^±$, —CH$_2$—CONH—SO$_2$-Me, aliphatic groups, alicyclic groups, alkylaryl groups, aromatic groups, benzyl, substituted benzyl; where each aliphatic residue may incorporate up to 20 heteroatoms selected from N, O, S, and can be substituted one or more times by F, Cl, Br, I, hydroxy, alkoxy, carboxy, sulfo, sulfamide, phosphate, amino, sulfate, phosphonate, cyano, nitro, azido, alkyl-amino, dialkyl-amino or trialkylammonium;

$R^α$, $R^β$ and $R^γ$ are independently H, L-$S_c$, L-$R^x$, L-$R^±$, —CH$_2$—CONH—SO$_2$-Me, aliphatic, alicyclic, aromatic, alkyl-aryl, F, Cl, Br, I, NH$_2$, —COOH, CH=O, —CN, azido, —OH, —NO$_2$, —SO$_3$H, —PO$_3^{2\ominus}$, —O—PO$_3^{2\ominus}$, —PO$_3R^{m\ominus}$, —O—PO$_3R^{m\ominus}$, —CONH$_2$, CONH$R^m$, COO—NHS or COO—$R^m$, where $R^m$ is selected from the group consisting of L-$S_c$, L-$R^x$, L-$R^±$, aliphatic substituents, aromatic substituents; where each aliphatic residue may incorporate up to six heteroatoms selected from N, O, S, and can be substituted one or more times by F, Cl, Br, I, hydroxy, alkoxy, carboxy, sulfo, phosphate, amino, sulfate, phosphonate, cyano, nitro, azido, alkyl-amino, dialkyl-amino or trialkylammonium; and each of $X^1$, $X^2$, $X^3$, and $X^4$ are independently selected from the group consisting of N, $^+$NR', and C—R', where R' is hydrogen, L-$S_c$, L-$R^x$, L-$R^±$, —CH$_2$—CONH—SO$_2$-Me, or an aliphatic, alicyclic, or aromatic group, which are optionally further substituted; amino, sulfo, trifluoromethyl, alkoxy, halogen, carboxy, hydroxy, phosphate, or sulfate; or adjacent R' substituents, taken in combination, form a fused aromatic or heterocyclic ring that is itself optionally further substituted by H, L-$S_c$, L-$R^x$, L-$R^±$, alkyl, aryl or cycloalkyl; or $X^1$ and $X^4$ are independently selected from H, L-$S_c$, L-$R^x$, L-$R^±$, —CH$_2$—CONH—SO$_2$-Me, aliphatic, alicyclic, aromatic or heterocyclic group; amino, sulfo, trifluoromethyl, alkoxy, halogen, carboxy, hydroxy, phosphate, or sulfate group, in which case $X^2$ and $X^3$ are absent;

$R^{10}$ and $R^{10'}$ for $W^3$ and $W^4$ is selected from $R^1$ and

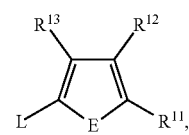

where L is a linker as defined above and E is selected from $CR^{14}$=$CR^{15}$, O, S, Se, $NR^{16}$, $CR^{14}$=N, $CR^{14}$=$N^+R^{16}$;

where $R^{11}$, $R^{12}$, $R^{13}$, $R^{14}$ and $R^{15}$ are independently H, L-$S_c$, L-$R^x$, L-$R^±$, —CH$_2$—CONH—SO$_2$-Me, aliphatic, alicyclic, aromatic, alkylaryl, F, Cl, Br, I, $NH_2$, $-N(R^1)_2$, $-COOH$, $-CH=O$, $-CN$, azido, $-OH$, $-NO_2$, $-SO_3H$, $-PO_3^{2\ominus}$, $-O-PO_3^{2\ominus}$, $-PO_3R^{m\ominus}$, $-O-PO_3R^{m\ominus}$, $-CONH_2$, $CONHR^m$, $COO-NHS$ and $COO-R^m$, where $R^m$ is selected from a group consisting of $L-S_c$, $L-R^x$, $L-R^\pm$, aliphatic substituents, aromatic substituents; where each aliphatic residue may incorporate up to six heteroatoms selected from N, O, S, and can be substituted one or more times by F, Cl, Br, I, hydroxy, alkoxy, carboxy, sulfo, phosphate, amino, sulfate, phosphonate, cyano, nitro, azido, alkyl-amino, dialkyl-amino or trialkylammonium; and $R^{16}$ is selected from H, $L-S_c$, $L-R^x$, $L-R^\pm$, $-CH_2-CONH-SO_2-Me$, aliphatic groups, alicyclic groups, alkylaryl groups, aromatic groups, each aliphatic residue may incorporate up to six heteroatoms selected from N, O, S, and can be substituted one or more times by F, Cl, Br, I, hydroxy, alkoxy, carboxy, sulfo, phosphate, amino, sulfate, phosphonate, cyano, nitro, azido, alkyl-amino, dialkyl-amino or trialkylammonium, or $R^{10}$ and $R^{10'}$ may be a part of a heterocyclic ring that is itself optionally further substituted by H, $L-S_c$, $L-R^x$, $L-R^\pm$, $-R^\pm$, $R^x$, alkyl or aryl; and $R^{20}$, $R^{21}$, $R^{22}$, $R^{23}$, $R^{20'}$, $R^{21'}$, $R^{22'}$, $R^{23'}$, $R^{31}$ and $R^{34}$ are independently selected from H, $L-S_c$, $L-R^x$, $L-R^\pm$, $-CH_2-CONH-SO_2-Me$, aliphatic, alicyclic, aromatic, alkyl-aryl, F, Cl, Br, I, $NH_2$, $-COOH$, $CH=O$, $-CN$, azido, $-OH$, $-NO_2$, $-SO_3H$, $-PO_3^{2\ominus}$, $-O-PO_3^{2\ominus}$, $-PO_3R^{m\ominus}$, $-O-PO_3R^{m\ominus}$, $-CONH_2$, $CONHR^m$, $COO-NHS$ and $COO-R^m$, where $R^m$ is selected from a group consisting of $L-S_c$, $L-R^x$, $L-R^\pm$, aliphatic substituents, aromatic substituents; where each aliphatic residue may incorporate up to six heteroatoms selected from N, O, S, and can be substituted one or more times by F, Cl, Br, I, hydroxy, alkoxy, carboxy, sulfo, phosphate, amino, sulfate, phosphonate, cyano, nitro, azido, alkyl-amino, dialkyl-amino or trialkylammonium;

U in $W^7$ and $W^8$ is independently selected from $C(R^{34})$ or nitrogen, $R^{32}$ and $R^{33}$ are independently selected from H, $L-S_c$, $L-R^x$, $L-R^\pm$, $-CH_2-CONH-SO_2-Me$, aliphatic groups, alicyclic groups, alkylaryl groups, and aromatic groups; alternatively $R^{32}$ and $R^{33}$ may be a part of a heterocyclic ring that is itself optionally further substituted by H, $L-S_c$, $L-R^x$, $L-R^\pm$, $R^\pm$, $R^x$, alkyl or aryl; and the substituents of $W^9$ to $W^{16}$ are already listed above; $V^1$ in $W^{17}$ is independently selected from either $W^3$ or $W^7$ and $V^2$ in $W^{18}$ is independently selected from $W^4$ or $W^8$;

$R^{41}$, $R^{42}$, $R^{43}$, $R^{44}$ and $R^{45}$ as well as $R^{41'}$, $R^{42'}$, $R^{43'}$, $R^{44'}$ and $R^{45'}$ of $W^{17}$ and $W^{18}$, $W^{19}$ and $W^{20}$, $W^{23}$ and $W^{24}$, $W^{25}$ and $W^{26}$, or $W^{27}$ and $W^{28}$ and $R^{51}$ and $R^{52}$ of $W^{21}$ and $W^{22}$ are independently selected from H, $L-S_c$, $L-R^x$, $L-R^\pm$, $-CH_2-CONH-SO_2-Me$, aliphatic, alicyclic, aromatic, alkyl-aryl, F, Cl, Br, I, $NH_2$, $-COOH$, $CH=O$, $-CN$, azido, $-OH$, $-NO_2$, $-SO_3H$, $-PO_3^{2\ominus}$, $-O-PO_3^{2\ominus}$, $-PO_3R^{m\ominus}$, $-O-PO_3R^{m\ominus}$, $-CONH_2$, $CONHR^m$, $COO-NHS$ and $COO-R^m$, where $R^m$ is selected from a group consisting of $L-S_c$, $L-R^x$, $L-R^\pm$, aliphatic substituents, aromatic substituents; where each aliphatic residue may incorporate up to six heteroatoms selected from N, O, S, and can be substituted one or more times by F, Cl, Br, I, hydroxy, alkoxy, carboxy, sulfo, phosphate, amino, sulfate, phosphonate, cyano, nitro, azido, alkyl-amino, dialkyl-amino or trialkylammonium; adjacent substituents $R^{41}$, $R^{42}$, $R^{43}$, $R^{44}$, and $R^{45}$ as well as $R^{41'}$, $R^{42'}$, $R^{43'}$, $R^{44'}$, $R^{45'}$, $R^{51}$, and $R^{52}$, may be a part of a cyclic or heterocyclic ring structure, which can be further substituted;

Q in $W^{27}$ and $W^{28}$ is independently selected from $N-R^1$, O, S, Se, or Te; and where at least one substituent of Z or K is an ionic substituent $R^\pm$ capable of increasing the hydrophilicity of the entire rotaxane, where the ionic substituent $R^\pm$ is selected from the group consisting of $-SO_3^\ominus$, $-O-SO_3^\ominus$, $-COO^\ominus$, $-PO_3^{2\ominus}$, $-O-PO_3^{2\ominus}$, $-PO_3R^{m\ominus}$, $-O-PO_3R^{m\ominus}$ and $-N(R^l)_3^+$, where $R^m$ and $R^l$ are independently selected from the group consisting of hydrogen, aliphatic substituents, aromatic substituents, reactive substituents, reactive aromatic substituents, and conjugated substances.

2. The rotaxane of claim 1, where at least one substituent of Z or K includes a reactive group $R^x$ that is independently selected from acrylamide, an activated ester of a carboxylic acid, a haloplatinate, an acyl nitrile, an aldehyde, an alkyl halide, an azide, an alkyne, an amine, a group capable of click chemistry, an anhydride, an aniline, an N-hydroxysuccinimide ester, an aryl halide, an aziridine, a boronate, a carboxylic acid, a diazoalkane, a haloacetamide, a halotriazine, a hydrazine, an imido ester, an isothiocyanate, an isocyanate, a maleimide, a phosphoramidite, a pyrylium moiety, a reactive platinum complex, a sulfuryl halide, a thiol group, or a photoactivateable group.

3. The rotaxane of claim 1, where at least one substituent of Z or K includes a conjugated substance $S_c$.

4. The rotaxane of claim 3, where the conjugated substance $S_c$ is selected from the group consisting of a peptide, a nucleotide, a polypeptide, a protein, a polynucleotide, a bead, a microplate well surface, a phospholipid, a nanoparticle, an amino acid, a nucleic acid, a sugar, a polysaccharide, an oligosaccharide, a triplet-state quencher, a drug, a polymer, and a second fluorescent dye.

5. The rotaxane of claim 1, where the reporter molecule is covalently or noncovalently associated with at least one of biological cells, DNA, lipids, nucleotides, polymers, proteins, triplet-state quenchers, and pharmacological agents.

6. The rotaxane of claim 1, further comprising a second reporter molecule selected from the group consisting of luminophores and chromophores.

7. The rotaxane of claim 6, where one reporter molecule is an energy transfer donor and the other is an energy transfer acceptor.

8. The rotaxane of claim 1, where the reporter molecule may be induced to luminesce by exposing the reporter molecule to one or more of electromagnetic energy, chemical energy, and electrochemical energy.

9. The rotaxane of claim 1, where Z is based on squaric acid.

10. The rotaxane of claim 1, where the macrocycle K has the structure $K^3$.

11. The rotaxane of claim 1, where B and C are selected from any unsymmetrical combination of $W^3$ and $W^2$ or $W^3$ and $W^4$ or $W^3$ and $W^6$ or $W^3$ and $W^8$ or $W^3$ and $W^{10}$ or $W^3$ and $W^{12}$ or $W^3$ and $W^{14}$ or $W^3$ and $W^{16}$ or $W^3$ and $W^{18}$ or $W^3$ and $W^{20}$ or $W^3$ and $W^{22}$ or $W^3$ and $W^{24}$ or $W^3$ and $W^{26}$ or $W^3$ and $W^{28}$.

12. The rotaxane of claim 1, where at least one of $R^5$, $R^6$, $R^7$, $R^8$, $R^{5'}$, $R^{6'}$, $R^{7'}$ and $R^{8'}$ is a halogen.

13. The rotaxane of claim 1, having the formula

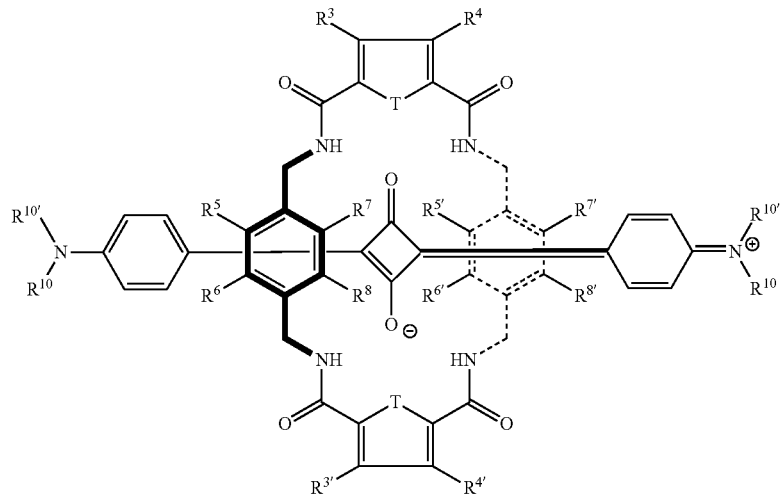

where $R^3$ and $R^4$ and $R^{3'}$ and $R^{4'}$ are independently H, alkyl, halogen, $OCH_3$, dialkylamino, morpholino, piperidino, -L-$R^\pm$, -L-$R^x$, -L-$S_c$ or $NO_2$;

T is O, NH or S;

each $R^{10}$ and $R^{10'}$ is independently selected from H, L, L-$S_c$, L-$R^x$, L-$R^\pm$, —$CH_2$—CONH—$SO_2$-Me, aliphatic groups, alicyclic groups, alkylaryl groups, aromatic groups, benzyl, substituted benzyl, p-sulfo-benzyl, and

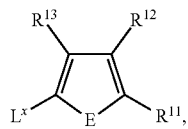

where Lx is $CH_2$ and E is selected from CH=CH, O, S, Se, $NR^{16}$, $CR^{14}$=N, $CR^{14}$=N, $CR^{14}$=$N^+R^{16}$;

where $R^{11}$, $R^{12}$, $R^{13}$, and $R^{14}$ are independently H, L-$S_c$, L-$R^x$, L-$R^\pm$, $NH_2$, —COOH, —$SO_3H$, —$PO_3^{2\ominus}$, $CONHR^m$, COO—NHS and COO—$R^m$, where $R^m$ is L-$S_c$;

$R^{16}$ is selected from H, aliphatic groups, alicyclic groups, alkylaryl groups, and aromatic groups;

$R^5$ and $R^6$, $R^7$ and $R^8$, $R^{5'}$ and $R^{6'}$, $R^{7'}$ and $R^{8'}$ are selected from H, L-$R^x$, L-$S_c$ and L-$R^\pm$, alkyl, aryl, alkoxy, alkyl-aryl, F, Br, Cl, I, OH, O-alkyl, COOH, nitro, cyano, $R^x$ and $R^\pm$; or may independently form together with interspersed atoms aromatic, heterocyclic and alicyclic ring systems that may be further substituted by H, —$R^\pm$, L-$S_c$, L-$R^x$, L-$R^\pm$.

14. The rotaxane of claim 1, having the formula

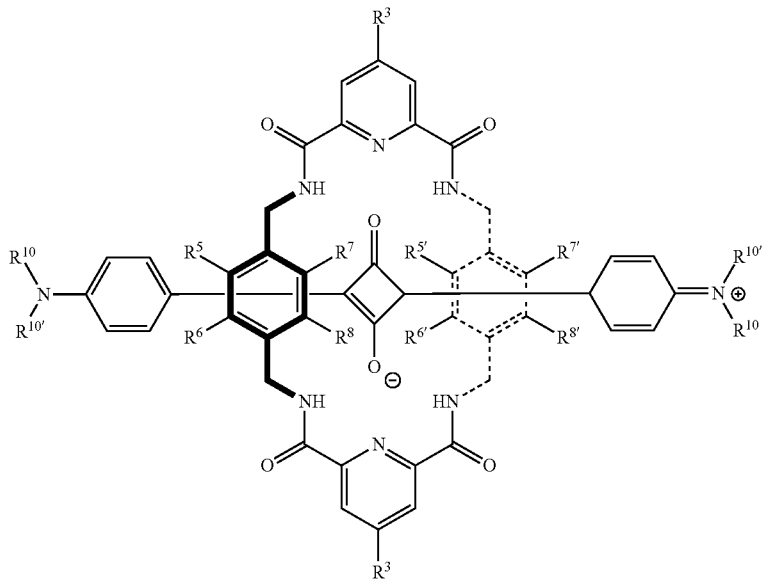

where $R^3$ is independently H, Cl, $OCH_3$, dialkylamino, morpholino, piperidino, -L-$R^{\pm}$, -L-$R^x$, -L-$S_c$;

each $R^{10}$ and $R^{10'}$ is independently selected from H, L-$S_c$, L-$R^x$, L-$R^{\pm}$, —$CH_2$—CONH—$SO_2$-Me, aliphatic groups, alicyclic groups, alkylaryl groups, aromatic groups, benzyl, substituted benzyl, p-sulfo-benzyl, and

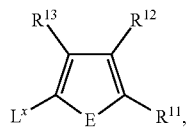

where $L^x$ is $CH_2$ and E is selected from CH=CH, O, S, Se, $NR^{16}$, $CR^{14}$=N, $CR^{14}$=$N^+R^{16}$;

where $R^{11}$, $R^{12}$, $R^{13}$, and $R^{14}$ are independently H, L-$S_c$, L-$R^x$, L-$R^{\pm}$, $NH_2$, —COOH, —$SO_3H$, —$PO_3^{2\ominus}$, $CONHR^m$, COO—NHS and COO—$R^m$, where $R^m$ is L-$S_c$;

L is alkyl having 1-20 carbons, and containing up to six amide linkages and up to 8 non-carbon atoms; and $R^{16}$ is selected from H, aliphatic groups, alicyclic groups, alkylaryl groups, and aromatic groups;

provided that at least one of $R^5$, $R^6$, $R^7$ or $R^8$, $R^{5'}$ $R^{6'}$, $R^{7'}$ or $R^{8'}$ is not H or alkyl; $R^5$ and $R^6$, $R^7$ and $R^8$, $R^{5'}$ and $R^{6'}$, $R^{7'}$ and $R^{8'}$ may independently form together with interspersed atoms aromatic, heterocyclic and alicyclic ring systems that may be further substituted by H, —$R^{\pm}$, L-$S_c$, L-$R^x$, L-$R^{\pm}$ provided that $R^5$ and $R^6$, $R^7$ and $R^8$, $R^{5'}$ and $R^{6'}$, $R^{7'}$ and $R^{8'}$ together with interspersed atoms do not represent an anthracene ring.

15. The rotaxane of claim 1, having the formula

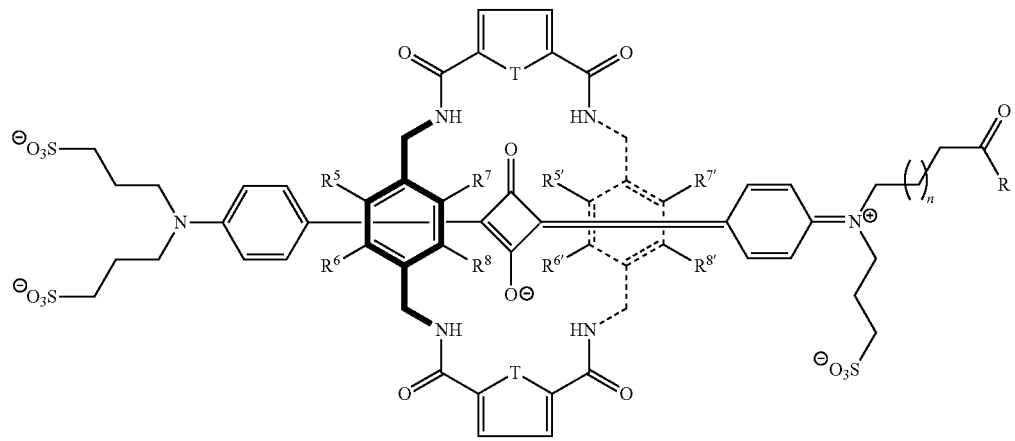

where R is OH, NHS, or NH—$CH_2$—$CH_2$-maleimide or NH—$S_c$; and n is 0, 1, 2 or 3; and where $R^5$, $R^6$, $R^7$, $R^8$, $R^{5'}$, $R^{6'}$, $R^{7'}$ and $R^{8'}$ are H, L-$S_c$, L-$R^x$, L-$R^{\pm}$, OMe, OH, a halogen or alkyl or $R^5$ and $R^6$, $R^7$ and $R^8$, $R^{5'}$ and $R^{6'}$, $R^{7'}$ and $R^{8'}$ may independently form together with interspersed atoms aromatic, heterocyclic and alicyclic ring systems that may be further substituted by H, —$R^{\pm}$, L-$S_c$, L-$R^x$, L-$R^{\pm}$.

16. The rotaxane of claim 1, having the formula

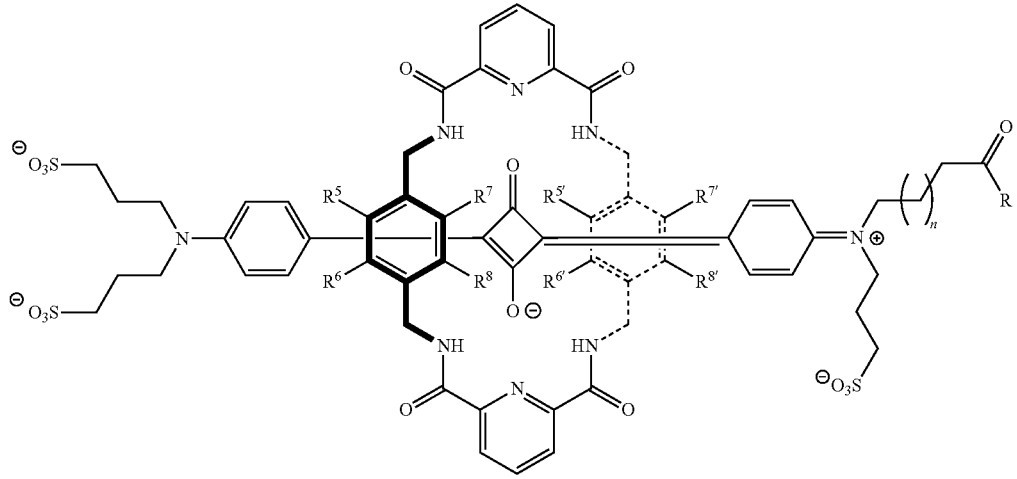

where R is OH, NHS, or NH—CH$_2$—CH$_2$-maleimide or NH—S$_C$; and n is 0, 1, 2 or 3; and where R$^5$, R$^6$, R$^7$, R$^8$, R$^{5'}$, R$^{6'}$, R$^{7'}$ and R$^{8'}$ are H, L-S$_c$, L-R$^x$, L-R$^\pm$, OMe, OH, a halogen or alkyl or R$^5$ and R$^6$, R$^7$ and R$^8$, R$^{5'}$ and R$^{6'}$, R$^{7'}$ and R$^{8'}$ may independently form together with interspersed atoms aromatic, heterocyclic and alicyclic ring systems that may be further substituted by H, —R$^\pm$, L-S$_c$, L-R$^x$, L-R$^\pm$, provided that at least one of R$^5$, R$^6$, R$^7$ or R$^8$, R$^{5'}$ R$^{6'}$, R$^{7'}$ or R$^{8'}$ is not H or alkyl or all these substituents together with interspersed atoms do not represent an anthracene ring.

17. The rotaxane of claim 1, having the formula

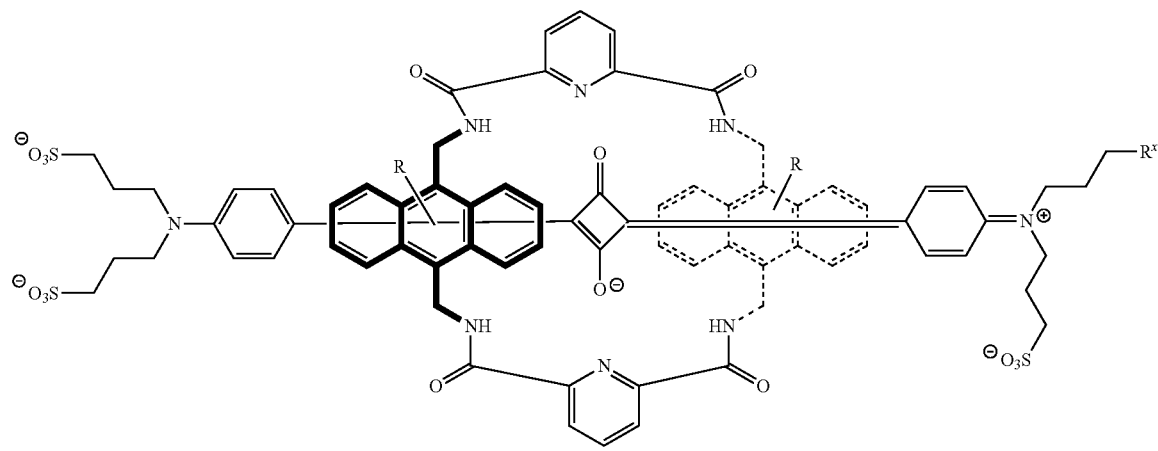

wherein at least one of the substituents R on the anthracene bridge is not hydrogen.

18. The rotaxane of claim 1, having the formula

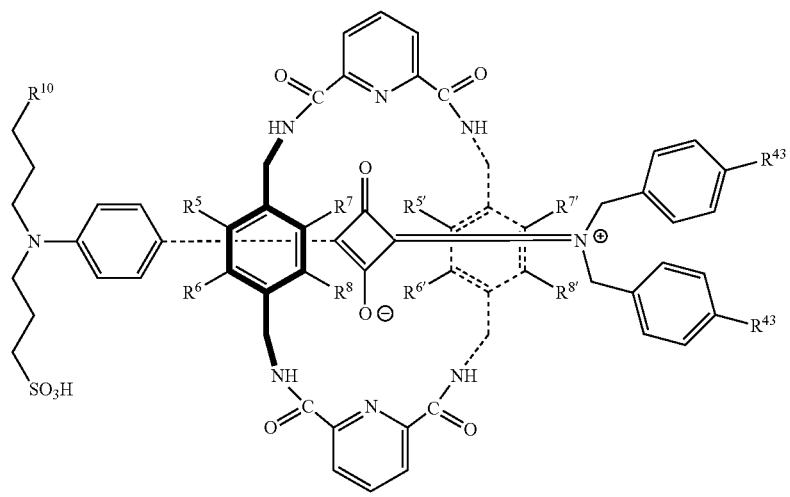

where $R^5$, $R^6$, $R^7$, $R^8$, $R^{5'}$, $R^{6'}$, $R^{7'}$ and $R^{8'}$ are H, L-$R^x$, L-$S_c$ and L-$R^{\pm}$, alkyl, aryl, alkoxy, alkyl-aryl, F, Br, Cl, I, OH, nitro, cyano, $R^x$ and $R^{\pm}$; or $R^5$ and $R^6$, $R^7$ and $R^8$, $R^{5'}$ and $R^{6'}$, $R^{7'}$ and $R^{8'}$ may independently form together with interspersed atoms aromatic, heterocyclic and alicyclic ring systems that may be further substituted by H, —$R^{\pm}$, L-$S_c$, L-$R^x$, L-$R^{\pm}$ or a halogen;

$R^x$ is selected from COOH, NHS, maleimide, iodoacetamide, click chemistry groups and phosphoramidite;

$R^{\pm}$ is selected from —$SO_3H$, —$PO_3^{2\ominus}$, and —O—$PO_3^{2\ominus}$; and $S_c$ is selected from peptides, proteins, nucleotides, DNA, oligonucleotides, phospholipids, amino acids, and drugs.

19. A rotaxane having the formula

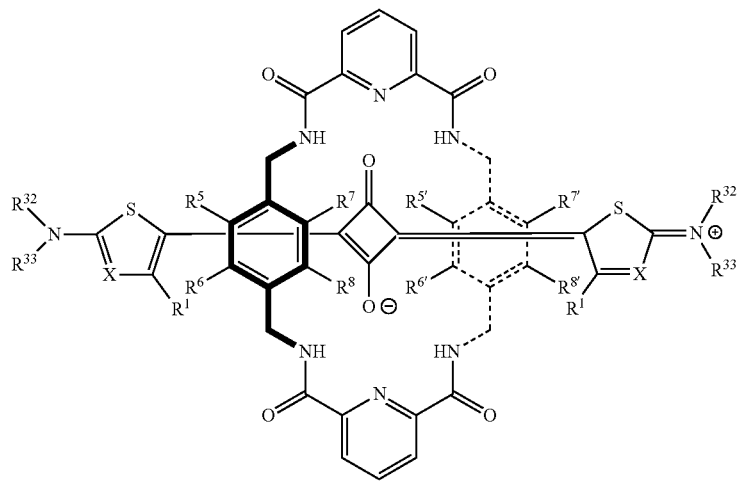

where $R^5$, $R^6$, $R^7$, $R^8$, $R^{5'}$, $R^{6'}$, $R^{7'}$ and $R^{8'}$ are a H, L-$R^x$, L-$S_c$ and L-$R^{\pm}$, alkyl, aryl, alkoxy, alkyl-aryl, F, Br, Cl, I, OH, nitro, cyano, $R^x$ and $R^{\pm}$; or $R^5$ and $R^6$, $R^7$ and $R^8$, $R^{5'}$ and $R^{6'}$, $R^{7'}$ and $R^{8'}$ may independently form together with interspersed atoms aromatic, heterocyclic and alicyclic ring systems that may be further substituted by H, —$R^{\pm}$, L-$S_c$, L-$R^x$, L-$R^{\pm}$ or a halogen, provided that a least one of $R^5$, $R^6$, $R^7$, $R^8$, $R^{5'}$, $R^{6'}$, $R^{7'}$ or $R^{8'}$ is not H or alkyl or $R^5$ and $R^6$, $R^7$ and $R^8$, $R^{5'}$ and $R^{6'}$, $R^{7'}$ and $R^{8'}$ together with interspersed atoms do not represent an anthracene ring, provided that at least one substituent of $R^5$, $R^{5'}$, $R^6$, $R^{6'}$, $R^7$, $R^{7'}$, $R^8$ and $R^{8'}$ is a halogen;

$R^1$ is selected from H, methyl, t-butyl, and phenyl;

$R^{32}$ and $R^{33}$ are independently selected from H, L-$S_c$, L-$R^x$, L-$R^{\pm}$, —$CH_2$—CONH—$SO_2$-Me, aliphatic groups, alicyclic groups, alkylaryl groups, aromatic groups, benzyl, substituted benzyl, p-sulfo-benzyl, sulfo-butyl, sulfo-propyl, and sulfo-ethyl; or $R^{32}$ and $R^{33}$ combine to form heterocyclic rings that are optionally further substituted by L-$S_c$, L-$R^x$, L-$R^{\pm}$;

X is selected from CH and nitrogen;

L is alkyl having 1-20 carbons, and containing up to six amide linkages and up to 8 non-carbon atoms; and $R^x$ is selected from COOH, NHS, maleimide, iodoacetamide; and phosphoramidite;

$R^{\pm}$ is selected from —$SO_3H$, —$PO_3^{2\ominus}$, and —O—$PO_3^{2\ominus}$; and $S_c$ is selected from peptides, proteins, nucleotides, oligonucleotides, phospholipids, amino acids, and drugs.

20. A rotaxane having the formula

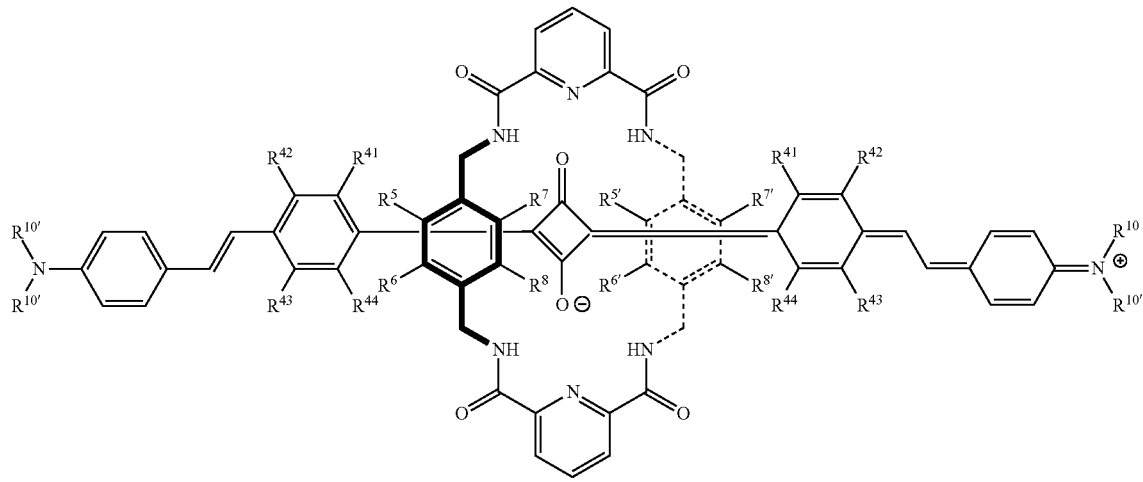

where $R^{10}$ and $R^{10'}$ are independently selected from H, L-$S_c$, L-$R^x$, L-$R^\pm$, —CH$_2$—CONH—SO$_2$-Me, aliphatic groups, alicyclic groups, alkylaryl groups, aromatic groups, benzyl, substituted benzyl, p-sulfo-benzyl, sulfo-butlyl, sulfo-propyl, and sulfo-ethyl; or $R^{10}$ and $R^{10'}$ combine to form heterocyclic rings that are optionally further substituted by L-$S_c$, L-$R^x$, L-$R^\pm$;

L is alkyl having 1-20 carbons, and containing up to six amide linkages and up to 8 non-carbon atoms; and $R^x$ is selected from COOH, NHS, maleimide, iodoacetamide; and phosphoramidite;

$R^\pm$ is selected from —SO$_3$H, —PO$_3{}^{2\ominus}$, and —O—PO$_3{}^{2\ominus}$; and $S_c$ is selected from peptides, proteins, nucleotides, oligonucleotides, phospholipids, amino acids, and drugs;

and where $R^5$, $R^6$, $R^7$, $R^8$, $R^{5'}$, $R^{6'}$, $R^{7'}$ and $R^{8'}$ are a halogen, H, L-$S_c$, L-$R^x$, L-$R^\pm$, OMe, OH or alkyl or $R^5$ and $R^6$, $R^7$ and $R^8$, $R^{5'}$ and $R^{6'}$, $R^{7'}$ and $R^{8'}$ may independently form together with interspersed atoms aromatic, heterocyclic and alicyclic ring systems that may be further substituted by H, —$R^1$, L-$S_c$, L-$R^x$, L-$R^\pm$ or a halogen, provided that a least one of $R^5$, $R^6$, $R^7$, $R^8$, $R^{5'}$, $R^{6'}$, $R^{7'}$ or $R^{8'}$ is not H or alkyl or $R^5$ and $R^6$, $R^7$ and $R^8$, $R^{5'}$ and $R^{6'}$, $R^{7'}$ and $R^{8'}$ together with interspersed atoms do not represent an anthracene ring, provided that at least one substituent of $R^5$, $R^{5'}$, $R^6$, $R^{6'}$, $R^7$, $R^{7'}$, $R^8$ and $R^{8'}$ is a halogen.

21. A rotaxane having the formula

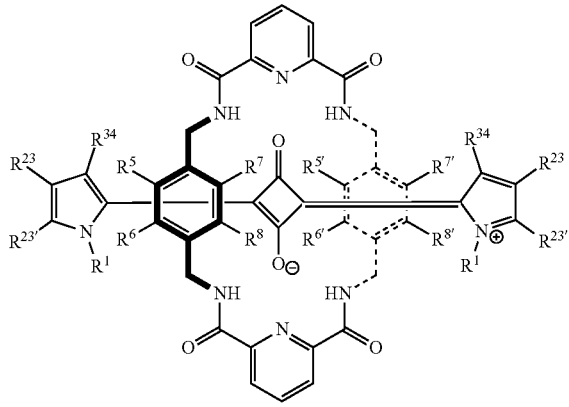

where $R^1$ is independently selected from H, CH$_3$, sulfo-propyl, sulfo-ethyl, —(CH$_2$)$_k$—$R^x$, —(CH$_2$)$_k$—$R^\pm$, or —(CH$_2$)$_k$—$S_c$; and k=2-5;

$R^{23}$ and $R^{23'}$ are independently H, alkyl, aryl, substituted aryl, carboxyl, —COOEt, sulfo-propyl, sulfo-ethyl, —$R^x$, —$R^\pm$, —$S_c$, —(CH$_2$)$_k$—$R^x$, —(CH$_2$)$_k$—$R^\pm$, or —(CH$_2$)$_k$—$S_c$; $R^{34}$ is independently selected from H and methyl;

and where $R^5$, $R^6$, $R^7$, $R^8$, $R^{5'}$, $R^{6'}$, $R^{7'}$ and $R^{8'}$ are H, L-$S_c$, L-$R^x$, L-$R^\pm$, OMe, OH, alkyl or a halogen or $R^5$ and $R^6$, $R^7$ and $R^8$, $R^{5'}$ and $R^{6'}$, $R^{7'}$ and $R^{8'}$ may independently form together with interspersed atoms aromatic, heterocyclic and alicyclic ring systems that may be further substituted by H, F, Cl, Br, I, —$R^+$, L-$S_c$, L-$R^x$, L-$R^\pm$ provided that a least one of $R^5$, $R^6$, $R^7$, $R^8$, $R^{5'}$, $R^{6'}$, $R^{7'}$ or $R^{8'}$ is not H or alkyl or $R^5$ and $R^6$, $R^7$ and $R^8$, $R^{5'}$ and $R^{6'}$, $R^{7'}$ and $R^{8'}$ together with interspersed atoms do not represent an anthracene ring provided that at least one substituent of $R^5$, $R^{5'}$, $R^6$, $R^{6'}$, $R^7$, $R^{7'}$, $R^8$ and $R^{8'}$ is a halogen;

L is alkyl having 1-20 carbons, and containing up to six amide linkages and up to 8 non-carbon atoms; and $R^x$ is selected from COOH, NHS, maleimide, iodoacetamide, click-chemistry groups or phosphoramidite;

$R^\pm$ is selected from -SO$_3$H, —PO$_3{}^{2\ominus}$, and —O—PO$_3{}^{2\ominus}$; and $S_c$ is selected from proteins, nucleotides, oligonucleotides, phospholipids, amino acids, drugs, or triplet-state quenchers.

22. A method of performing a photoluminescence assay, the method comprising:
selecting a photoluminescent rotaxane according to claim 1;
exciting the photoluminescent rotaxane; and
detecting light emitted by the photoluminescent rotaxane and further analyzing the emitted light and determining at least one of luminescence intensity, luminescence lifetime, and luminescence polarization.

23. The method of claim 22, further comprising associating the photoluminescent rotaxane with a second molecule.

24. A method of staining a biological sample, comprising:
combining a solution of a rotaxane according to claim 1 with a biological sample in a concentration that is sufficient to yield a detectable optical response upon excitation.

25. The method of claim 24, where the biological sample includes biological cells, proteins, DNA, RNA, antibodies, carbohydrates, tissue and oligonucleotides in a microarray.

26. A kit for fluorescent labeling of a biological or non-biological sample comprising:
- a dye solution of a rotaxane according to claim 1; and a buffer suitable for use with the biological or non-biological sample.

27. A method of diagnosing diseased tissue comprising administering a rotaxane according to claim 1, exposing the diseased tissue to light in the visible and near infrared range and recording the emitted light produced from the rotaxane.

28. The rotaxane of claim 1, where at least one of $R^5$, $R^6$, $R^7$, $R^8$, $R^{5'}$, $R^{6'}$, $R^{7'}$, and $R^{8'}$, is an electron-withdrawing group.

29. The rotaxane of claim 1, where at least one of $R^5$, $R^6$, $R^7$, $R^8$, $R^{5'}$, $R^{6'}$, $R^{7'}$, and $R^{8'}$, is an electron-donating group.

* * * * *

UNITED STATES PATENT AND TRADEMARK OFFICE
CERTIFICATE OF CORRECTION

PATENT NO.        : 11,091,646 B2
APPLICATION NO.   : 16/102421
DATED             : August 17, 2021
INVENTOR(S)       : Dymytro V. Kobzev et al.

It is certified that error appears in the above-identified patent and that said Letters Patent is hereby corrected as shown below:

In the Specification

Column 3, Line 12, "squaraine-rotaxane compound SR-3" should read --squaraine-rotaxane compound SR-4--
    Line 18, "dye-to-protein ratio (D/P) of SR-3-IgG" should read --dye-to-protein ratio (D/P) of SR-4-IgG--

Columns 17-18, the first formula should appear as follows:

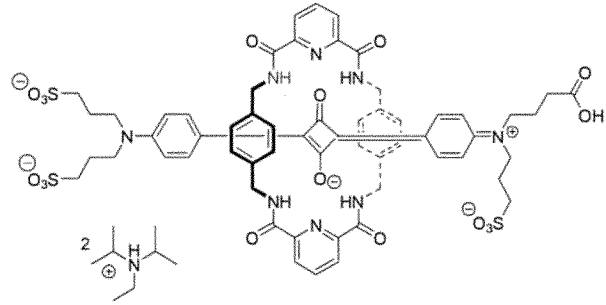

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*

Columns 45-46, the formulas should appear as follows:
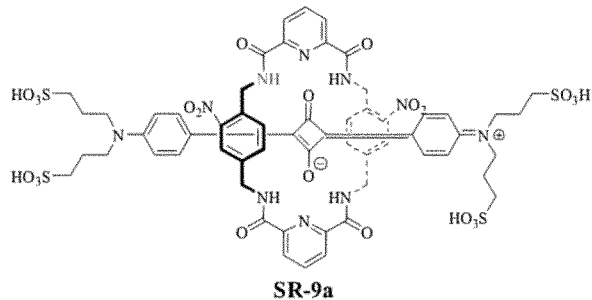
Columns 47-48, the second formula should appear as follows:
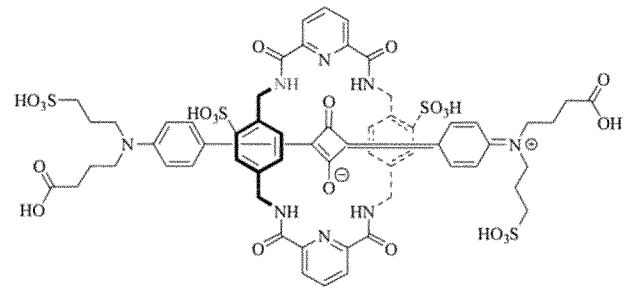
Columns 49-50, the second formula should appear as follows:
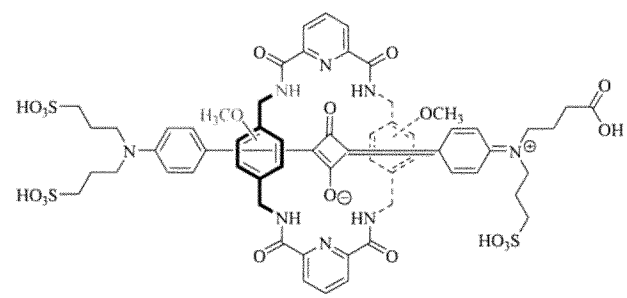

CERTIFICATE OF CORRECTION (continued)
U.S. Pat. No. 11,091,646 B2

Columns 51-52, the second formula should appear as follows:

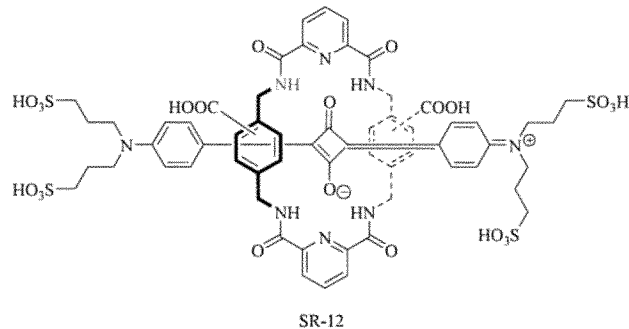

Columns 65-66, the first formula should appear as follows:

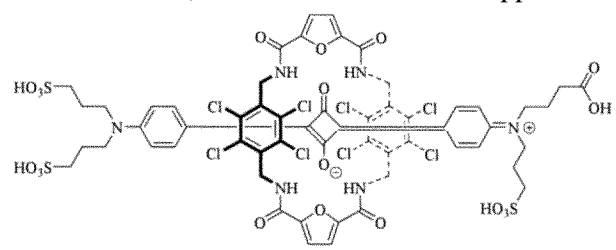

Columns 75-76, the second formula should appear as follows:

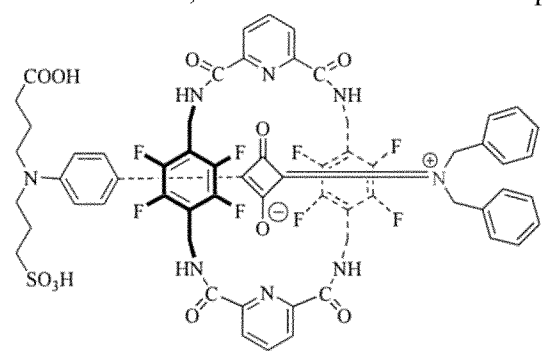

Columns 81-82, the second formula should appear as follows:
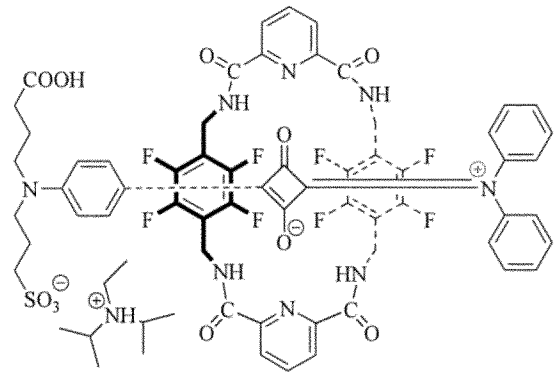
SR-26
Columns 97-98, the third formula should appear as follows:
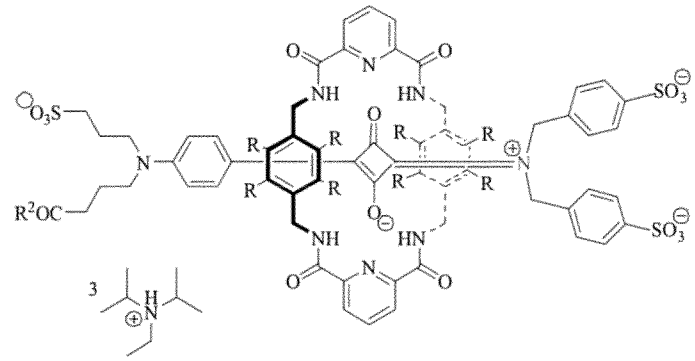
R = H, CH₃, Halogen, NO₂, OCH₃, COOH, SO₃H, NH₂
R² = OH, NHS, NH-CH₂CH₂-maleimide
Columns 103-104, the second formula should appear as follows:
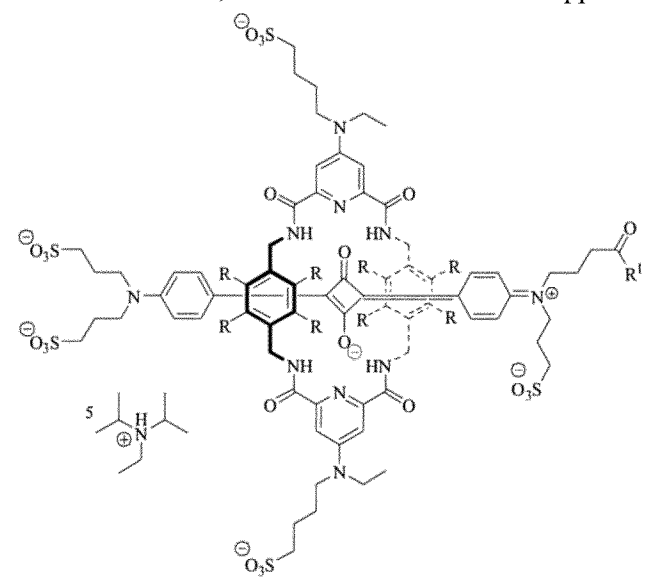
R¹ = OH, NHS, NH-CH₂CH₂-maleimide
R = H, CH₃, Halogen, NO₂, OCH₃, SO₃H, NH₂

Columns 105-106, the first formula should appear as follows:
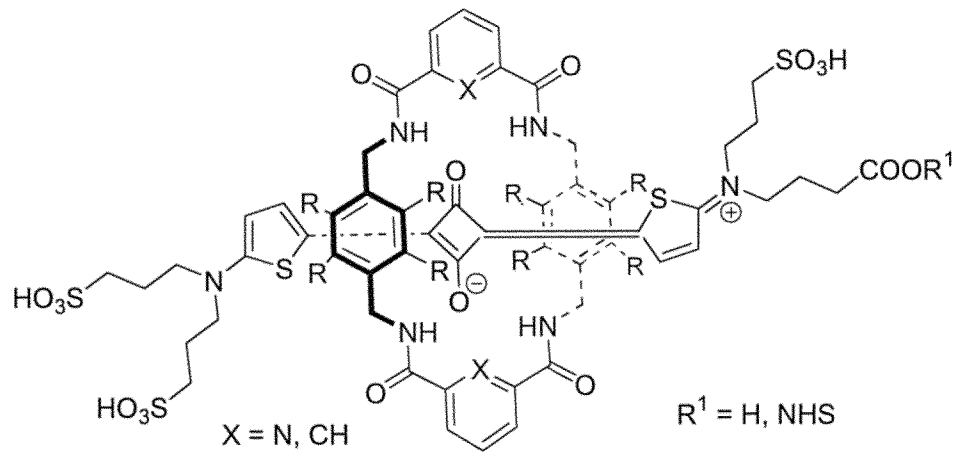
R = H, CH$_3$, Halogen, NO$_2$, OCH$_3$, SO$_3$H, NH$_2$
Columns 107-108, the second formula should appear as follows:
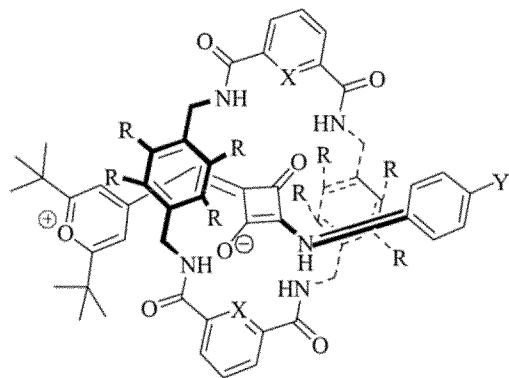
In the Claims
Column 125, Lines 40-50, after "W$^{28}$ is" the formula should appear as follows:
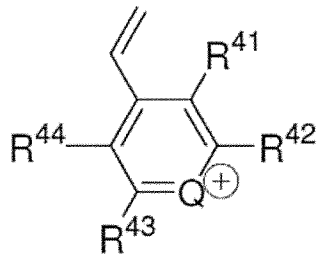
Column 128, Line 15, "and -N(R$^1$)$_3$$^+$" should read --and -$^+$N(R$^1$)$_3$--
    Line 32, "photoactivateable group" should read --photoactivatable group--

Column 130, Line 25, "where Lx is" should read --where $L^x$ is--
Line 26, after "Se, $NR^{16}$, $CR^{14}=N$," please delete the second instance of "$CR^{14}=N$,"
Line 40, after "14. The rotaxane of claim 1, having the formula" the formula should appear as follows:

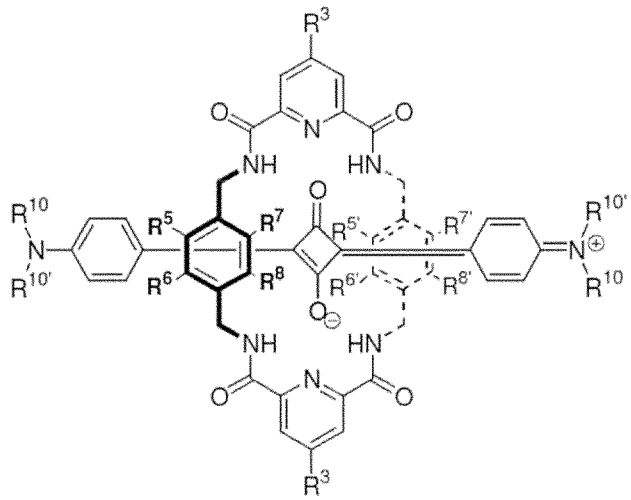

Column 135, Line 64, "$R^1$ is selected from H, methyl, t-butyl," should read --$R^1$ is selected from H, methyl, tert-butyl,--

Column 137, Line 42, "may be further substituted by H, -$R^1$" should read --may be further substituted by H, -$R^{\pm}$--
Line 43, "provided that a least one of $R^5$, $R^6$" should read --provided that at least one of $R^5$, $R^6$--

Column 138, Line 36, "substituted by H, F, Cl, Br, I, -$R^+$" should read --substituted by H, F, Cl, Br, I, -$R^{\pm}$--
Line 37, "provided that a least one of $R^5$" should read --provided that at least one of $R^5$--